US011871071B2

(12) United States Patent
Yoshizawa et al.

(10) Patent No.: US 11,871,071 B2
(45) Date of Patent: Jan. 9, 2024

(54) BROADCAST RECEIVING APPARATUS, BROADCAST RECEIVING METHOD, AND CONTENTS OUTPUTTING METHOD

(71) Applicant: MAXELL, LTD., Kyoto (JP)

(72) Inventors: Kazuhiko Yoshizawa, Osaka (JP); Takuya Shimizu, Osaka (JP); Nobuo Masuoka, Osaka (JP); Yusuke Uchiyama, Osaka (JP); Yasunobu Hashimoto, Osaka (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 17/855,919

(22) Filed: Jul. 1, 2022

(65) Prior Publication Data

US 2022/0337901 A1    Oct. 20, 2022

Related U.S. Application Data

(63) Continuation of application No. 15/548,380, filed as application No. PCT/JP2016/052339 on Jan. 27, 2016, now Pat. No. 11,405,679.

(30) Foreign Application Priority Data

Feb. 2, 2015   (JP) ................................ 2015-018226
Mar. 19, 2015  (JP) ................................ 2015-056948
Mar. 23, 2015  (JP) ................................ 2015-058877

(51) Int. Cl.
*H04N 21/431* (2011.01)
*H04N 21/4363* (2011.01)
(Continued)

(52) U.S. Cl.
CPC ..... *H04N 21/4314* (2013.01); *H04N 21/4263* (2013.01); *H04N 21/435* (2013.01);
(Continued)

(58) Field of Classification Search
None
See application file for complete search history.

(56) References Cited

U.S. PATENT DOCUMENTS 7,646,727 B2    1/2010  Hirota et al.
9,161,063 B2 *  10/2015 Ghosh ............... H04N 21/4621
(Continued)

FOREIGN PATENT DOCUMENTS

CN    101296371 A    10/2008
EP    2 387 249 A1   11/2011
(Continued)

OTHER PUBLICATIONS

MMT-Based Media Transport Scheme in Digital Broadcasting Systems, ARIB STD-B60, Version 1.0, Jul. 31, 2014, with English translation.
(Continued)

*Primary Examiner* — Jason K Lin
(74) *Attorney, Agent, or Firm* — Rimon, P.C.

(57) ABSTRACT

A broadcast receiving includes a broadcast receiver that receives a broadcast wave of a digital broadcasting service; a separator that separates coded program video data, program-cooperation data, and screen layout control information, from the broadcast wave; a video decoder that decodes the coded program video data to reproduce program video information; a cooperation information generator that interprets the program-cooperation data to generate program-cooperation information; and a control unit that, when an instruction to display a given screen is input while the presentation processor divides video display region into sub-regions based on the screen layout control information, places the program video information in one of the sub-regions, places the program-cooperation information in another sub-region, and outputs the data of the video display region as the video information, outputs information of the given screen as the video information without dividing the video display region based on the screen layout control information.

4 Claims, 43 Drawing Sheets

| FUNCTION IDENTIFYING INFORMATION | MMT DATA DECODING PROCESS IN OUTPUT DESTINATION DEVICE | SUPPORTED | SUPPORTED | UNSUPPORTED OR UNIDENTIFIABLE | UNSUPPORTED OR UNIDENTIFIABLE |
|---|---|---|---|---|---|
| | MPEG2-TS DATA DECODING PROCESS IN OUTPUT DESTINATION DEVICE | SUPPORTED | UNSUPPORTED OR UNIDENTIFIABLE | SUPPORTED | UNSUPPORTED OR UNIDENTIFIABLE |
| OUTPUT CONTROL EXAMPLE 1 FROM BROADCAST RECEIVING APPARATUS | | OUTPUT MMT DATA | OUTPUT MMT DATA | OUTPUT MPEG2-TS DATA | FOLLOW OUTPUT CONTROL EXAMPLE 4 |
| OUTPUT CONTROL EXAMPLE 2 FROM BROADCAST RECEIVING APPARATUS | | OUTPUT MPEG2-TS DATA | OUTPUT MMT DATA | OUTPUT MPEG2-TS DATA | FOLLOW OUTPUT CONTROL EXAMPLE 4 |
| OUTPUT CONTROL EXAMPLE 3 FROM BROADCAST RECEIVING APPARATUS | | FOLLOW SET ORDER OF PRIORITY | OUTPUT MMT DATA | OUTPUT MPEG2-TS DATA | FOLLOW OUTPUT CONTROL EXAMPLE 4 |

(51) Int. Cl.

| | | |
|---|---|---|
| *H04N 21/462* | (2011.01) | |
| *H04N 21/434* | (2011.01) | |
| *H04N 21/442* | (2011.01) | |
| *H04N 21/44* | (2011.01) | |
| *H04N 21/4402* | (2011.01) | |
| *H04N 21/482* | (2011.01) | |
| *H04N 21/426* | (2011.01) | |
| *H04N 21/435* | (2011.01) | |
| *H04N 21/4623* | (2011.01) | |

(52) U.S. Cl.
CPC ..... *H04N 21/4345* (2013.01); *H04N 21/4348* (2013.01); *H04N 21/4363* (2013.01); *H04N 21/4402* (2013.01); *H04N 21/44016* (2013.01); *H04N 21/44209* (2013.01); *H04N 21/440218* (2013.01); *H04N 21/4621* (2013.01); *H04N 21/4622* (2013.01); *H04N 21/4623* (2013.01); *H04N 21/482* (2013.01); *H04N 21/4821* (2013.01)

(56) References Cited

U.S. PATENT DOCUMENTS

| | | | |
|---|---|---|---|
| 9,264,772 | B2 | 2/2016 | Kitazato et al. |
| 2001/0005236 | A1 | 6/2001 | Nakada et al. |
| 2001/0012440 | A1 | 8/2001 | Itoi |
| 2003/0154481 | A1 | 8/2003 | Andersen et al. |
| 2006/0197828 | A1 | 9/2006 | Zeng et al. |
| 2008/0098444 | A1 | 4/2008 | Shikata et al. |
| 2008/0247541 | A1* | 10/2008 | Cholas .............. H04N 21/64707 709/249 |
| 2008/0276276 | A1 | 11/2008 | Lim et al. |
| 2009/0063978 | A1 | 3/2009 | Dawson et al. |
| 2010/0129062 | A1* | 5/2010 | Nakajima ............ H04N 21/458 386/241 |
| 2011/0010301 | A1 | 1/2011 | Tsuruga et al. |
| 2011/0010742 | A1 | 1/2011 | White |
| 2011/0030010 | A1 | 2/2011 | Overbaugh |
| 2012/0060193 | A1 | 3/2012 | Chozui |
| 2012/0236949 | A1* | 9/2012 | Keating .......... H04N 21/440218 375/259 |
| 2012/0284749 | A1 | 11/2012 | Lee et al. |
| 2012/0284763 | A1 | 11/2012 | Choi |
| 2013/0067509 | A1 | 3/2013 | Talbert |
| 2013/0125186 | A1 | 5/2013 | Lee et al. |
| 2013/0173826 | A1 | 7/2013 | Kim et al. |
| 2013/0182067 | A1 | 7/2013 | Otsuka et al. |
| 2013/0219435 | A1 | 8/2013 | Pattison et al. |
| 2014/0371894 | A1* | 12/2014 | Shan ................... H04L 65/1094 700/94 |
| 2015/0020137 | A1 | 1/2015 | Iwanami et al. |
| 2015/0023355 | A1 | 1/2015 | Tokumo et al. |
| 2015/0033252 | A1 | 1/2015 | Dewa |
| 2015/0082356 | A1 | 3/2015 | Naito et al. |
| 2015/0189337 | A1* | 7/2015 | Pedan .............. H04N 21/23406 370/474 |
| 2015/0237405 | A1 | 8/2015 | Pack et al. |
| 2016/0014464 | A1 | 1/2016 | Baskaran et al. |
| 2016/0078901 | A1 | 3/2016 | Toma et al. |
| 2016/0080755 | A1 | 3/2016 | Toma et al. |
| 2016/0165276 | A1 | 6/2016 | Toma et al. |

FOREIGN PATENT DOCUMENTS

| | | |
|---|---|---|
| EP | 2 424 238 A1 | 2/2012 |
| JP | 2001-186486 A | 7/2001 |
| JP | 2001-223978 A | 8/2001 |
| JP | 2004-152014 A | 5/2004 |
| JP | 2004-186847 A | 7/2004 |
| JP | 2006-238049 A | 9/2006 |
| JP | 2007-104099 A | 4/2007 |
| JP | 2007-142923 A | 6/2007 |
| JP | 2009-088819 A | 4/2009 |
| JP | 2010-166335 A | 7/2010 |
| JP | 2011-018410 A | 1/2011 |
| JP | 2011-142397 A | 7/2011 |
| JP | 2012-015571 A | 1/2012 |
| JP | 2012-191638 A | 10/2012 |
| JP | 5049151 B2 | 10/2012 |
| JP | 2013-009330 A | 1/2013 |
| JP | 2013-009361 A | 1/2013 |
| JP | 2013-074328 A | 4/2013 |
| JP | 2013-183210 A | 9/2013 |
| JP | 2014-241520 A | 12/2014 |
| WO | 2010/140354 A1 | 12/2010 |
| WO | 2013/136754 A1 | 9/2013 |
| WO | 2014/124940 A1 | 8/2014 |
| WO | 2014/196189 A1 | 12/2014 |
| WO | 2015/001783 A1 | 1/2015 |

OTHER PUBLICATIONS

Japanese Notice of Reasons for Refusal issued in corresponding Japanese Patent Application No. 2018-066526, dated Sep. 10, 2019, with English translation.
Non-Final Rejection issued in corresponding U.S. Appl. No. 15/548,380, dated Sep. 6, 2018.
Final Rejection issued in corresponding U.S. Appl. No. 15/548,380, dated May 29, 2019.
Non-Final Rejection issued in corresponding U.S. Appl. No. 15/548,380, dated Dec. 26, 2019.
Final Rejection issued in corresponding U.S. Appl. No. 15/548,380, dated Aug. 13, 2020.
Extended European Search Report issued in corresponding European Patent Application No. 16746485.8-1208, dated Jul. 27, 2018.
Y. Lim et al., "Proposal to study conversion between MPEG-2 TS and MMT Protocol", Strasbourg, France, Oct. 2014.
Y. Lim et al., "New MPEG Transport Standard for Next Generation Hybrid Broadcasting System With IP", IEEE Transactions on Broadcasting, vol. 60, No. 2, Jun. 2014, pp. 160-169.
ARIB: "Proposed text to MMT Implementation Guidelines", Strasbourg, France, Oct. 2014.
Japanese Office Action issued in corresponding Japanese Patent Application No. 2015-18226, dated Aug. 7, 2018, with English Translation.
ARIB STD-B60: "MMT-Based Media Transport Scheme in Digital Broadcasting Systems", with English Translation, Jul. 31, 2014.
Shuichi Aoki et al., "A Study on Implementation of MMT in Next Generation Broadcasting Systems", with English translation, 2013.
Shuichi Aoki et al., : "Performance Evaluation of Multiplexing Schemes for IP Packets in Digital Multimedia Broadcasting Systems," Nov. 2010.
Japanese Notice of Reasons for Refusal issued in corresponding Japanese Patent Application No. 2020-005785, dated Dec. 22, 2020, with English translation.
Notification of Reasons for Refusal issued in corresponding Japanese Patent Application No. 2015-018226, dated Jan. 9, 2018.
Japanese Trial Decision issued in corresponding Japan Patent Application No. 2015-018226, dated Dec. 11, 2018, with English Translation.
Japanese Office Action issued in corresponding Japanese Patent Application No. 2018-117002, dated Feb. 19, 2019, with English Translation.
European Office Action issued in corresponding European Patent Application No. 16746485.8-1208, dated Mar. 20, 2019.
ARIB STD-B 60, "Mmt-Based Media Transport Scheme in Digital Broadcasting Systems" Jul. 31, 2014, pp. 69-70, 74 and pp. 160-161.
ARIB TR-B15, "Opelationl Guidelines for Digital Satellite Broadcastiong" Dec. 10, 2013 pp. 4-90.
Young Han Kim et al., "Proposed CD text for MMT content consumption signaling", International Organisation for Standardisation Organisation Internationale De Normalisation ISO/IEC JTC1/SC29/WG 11, Coding of Moving Pictures and Audio, Oct. 18, 2012.

(56) References Cited

OTHER PUBLICATIONS

H. Hamada et al., "Basic System Overview of Hybridcast," NHK Science and Technical Research Laboratories R&D Report May 15, 2012, No. 133, pp. 10-19, ISSN 0914-7535, with English translation.
S. Aoki, "Media Transport Technologies for Next Generation Broadcasting Systems," NHK Science and Technical Research Laboratories R&D Report, Jul. 15, 2013, No. 140, pp. 22-31, ISSN 0914-7535, with English abstract.
H. Katoh, "The Deployment of Hybridcast", NHK Science and Technical Research Laboratories R&D Report, Sep. 15, 2012, No. 135, pp. 14-29, ISSN 0914-7535, with English abstract.
M. Takechi, "Technical Specifications and Latest Trends of Hybridcast", NHK Science and Technical Research aboratories R&D Report, Nov. 2013, No. 142, pp. 12-19, with English translation.
International Search Report issued in Application No. PCT/JP2016/052339 dated Apr. 26, 2016, with English translation.
Japanese Office Action issued in corresponding Japanese Patent Application No. 2018-066526, dated Dec. 18, 2018, with English Translation.
Japanese Trial Decision issued in corresponding Japanese Patent Application No. 2015-018226, dated Dec. 11, 2018.
Office Action issued in corresponding Japanese Patent Application No. 2015-018226, dated Aug. 8, 2017.
Aoki et al., "New Media Transport Technologies in Super Hi-Vision Broadcasting Systems," IBC 2013 Conference in Amsterdam (Sep. 12, 2013).
Partial Supplementary European Search Report issued in corresponding European Patent Application 16746485.8, dated May 17, 2018.

\* cited by examiner (*AU: ACCESS UNIT)

FIG. 3
(A)
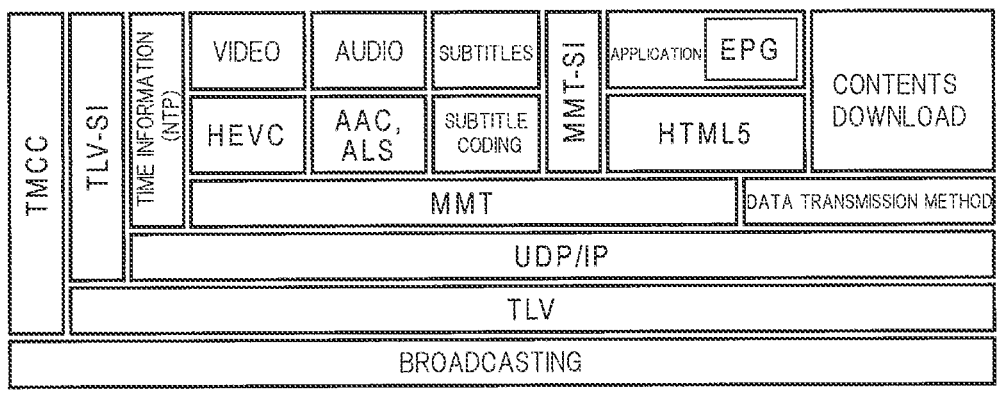
(*TMCC: Transmission and Multiplexing Configuration Control)
(B)
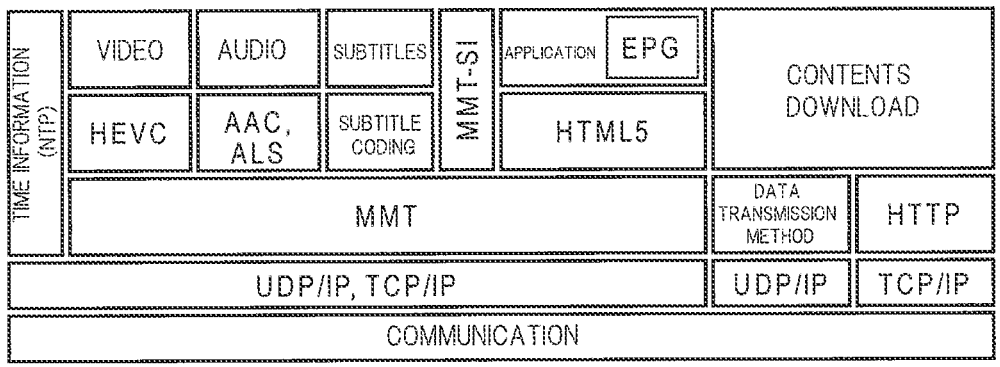
FIG. 4
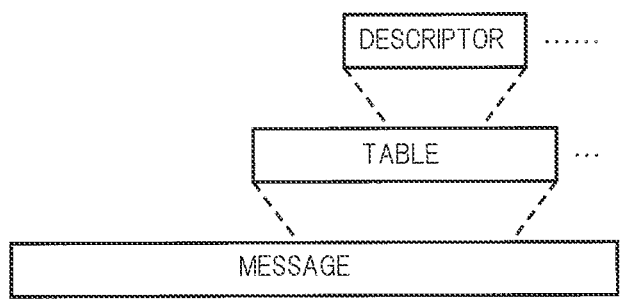

FIG. 5A

| Table Name | Outline of Function |
|---|---|
| Network Information Table for TLV (TLV-NIT) | Transmitting information that correlates information of a transmission path such as a modulation frequency with a broadcasting program in TLV packet transmission |
| Address Map Table (AMT) | Transmitting information that correlates a service identifier for identifying a broadcasting program number with an IP packet |
| Table Set by Provider | |

FIG. 5B

| Descriptor Name | Outline of Function |
|---|---|
| Service List Descriptor | Describing a list of sub-channels and types of the sub-channels |
| Satellite Delivery System Descriptor | Describing physical conditions for a satellite transmission path |
| System Management Descriptor | Distinguishing broadcasting and non-broadcasting |
| Network Name Descriptor | Describing a network name |
| Descriptor Set by Provider | |

FIG. 6A

| Message Name | Outline of Function |
|---|---|
| Package Access (PA) Message | Serving as an entry point for MMT-SI and transmitting MMT-SI table |
| M2 Section Message | Transmitting section extension format of MPEG-2 Systems |
| CA Message | Transmitting information related to conditional access method |
| M2 Short Section Message | Transmitting section short format of MPEG-2 Systems |
| Data Transmission Message | Transmitting a table related to data transmission |
| Message Set by Provider | |

FIG. 6B

| Table Name | Outline of Function |
|---|---|
| MMT Package Table (MPT) | Providing package configuration information such as a list of assets and locations thereof |
| Package List Table (PLT) | Presenting a list of IP data flows for transmitting PA messages of MMT packages provided as a broadcasting service, packet IDs, and IP data flows for transmitting IP services |
| Layout Configuration Table (LCT) | Correlating layout information for presentation with layout numbers |
| Entitlement Control Message (ECM) | Transmitting common information made up of program information (program data, a descrambling key, etc.) and control information |
| Entitlement Management Message (EMM) | Transmitting personal information including contract information of individual subscribers and a work key for decoding encoded common information |
| CA Table (MH) (Conditional Access Table) | Transmitting a descriptor related to conditional access method |
| Download Control Message (DCM) | Transmitting key-related information including a key for decoding a transmission path code for downloading |
| Download Management Message (DMM) | Transmitting key-related information including a download key for decoding encoded DCM |
| MH-Event Information Table (MH-EIT) | Transmitting program-related information such as program name, broadcasting date, and details of program |
| MH-Application Information Table (MH-AIT) | Transmitting dynamic control information related to application and additional information necessary for execution of the application |
| MH-Broadcaster Information Table (MH-BIT) | Providing information of broadcasters present on the network |
| MH-Software Download Trigger Table (MH-SDTT) | Transmitting download announcement information such as a service ID, schedule information, and the type of a receiver to be updated |
| MH-Service Description Table (MH-SDT) | Transmitting information related to a sub-channel such as the name of the sub-channel and the name of a broadcaster |
| MH-Time Offset Table (MH-TOT) | Transmitting current date/time and offset time between the actual time and display time to human system |
| MH-Common Data Table (MH-CDT) | Transmitting data such as logo mark of provider that is necessary for receivers in common and is assumed to be stored in a non-volatile memory |
| Data Directory Management (DDM) Table | Providing directory configuration of files making up an application |
| Data Asset Management (DAM) Table | Providing the configuration of MPU in an asset and version information of each MPU |
| Data Content Configuration (DCC) Table | Providing configuration information of files as data contents |
| Event Message Table (EMT) | Transmitting information related to event message |
| Table Set by Provider | |

FIG. 6C

| Descriptor Name | Outline of Function |
|---|---|
| Asset Group Descriptor | Providing a relation of an asset group and priority in the group |
| Event Package Descriptor | Providing the corresponding relation between an event representing a program and a package |
| Background Color Specifying Descriptor | Specifying the background color of the rearmost plane in layout specification |
| MPU Presentation Region Specifying Descriptor | Providing the location of presentation of MPU |
| MPU Timestamp Descriptor | Providing the time of presentation of MPU |
| Dependency Relation Descriptor | Providing asset IDs for assets dependent on each other |
| Access Control Descriptor | Identifying the conditional access method |
| Scramble Method Descriptor | Identifying a scramble subsystem |
| Message Authentication Method Descriptor | Identifying a message authentication method |
| Emergency Information Descriptor (MH) | Providing description of information and functions necessary as emergency warning signal |
| MH-MPEG-4 Audio Descriptor | Describing basic information for specifying coding parameters of an MPEG-4 audio stream |
| MH-MPEG-4 Audio Extension Descriptor | Describing a profile, level, and specific setting of coding method of an MPEG-4 audio stream |
| MH-HEVC Video Descriptor | Describing basic coding parameters for a video stream (HEVC stream) defined in ITU-T Recommendation H.265 and ISO/IEC 23008-2 |
| MH-Link Descriptor | Describing link with another sub-channel |
| MH-Event Group Descriptor | Describing information on grouping of a plurality of events |
| MH-Service List Descriptor | Describing a list of sub-channels and their types |
| MH-Short Format Event Descriptor | Describing a program name and a brief description of the program |
| MH-Extension Format Event Descriptor | Describing detailed information of a program |
| Video Component Descriptor | Describing parameters and descriptions for a video signal among program element signals |
| MH-Stream Identifying Descriptor | Identifying individual program element signals |
| MH-Content Descriptor | Describing the genre of a program |
| MH-Parental Rate Descriptor | Describing an age-based viewing restriction |
| MH-Audio Component Descriptor | Describing parameters for an audio signal among program element signals |
| MH-Target Area Descriptor | Describing a target area |
| MH-Series Descriptor | Describing series information across a plurality of events |
| MH-SI Transmission Parameter Descriptor | Describing SI transmission parameters (cycle group, retransmission cycle, etc.) |
| MH-Broadcaster Name Descriptor | Describing the name of a broadcaster |
| MH-Service Descriptor | Describing the name of a sub-channel and the name of a provider thereof |
| IP Data Flow Descriptor | Describing information of an IP data flow included in a service |

FIG. 6D

| Descriptor Name | Outline of Function |
|---|---|
| MH-CA Startup Descriptor | Describing information related to start of a CAS program having a conditional access function |
| MH-Type Descriptor | Indicating the type of a file transmitted by an application transmission method |
| MH-Info Descriptor | Describing information related to MPU or an item |
| MH-Expire Descriptor | Describing the expiration date of an item |
| MH-Compression Type Descriptor | Indicating a compression algorithm for an item to be transmitted in a compressed form and the number of bytes of the item before compression |
| MH-Data Coding Method Descriptor | Identifying a data coding method |
| UTC-NPT Reference Descriptor | Transmitting information of the relation between NPT and UTC |
| Event Message Descriptor | Transmitting general information related to event messages |
| MH-Local Time Offset Descriptor | Describing an offset time between the actual time (e.g., UTC + 9 hours) and display time to human system when a daylight saving time system is implemented |
| MH-Component Group Descriptor | Describing information on grouping of a plurality of components |
| MH-Logo Transmission Descriptor | Describing pointing to a character string for a simplified logo and a logo in a CDT format |
| MPU Extension Timestamp Descriptor | Providing a time to decode an access unit in MPU |
| MPU Download Contents Descriptor | Describing property information of contents downloaded using MPU |
| MH-Network Download Contents Descriptor | Describing property information of contents downloaded through network |
| MH-Application Descriptor | Describing information of an application |
| MH-Transmission Protocol Descriptor | Specifying a transmission protocol and describing location information of an application depending on the transmission protocol |
| MH-Simplified Application Location Descriptor | Describing the details of an acquirer of an application |
| MH-Application Boundary Authority Setting Descriptor | Describing setting of an application boundary and setting of an authority for access to broadcasting resources for each region (URL) |
| MH-Startup Priority Information Descriptor | Describing the startup priority of an application |
| MH-Cache Information Descriptor | Describing information of cache control for saving resources making up an application in a cache |
| MH-Probability-Applied Delay Descriptor | Describing setting of a delay time by which the time of execution of application control is probabilistically delayed |
| Link Destination PU Descriptor | Describing information of a presentation unit to be link destination |
| Lock Cache Specifying Descriptor | Describing specification of a file to be cached and locked |
| Unlock Cache Specifying Descriptor | Describing specification of a file to be unlocked |
| Descriptor Set by Provider |  |

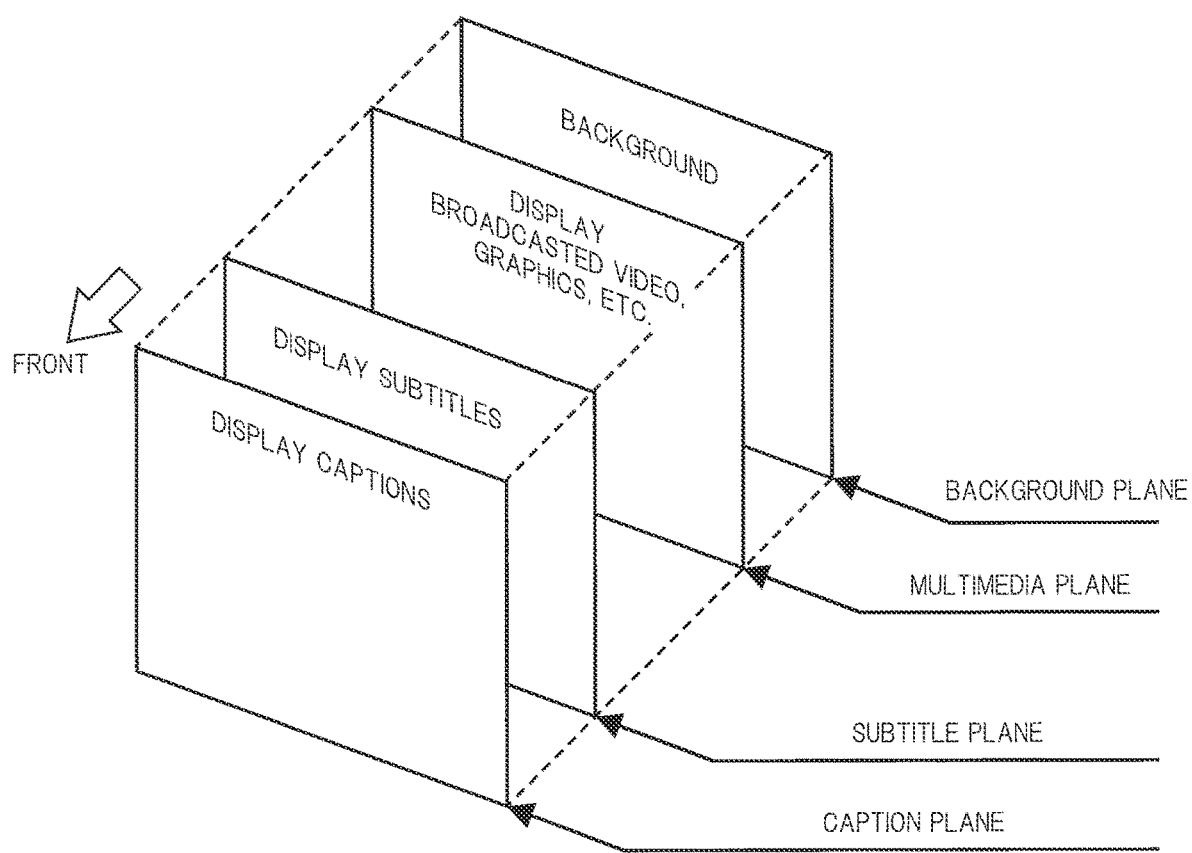

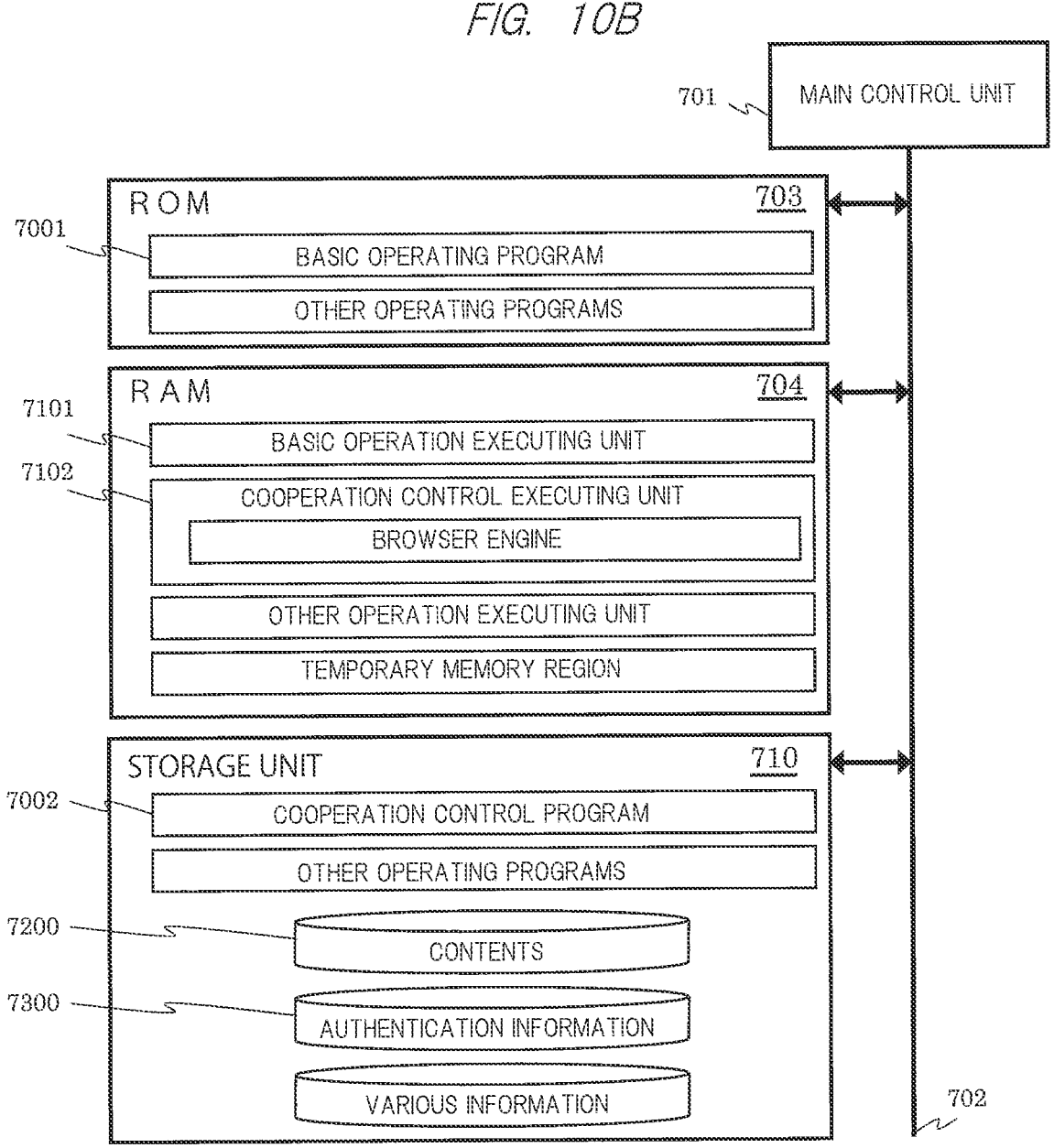

FIG. 11A

| DATA STRUCTURE OF MH-TOT | NUMBER OF BITS | DATA NOTATION |
|---|---|---|
| MH-Time_Offset_Table(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     JST_time | 40 | bslbf |
|     reserved | 4 | bslbf |
|     descriptors_loop_length | 12 | uimsbf |
|     for(i=0; i<N; i++){ | | |
|         descriptor() | | |
|     } | | |
|     CRC_32 | 32 | rpchof |
| } | | |

FIG. 11B

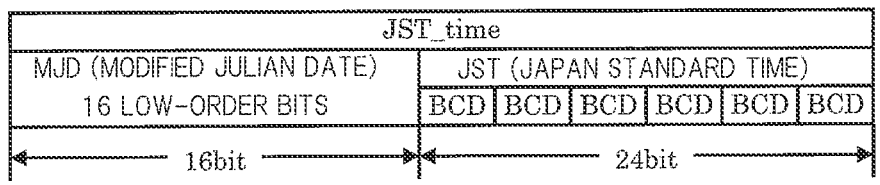

FIG. 12

| FIRST CALCULATION METHOD (MJD IS EQUAL TO OR LARGER THAN 32768) |
|---|
| $Y' = int[(MJD - 15078.2) / 365.25]$ |
| $M' = int\{[MJD - 14956.1 - int(Y' \times 365.25)] / 30.6001\}$ |
| $D = MJD - 14956 - int(Y' \times 365.25) - int(M' \times 30.6001)$ |
| BUT, WHEN M'=14 OR 15, K=1 |
|        WHEN M'≠14 AND 15, K=0 |
| $Y = Y' + K$ |
| $M = M' - 1 - K \times 12$ |
| Y: NUMBER OF YEARS COUNTED FROM YEAR OF 1900 |
| M: MONTH |
| D: DAY |

| SECOND CALCULATION METHOD (MJD IS SMALLER THAN 32768) |
|---|
| $Y' = int[((MJD + 65536) - 15078.2) / 365.25]$ |
| $M' = int\{[(MJD + 65536) - 14956.1 - int(Y' \times 365.25)] / 30.6001\}$ |
| $D = (MJD + 65536) - 14956 - int(Y' \times 365.25) - int(M' \times 30.6001)$ |
| BUT, WHEN M'=14 OR 15, K=1 |
|        WHEN M'≠14 AND 15, K=0 |
| $Y = Y' + K$ |
| $M = M' - 1 - K \times 12$ |
| Y: NUMBER OF YEARS COUNTED FROM YEAR OF 1900 |
| M: MONTH |
| D: DAY |

FIG. 13A

| CONFIGURATION OF NTP FORMAT | NUMBER OF BITS | DATA NOTATION |
|---|---|---|
| Network_Time_Protocol_Data(){ | | |
|     leap_indicator | 2 | uimsbf |
|     version | 3 | uimsbf |
|     mode | 3 | uimsbf |
|     stratum | 8 | uimsbf |
|     poll | 8 | uimsbf |
|     precision | 8 | uimsbf |
|     root_delay | 32 | uimsbf |
|     root_dispersion | 32 | uimsbf |
|     reference_identification | 32 | uimsbf |
|     reference_timestamp | 64 | uimsbf |
|     origin_timestamp | 64 | uimsbf |
|     receive_timestamp | 64 | uimsbf |
|     transmit_timestamp | 64 | uimsbf |
| } | | |

FIG. 13B

| DATA STRUCTURE OF MPU TIMESTAMP DESCRIPTOR | NUMBER OF BITS | DATA NOTATION |
|---|---|---|
| MPU_Timestamp_Descriptor(){ | | |
|     descriptor_tag | 16 | uimsbf |
|     descriptor_length | 8 | uimsbf |
|     for(i=0; i<N; i++){ | | |
|         mpu_sequence_number | 32 | uimsbf |
|         mpu_presentation_time | 64 | uimsbf |
|     } | | |
| } | | |

FIG. 13C

| DATA STRUCTURE OF TIME INFORMATION IN TMCC EXTENSION INFORMATION REGION | NUMBER OF BITS | DATA NOTATION |
|---|---|---|
| TMCC_Time_Information (){ | | |
|     reserved | 6 | bslbf |
|     common_time_indicator | 1 | bslbf |
|     extended_payload_indicator | 1 | bslbf |
|     if(common_time_indicator==0){ | | |
|         time_flag | 16 | bslbf |
|         for(i=0; i<16; i++){ | | |
|             delta | 32 | simsbf |
|             transmit_timestamp | 64 | uimsbf |
|         } | | |
|     } | | |
|     if(common_time_indicator==1){ | | |
|         reserved | 16 | bslbf |
|         delta | 32 | simsbf |
|         transmit_timestamp | 64 | uimsbf |
|     } | | |
|     next_extended_payload_indicator | 16 | uimsbf |
| } | | |

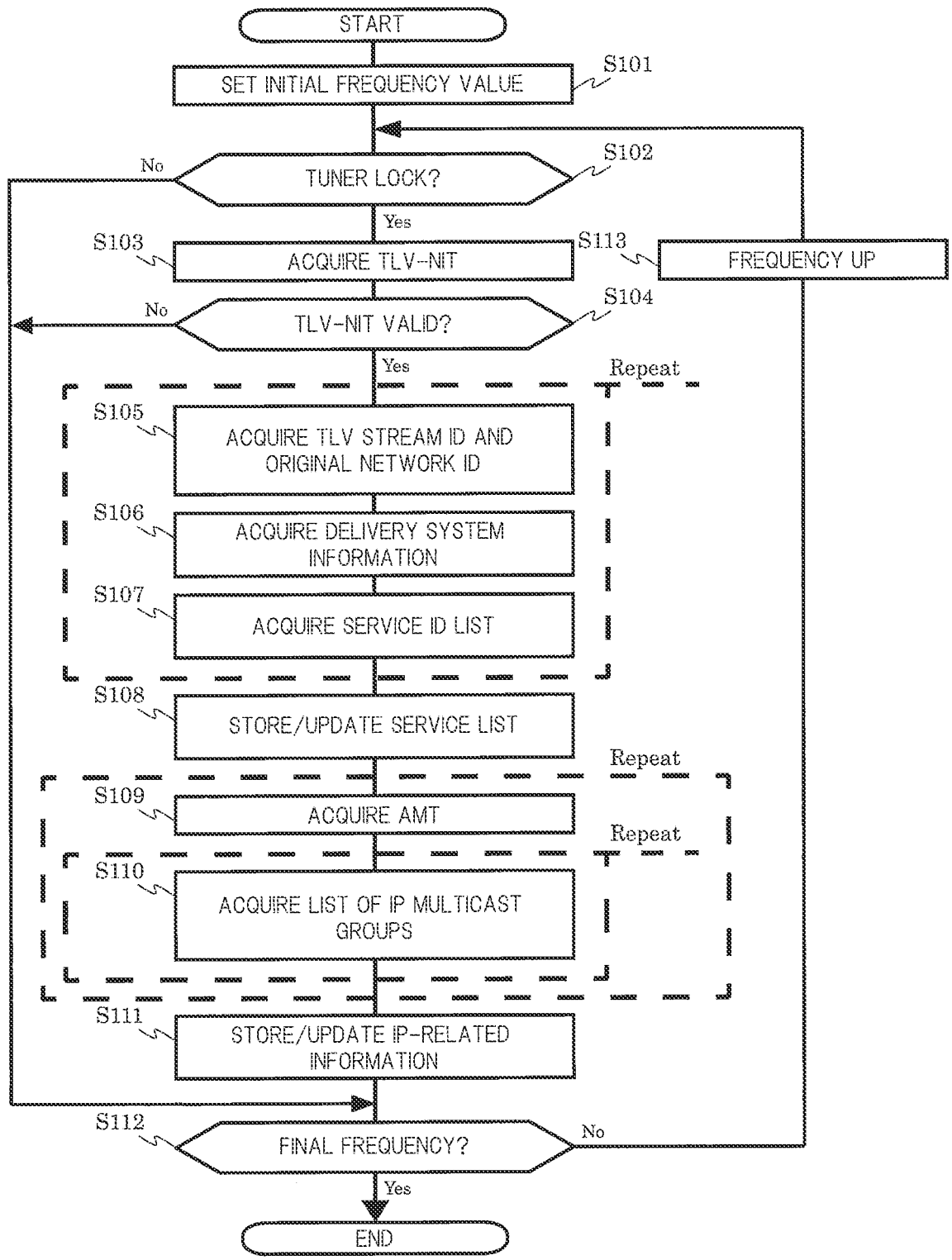

FIG. 15A

| DATA STRUCTURE OF TLV-NIT | NUMBER OF BITS | DATA NOTATION |
|---|---|---|
| TLV_Network_Information_Table(){ | | |
|     table_id | 8 | uimsbf |
|     section_syntax_indicator | 1 | bslbf |
|     '1' | 1 | bslbf |
|     '11' | 2 | bslbf |
|     section_length | 12 | uimsbf |
|     network_id | 16 | uimsbf |
|     '11' | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     network_descriptors_length | 12 | bslbf |
|     for(i=0; i<N; i++){ | | |
|         descriptor() | | |
|     } | | |
|     reserved_future_use | 4 | bslbf |
|     TLV_stream_loop_length | 12 | uimsbf |
|     for(i=0; i<N; i++){ | | |
|         tlv_stream_id | 16 | uimsbf |
|         original_network_id | 16 | uimsbf |
|         reserved_future_use | 4 | bslbf |
|         tlv_stream_descriptors_length | 12 | uimsbf |
|         for(j=0; j<M; j++){ | | |
|             descriptor() | | |
|         } | | |
|     } | | |
|     CRC_32 | 32 | rpchof |
| } | | |

FIG. 15B

| DATA STRUCTURE OF SATELLITE DELIVERY SYSTEM DESCRIPTOR | NUMBER OF BITS | DATA NOTATION |
|---|---|---|
| Satellite_Delivery_System_Descriptor(){ | | |
|     descriptor_tag | 8 | uimsbf |
|     descriptor_length | 8 | uimsbf |
|     frequency | 32 | bslbf |
|     orbital_position | 16 | bslbf |
|     west_east_flag | 1 | bslbf |
|     polarisation | 2 | bslbf |
|     modulation | 5 | bslbf |
|     symbol_rate | 28 | bslbf |
|     FEC_inner | 4 | bslbf |
| } | | |

FIG. 15C

| DATA STRUCTURE OF SERVICE LIST DESCRIPTOR | NUMBER OF BITS | DATA NOTATION |
|---|---|---|
| Service_List_Descriptor(){ | | |
|     descriptor_tag | 8 | uimsbf |
|     descriptor_length | 8 | uimsbf |
|     for(i=0; i<N; i++){ | | |
|         service_id | 16 | uimsbf |
|         service_type | 8 | uimsbf |
|     } | | |
| } | | |

FIG. 15D

| DATA STRUCTURE OF AMT | NUMBER OF BITS | DATA NOTATION |
|---|---|---|
| Address_Map_Table(){ | | |
|     table_id | 8 | uimsbf |
|     section_syntax_indicator | 1 | bslbf |
|     '1' | 1 | bslbf |
|     '11' | 2 | bslbf |
|     section_length | 12 | uimsbf |
|     table_id_extension | 16 | uimsbf |
|     '11' | 2 | bslbf |
|     version_number | 5 | uimsbf |
|     current_next_indicator | 1 | bslbf |
|     section_number | 8 | uimsbf |
|     last_section_number | 8 | uimsbf |
|     num_of_service_id | 10 | uimsbf |
|     reserved_future_use | 6 | bslbf |
|     for(i=0; i<num_of_service_id; i++){ | | |
|         service_id | 16 | uimsbf |
|         ip_version | 1 | bslbf |
|         reserved_future_use | 5 | bslbf |
|         service_loop_length | 10 | uimsbf |
|         if(ip_version=='0'){ | | |
|             src_address_32 | 32 | bslbf |
|             src_address_mask_32 | 8 | uimsbf |
|             dst_address_32 | 32 | bslbf |
|             dst_address_mask_32 | 8 | uimsbf |
|         } | | |
|         else if(ip_version=='1'){ | | |
|             src_address_128 | 128 | bslbf |
|             src_address_mask_128 | 8 | uimsbf |
|             dst_address_128 | 128 | bslbf |
|             dst_address_mask_128 | 8 | uimsbf |
|         } | | |
|         for(j=0; j<M; j++){ | | |
|             private_data_byte | 8 | bslbf |
|         } | | |
|     } | | |
|     CRC_32 | 32 | rpchof |
| } | | |

FIG. 17

| DATA STRUCTURE OF MPT | NUMBER OF BITS | DATA NOTATION |
|---|---|---|
| MMT_Package_Table(){ | | |
|     table_id | 8 | uimsbf |
|     version | 8 | uimsbf |
|     length | 16 | uimsbf |
|     reserved | 6 | bslbf |
|     MPT_mode | 2 | bslbf |
|     MMT_package_id_length | 8 | uimsbf |
|     for(i=0; i<N; i++){ | | |
|         MMT_package_id_byte | 8 | bslbf |
|     } | | |
|     MPT_descriptors_length | 16 | uimsbf |
|     for(i=0; i<N; i++){ | | |
|         MPT_descriptors_byte | 8 | bslbf |
|     } | | |
|     number_of_assets | 8 | uimsbf |
|     for(i=0; i<N; i++){ | | |
|         identifier_type | 8 | uimsbf |
|         asset_id_scheme | 32 | uimsbf |
|         asset_id_length | 8 | uimsbf |
|         for(j=0; j<M; j++){ | | |
|             asset_id_byte | 8 | uimsbf |
|         } | | |
|         asset_type | 32 | char |
|         reserved | 7 | bslbf |
|         asset_clock_relation_flag | 1 | bslbf |
|         location_count | 8 | uimsbf |
|         for(j=0; j<M; j++){ | | |
|             MMT_general_location_info() | | |
|         } | | |
|         asset_descriptors_length | 16 | uimsbf |
|         for(j=0; j<M; j++){ | | |
|             asset_descriptors_byte | 8 | bslbf |
|         } | | |
|     } | | |
| } | | |

FIG. 18

| DATA STRUCTURE OF LCT | NUMBER OF BITS | DATA NOTATION |
|---|---|---|
| Layout_Configuration_Table(){ | | |
|     table_id | 8 | uimsbf |
|     version | 8 | uimsbf |
|     length | 16 | uimsbf |
|     number_of_loop | 8 | uimsbf |
|     for(i=0; i<N; i++){ | | |
|         layout_number | 8 | uimsbf |
|         device_id | 8 | uimsbf |
|         number_of_region | 8 | uimsbf |
|         for(j=0; j<M; j++){ | | |
|             region_number | 8 | uimsbf |
|             left_top_pos_x | 8 | uimsbf |
|             left_top_pos_y | 8 | uimsbf |
|             right_down_pos_x | 8 | uimsbf |
|             right_down_pos_y | 8 | uimsbf |
|             layer_order | 8 | uimsbf |
|         } | | |
|     } | | |
|     descriptor() | | |
| } | | |

FIG. 19A

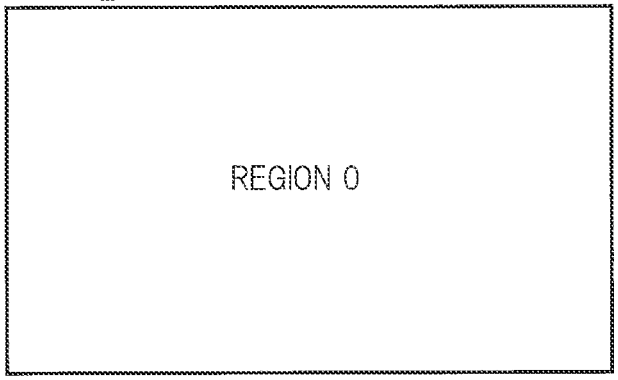

| number_of_loop | | 1 |
|---|---|---|
| | layout_number | 0 |
| | device_id | 0 |
| | number_of_region | 1 |
| | region_number | 0 |
| | left_top_pos_x | 0 |
| | left_top_pos_y | 0 |
| | right_down_pos_x | 100 |
| | right_down_pos_y | 100 |
| | layer_order | 0 |

FIG. 19B

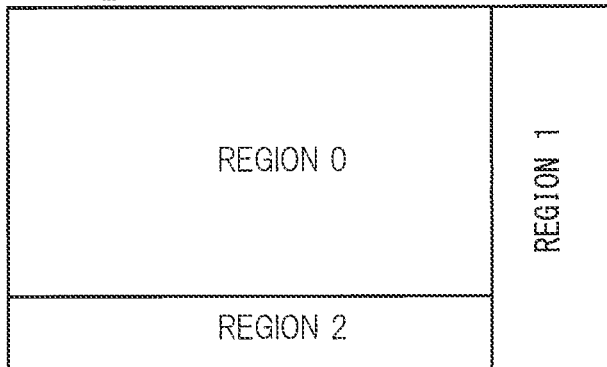

| number_of_loop | | 1 |
|---|---|---|
| | layout_number | 1 |
| | device_id | 0 |
| | number_of_region | 3 |
| | region_number | 0 |
| | left_top_pos_x | 0 |
| | left_top_pos_y | 0 |
| | right_down_pos_x | 80 |
| | right_down_pos_y | 80 |
| | layer_order | 0 |
| | region_number | 1 |
| | left_top_pos_x | 80 |
| | left_top_pos_y | 0 |
| | right_down_pos_x | 100 |
| | right_down_pos_y | 100 |
| | layer_order | 0 |
| | region_number | 2 |
| | left_top_pos_x | 0 |
| | left_top_pos_y | 80 |
| | right_down_pos_x | 80 |
| | right_down_pos_y | 100 |
| | layer_order | 0 |

FIG. 19C

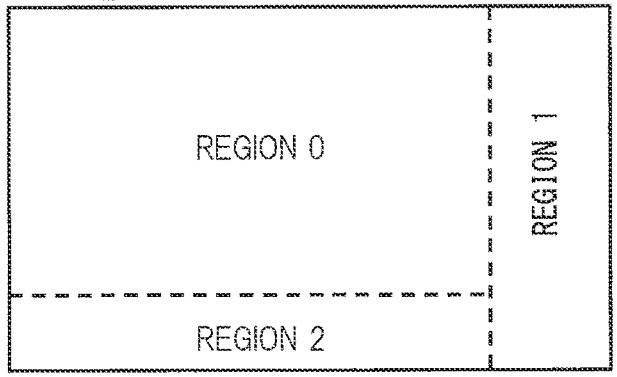

LAYOUT NUMBER: 2
(REGION 1 AND REGION 2 ARE IN
FRONT OF REGION 0)

| | | |
|---|---|---|
| number_of_loop | | 1 |
| | layout_number | 2 |
| | device_id | 0 |
| | number_of_region | 3 |
| | region_number | 0 |
| | left_top_pos_x | 0 |
| | left_top_pos_y | 0 |
| | right_down_pos_x | 100 |
| | right_down_pos_y | 100 |
| | layer_order | 0 |
| | region_number | 1 |
| | left_top_pos_x | 80 |
| | left_top_pos_y | 0 |
| | right_down_pos_x | 100 |
| | right_down_pos_y | 100 |
| | layer_order | 1 |
| | region_number | 2 |
| | left_top_pos_x | 0 |
| | left_top_pos_y | 80 |
| | right_down_pos_x | 80 |
| | right_down_pos_y | 100 |
| | layer_order | 1 |

FIG. 19D

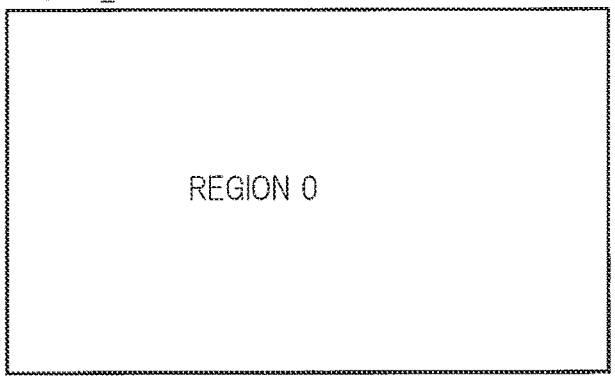

LAYOUT NUMBER: 3

| | | |
|---|---|---|
| number_of_loop | | 2 |
| | layout_number | 3 |
| | device_id | 0 |
| | number_of_region | 1 |
| | region_number | 0 |
| | left_top_pos_x | 0 |
| | left_top_pos_y | 0 |
| | right_down_pos_x | 100 |
| | right_down_pos_y | 100 |
| | layer_order | 0 |
| | layout_number | 3 |
| | device_id | 1 |
| | number_of_region | 1 |
| | region_number | 1 |
| | left_top_pos_x | 0 |
| | left_top_pos_y | 0 |
| | right_down_pos_x | 100 |
| | right_down_pos_y | 100 |
| | layer_order | 0 |

FIG. 21

| DATA STRUCTURE OF MH-EIT | NUMBER OF BITS | DATA NOTATION |
|---|---|---|
| MH-Event_Information_Table(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     service_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     tlv_stream_id | 16 | uimsbf |
|     original_network_id | 16 | uimsbf |
|     segment_last_section_number | 8 | uimsbf |
|     last_table_id | 8 | uimsbf |
|     for(i=0; i<N; i++){ | | |
|         event_id | 16 | uimsbf |
|         start_time | 40 | bslbf |
|         duration | 24 | uimsbf |
|         running_status | 3 | uimsbf |
|         free_CA_mode | 1 | bslbf |
|         descritors_loop_length | 12 | uimsbf |
|         for(j=0; j<M; j++){ | | |
|             descriptor() | | |
|         } | | |
|     } | | |
|     CRC_32 | 32 | rpchof |
| } | | |

FIG. 22C (A) WITH NETWORK CONNECTION (B) WITHOUT NETWORK CONNECTION

FIG. 23
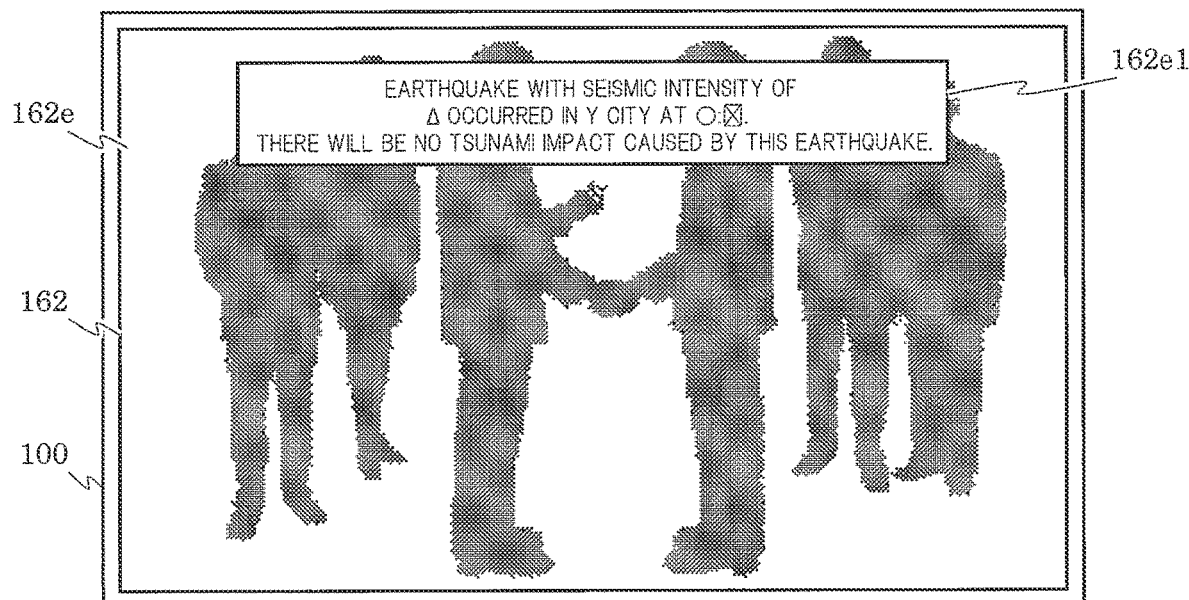
(A) EMERGENCY BROADCASTING MESSAGE DISPLAYED ON BROADCASTING PROGRAM SCREEN
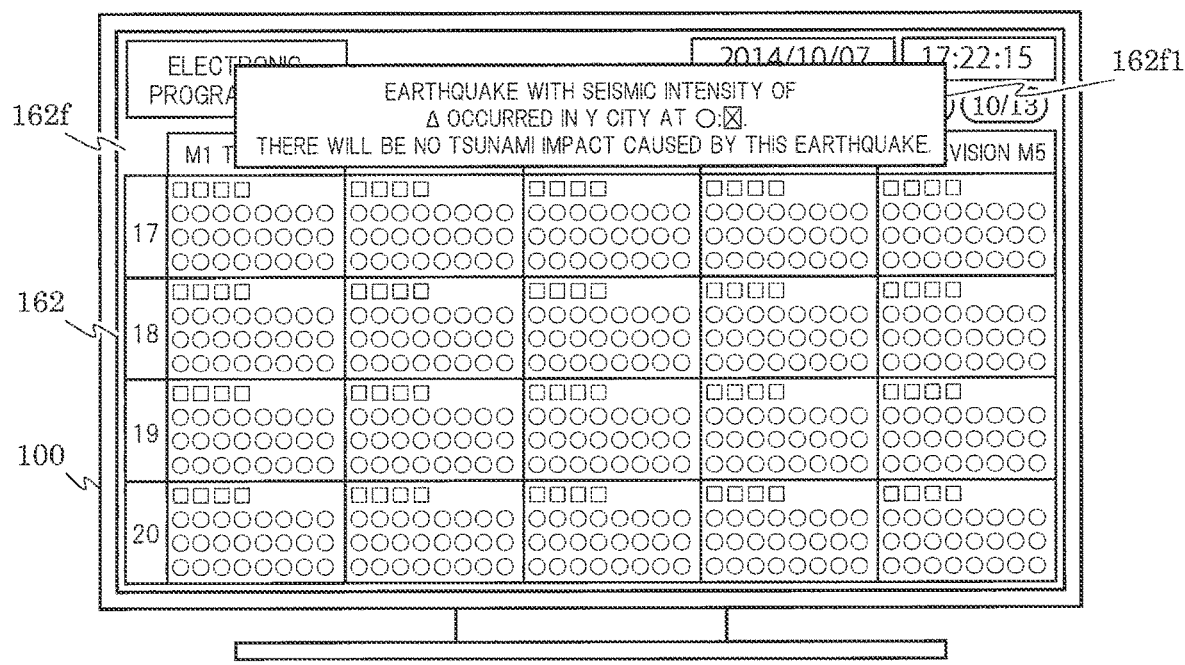
(B) EMERGENCY BROADCASTING MESSAGE DISPLAYED ON EPG SCREEN FIG. 25
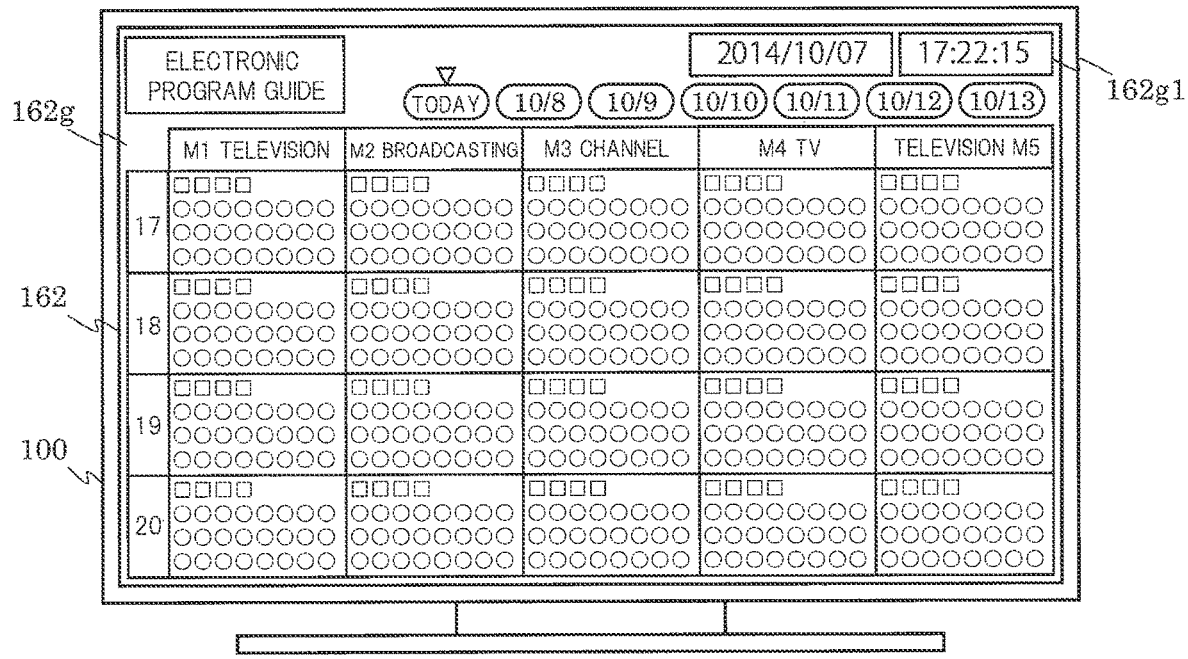
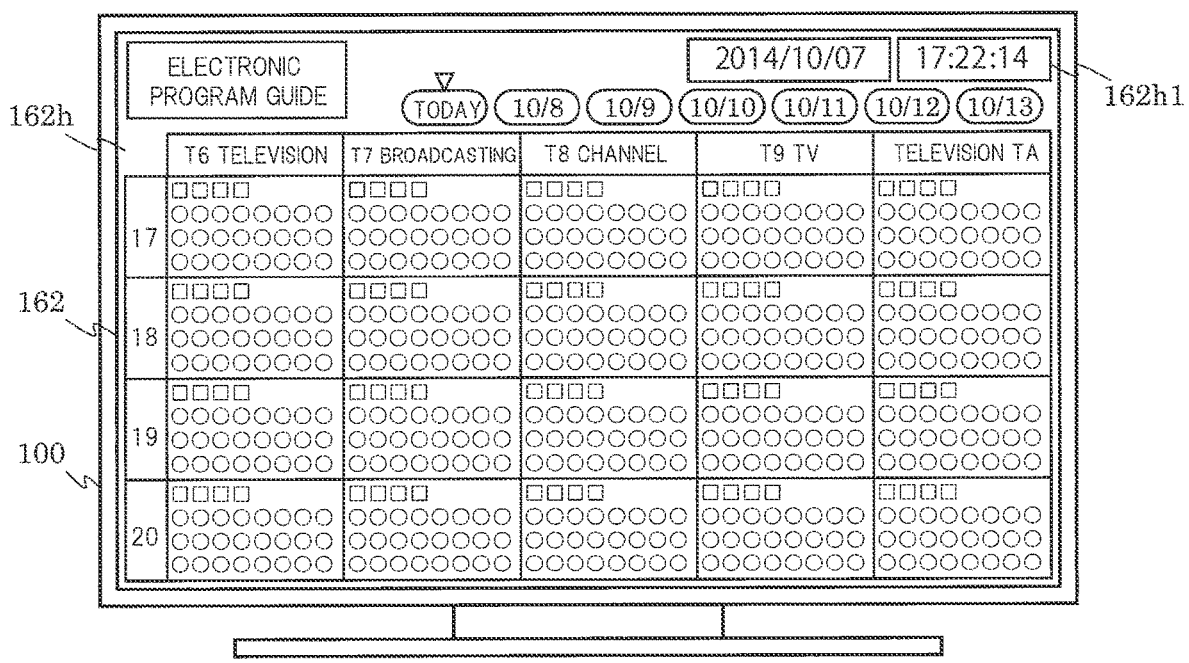

FIG. 26

| | RECEPTION STATE OF BROADCASTING SERVICE | | | |
|---|---|---|---|---|
| MMT BROADCASTING SERVICE | NOT RECEIVABLE | RECEIVABLE | NOT RECEIVABLE | RECEIVABLE |
| MPEG2-TS BROADCASTING SERVICE | NOT RECEIVABLE | NOT RECEIVABLE | RECEIVABLE | RECEIVABLE |
| REFERENCE SOURCE OF CURRENT TIME INFORMATION | — | MH-TOT | TOT | TOT |

FIG. 27A
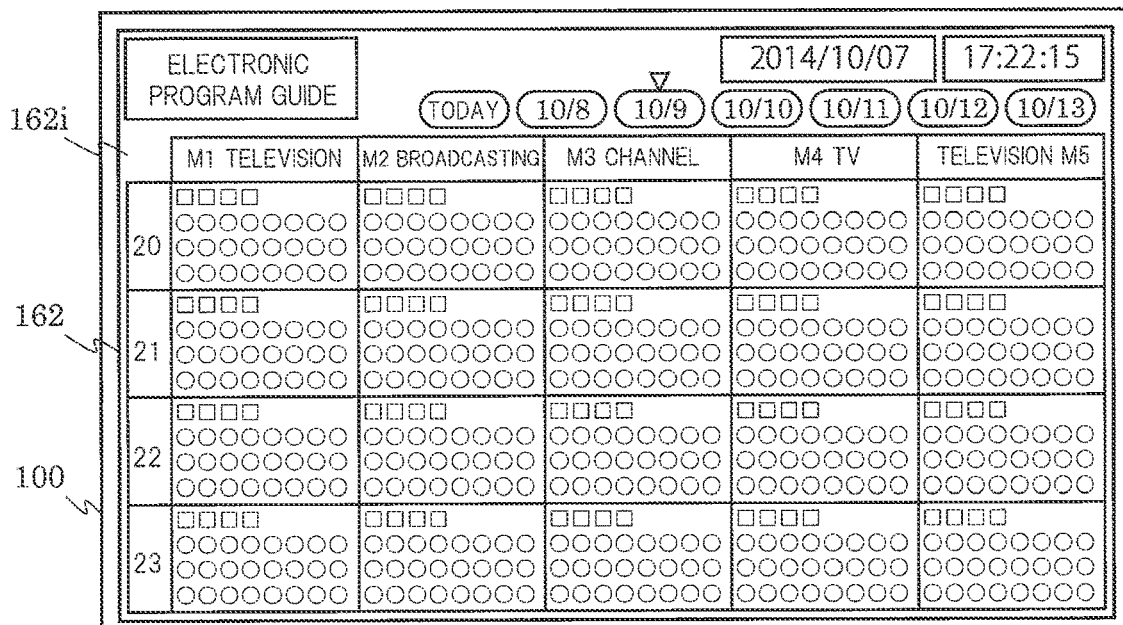
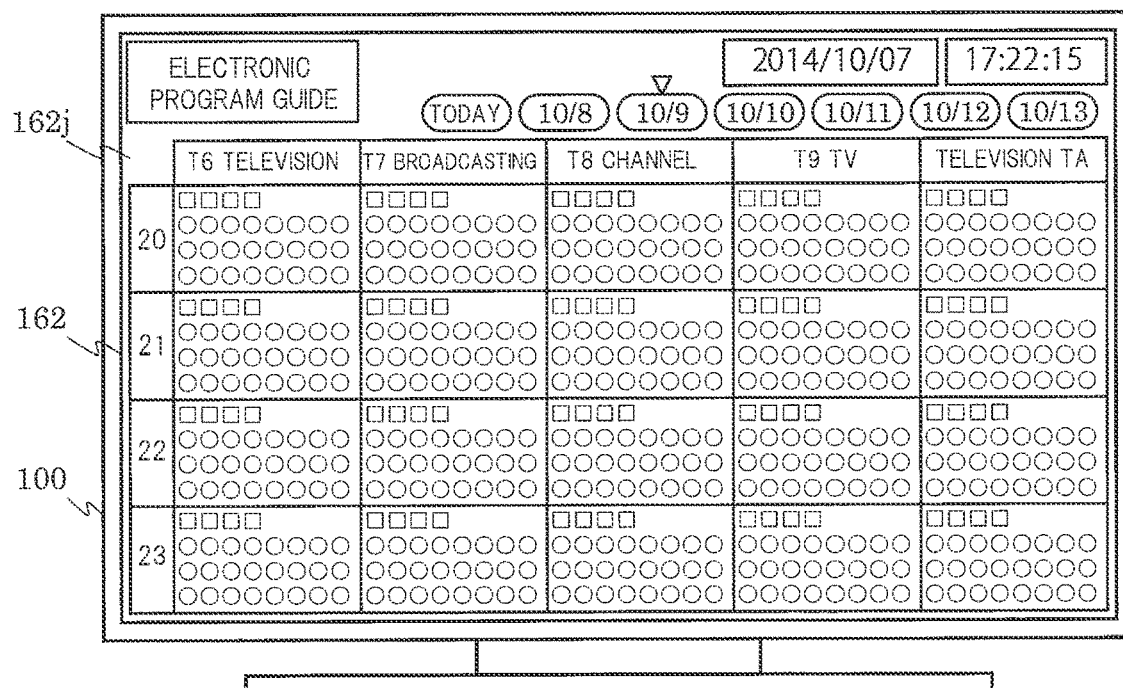

FIG. 32A

| FUNCTION IDENTIFYING INFORMATION | MMT DATA DECODING PROCESS IN OUTPUT DESTINATION DEVICE | SUPPORTED | SUPPORTED | UNSUPPORTED OR UNIDENTIFIABLE | UNSUPPORTED OR UNIDENTIFIABLE |
|---|---|---|---|---|---|
| | MPEG2-TS DATA DECODING PROCESS IN OUTPUT DESTINATION DEVICE | SUPPORTED | UNSUPPORTED OR UNIDENTIFIABLE | SUPPORTED | UNSUPPORTED OR UNIDENTIFIABLE |
| OUTPUT CONTROL EXAMPLE 1 FROM BROADCAST RECEIVING APPARATUS | | OUTPUT MMT DATA | OUTPUT MMT DATA | OUTPUT MPEG2-TS DATA | FOLLOW OUTPUT CONTROL EXAMPLE 4 |
| OUTPUT CONTROL EXAMPLE 2 FROM BROADCAST RECEIVING APPARATUS | | OUTPUT MPEG2-TS DATA | OUTPUT MMT DATA | OUTPUT MPEG2-TS DATA | FOLLOW OUTPUT CONTROL EXAMPLE 4 |
| OUTPUT CONTROL EXAMPLE 3 FROM BROADCAST RECEIVING APPARATUS | | FOLLOW SET ORDER OF PRIORITY | OUTPUT MMT DATA | OUTPUT MPEG2-TS DATA | FOLLOW OUTPUT CONTROL EXAMPLE 4 |

FIG. 32B

| FUNCTION IDENTIFYING INFORMATION | MMT DATA DECODING PROCESS IN OUTPUT DESTINATION DEVICE | UNSUPPORTED | UNSUPPORTED | UNIDENTIFIABLE | UNIDENTIFIABLE |
|---|---|---|---|---|---|
| | MPEG2-TS DATA DECODING PROCESS IN OUTPUT DESTINATION DEVICE | UNSUPPORTED | UNIDENTIFIABLE | UNSUPPORTED | UNIDENTIFIABLE |
| OUTPUT CONTROL EXAMPLE 4-A1 FROM BROADCAST RECEIVING APPARATUS | | OUTPUT NO DATA | OUTPUT NO DATA | OUTPUT NO DATA | OUTPUT NO DATA |
| OUTPUT CONTROL EXAMPLE 4-A2 FROM BROADCAST RECEIVING APPARATUS | | OUTPUT NO DATA | OUTPUT MPEG2-TS DATA | OUTPUT MMT DATA | OUTPUT MPEG2-TS DATA |
| OUTPUT CONTROL EXAMPLE 4-A3 FROM BROADCAST RECEIVING APPARATUS | | OUTPUT NO DATA | OUTPUT MPEG2-TS DATA | OUTPUT MMT DATA | OUTPUT MMT DATA |
| OUTPUT CONTROL EXAMPLE 4-A4 FROM BROADCAST RECEIVING APPARATUS | | OUTPUT NO DATA | OUTPUT MPEG2-TS DATA | OUTPUT MMT DATA | OUTPUT DATA BY FOLLOWING SET ORDER OF PRIORITY |
| OUTPUT CONTROL EXAMPLE 4-B1 FROM BROADCAST RECEIVING APPARATUS | | OUTPUT MPEG2-TS DATA | OUTPUT MPEG2-TS DATA | OUTPUT MPEG2-TS DATA | OUTPUT MPEG2-TS DATA |
| OUTPUT CONTROL EXAMPLE 4-B2 FROM BROADCAST RECEIVING APPARATUS | | OUTPUT MPEG2-TS DATA | OUTPUT MPEG2-TS DATA | OUTPUT MMT DATA | OUTPUT MPEG2-TS DATA |
| OUTPUT CONTROL EXAMPLE 4-C1 FROM BROADCAST RECEIVING APPARATUS | | OUTPUT MMT DATA | OUTPUT MMT DATA | OUTPUT MMT DATA | OUTPUT MMT DATA |
| OUTPUT CONTROL EXAMPLE 4-C2 FROM BROADCAST RECEIVING APPARATUS | | OUTPUT MMT DATA | OUTPUT MPEG2-TS DATA | OUTPUT MMT DATA | OUTPUT MMT DATA |
| OUTPUT CONTROL EXAMPLE 4-D FROM BROADCAST RECEIVING APPARATUS | | OUTPUT DATA BY FOLLOWING SET ORDER OF PRIORITY | OUTPUT DATA BY FOLLOWING SET ORDER OF PRIORITY | OUTPUT DATA BY FOLLOWING SET ORDER OF PRIORITY | OUTPUT DATA BY FOLLOWING SET ORDER OF PRIORITY |
| OUTPUT CONTROL EXAMPLE 4-E FROM BROADCAST RECEIVING APPARATUS | | DISPLAY MESSAGE FOR ASKING USER TO SELECT OUTPUT FORMAT AND OUTPUT DATA IN SELECTED FORMAT | DISPLAY MESSAGE FOR ASKING USER TO SELECT OUTPUT FORMAT AND OUTPUT DATA IN SELECTED FORMAT | DISPLAY MESSAGE FOR ASKING USER TO SELECT OUTPUT FORMAT AND OUTPUT DATA IN SELECTED FORMAT | DISPLAY MESSAGE FOR ASKING USER TO SELECT OUTPUT FORMAT AND OUTPUT DATA IN SELECTED FORMAT |

FIG. 33

| DATA STRUCTURE OF MPU EXTENSION TIMESTAMP DESCRIPTOR | NUMBER OF BITS | DATA NOTATION |
|---|---|---|
| MPU_Extended_Timestamp_Descriptor(){ | | |
|     descriptor_tag | 16 | uimsbf |
|     descriptor_length | 8 | uimsbf |
|     reserved | 5 | bslbf |
|     pts_offset_type | 2 | uimsbf |
|     timescale_flag | 1 | bslbf |
|     if(timescale_flag==1){ | | |
|         timescale | 32 | uimsbf |
|     } | | |
|     if(pts_offset_type==1){ | | |
|         default_pts_offset | 16 | uimsbf |
|     } | | |
|     for(i=0; i<N; i++){ | | |
|         mpu_sequence_number | 32 | uimsbf |
|         mpu_decoding_time_offset | 16 | uimsbf |
|         num_of_au | 8 | uimsbf |
|         for(j=0; j<num_of_au; j++){ | | |
|             dts_pts_offset | 16 | uimsbf |
|             if(pts_offset_type==2){ | | |
|                 pts_offset | 16 | uimsbf |
|             } | | |
|         } | | |
|     } | | |
| } | | |

FIG. 34A

| FUNCTION IDENTIFYING INFORMATION | NETWORK COMMUNICATION PROCESS IN OUTPUT DESTINATION DEVICE | SUPPORTED | UNSUPPORTED | UNIDENTIFIABLE |
|---|---|---|---|---|
| OUTPUT FROM BROADCAST RECEIVING APPARATUS | | OUTPUT WITHOUT MIXING DATA ACQUIRED BY NETWORK COMMUNICATION FUNCTION | OUTPUT WITH MIXING DATA ACQUIRED BY NETWORK COMMUNICATION FUNCTION | OUTPUT WITH MIXING DATA ACQUIRED BY NETWORK COMMUNICATION FUNCTION |

FIG. 34B

| FUNCTION IDENTIFYING INFORMATION | NETWORK COMMUNICATION PROCESS IN OUTPUT DESTINATION DEVICE | SUPPORTED | UNSUPPORTED | UNIDENTIFIABLE |
|---|---|---|---|---|
| OPERATION STATE INFORMATION (NETWORK COMMUNICATION STATE) | COMMUNICABLE STATE | OUTPUT WITHOUT MIXING DATA ACQUIRED BY NETWORK COMMUNICATION FUNCTION | OUTPUT WITH MIXING DATA ACQUIRED BY NETWORK COMMUNICATION FUNCTION | OUTPUT WITHOUT MIXING DATA ACQUIRED BY NETWORK COMMUNICATION FUNCTION |
| | UNCOMMUNICABLE STATE | OUTPUT WITH MIXING DATA ACQUIRED BY NETWORK COMMUNICATION FUNCTION | OUTPUT WITH MIXING DATA ACQUIRED BY NETWORK COMMUNICATION FUNCTION | OUTPUT WITH MIXING DATA ACQUIRED BY NETWORK COMMUNICATION FUNCTION |
| | UNIDENTIFIABLE | OUTPUT WITH MIXING DATA ACQUIRED BY NETWORK COMMUNICATION FUNCTION | OUTPUT WITH MIXING DATA ACQUIRED BY NETWORK COMMUNICATION FUNCTION | OUTPUT WITH MIXING DATA ACQUIRED BY NETWORK COMMUNICATION FUNCTION |

BROADCAST RECEIVING APPARATUS, BROADCAST RECEIVING METHOD, AND CONTENTS OUTPUTTING METHOD

CROSS REFERENCE

This application is a Continuation under 35 U.S.C. § 111(a) of U.S. patent application Ser. No. 15/548,380, filed Aug. 2, 2017, which is a U.S. National Phase under 35 U.S.C. § 371 of International Application No. PCT/JP2016/052339, filed on Jan. 27, 2016, which claims the benefit of Japanese Application No. 2015-018226, filed on Feb. 2, 2015, Japanese Application No. 2015-056948, filed on Mar. 19, 2015, and Japanese Application No. 2015-058877, filed on Mar. 23, 2015, the entire contents of each are hereby incorporated by reference.

TECHNICAL FIELD

The present invention relates to a broadcast receiving apparatus, a broadcast receiving method, and a contents outputting method.

BACKGROUND ART

One of extended functions of the digital broadcasting service is data broadcasting in which digital data is transmitted by broadcast waves to display various pieces of information such as weather forecasts, news, and recommended TV programs. Many types of television receivers capable of receiving data broadcasting have already been on the market, and a lot of techniques for receiving data broadcasting including the technique disclosed in Patent Document 1 listed below have been released to the public.

RELATED ART DOCUMENTS

Patent Documents

Patent document 1: Japanese Unexamined Patent Application Publication No. 2001-186486

SUMMARY OF THE INVENTION

Problem to be Solved by the Invention

In association with the recent changes in the contents distribution environment, various functional extensions have been demanded for the television receivers. In particular, there are a lot of demands for the distribution of contents and cooperated applications using a broadband network environment such as the Internet and demands for the video contents with higher resolution and higher definition. However, no matter how the data broadcasting receiving function that the current television receiver has is utilized or extended, it is difficult to provide a high-value added television receiver capable of satisfying the above-mentioned demands.

An object of the present invention is to provide a broadcast receiving apparatus capable of exerting a function with a higher added value.

Means for Solving the Problem

Techniques described in claims are used as means for solving the above problem.

One example is a broadcast receiving apparatus capable of receiving a digital broadcasting service of a broadcasting system adopting a given media transport method, and the broadcast receiving apparatus includes: a broadcast receiving unit that receives a broadcast wave of the digital broadcasting service; a separating unit that separates at least coded program video data related to a broadcasting program, program-cooperation data, and screen layout control information, from the received broadcast wave; a video decoding unit that decodes the coded program video data to reproduce program video information; a cooperation information generating unit that interprets the program-cooperation data to generate program-cooperation information; a presentation processing unit capable of properly dividing a video display region into sub-regions based on the screen layout control information, properly placing the program video information and the program-cooperation information in the divided sub-regions, and outputting data of the video display region as video information; a display unit that displays the video information; an operation input unit to which an operation instruction of a user is input; and a control unit, and when an instruction to display a given screen is input to the operation input unit while the presentation processing unit divides the video display region into the sub-regions based on the screen layout control information, places the program video information in one of the sub-regions, places the program-cooperation information in another sub-region, and outputs the data of the video display region as the video information, the control unit controls the presentation processing unit so as to output information of the given screen as the video information without performing the division of the video display region based on the screen layout control information.

Effects of the Invention

It is possible to provide a broadcast receiving apparatus capable of exerting a function with a higher added value by using the technique of the present invention.

BRIEF DESCRIPTIONS OF THE DRAWINGS

FIG. 3 is a conceptual diagram of a protocol stack for a broadcasting system using MMT;

FIG. 4 is a layered configuration diagram of control information used in a broadcasting system;

FIG. 5A is a list of tables used for TLV-SI of the broadcasting system;

FIG. 5B is a list of descriptors used for TLV-SI of the broadcasting system;

FIG. 6A is a list of messages used for MMT-SI of the broadcasting system;

FIG. 6B is a list of tables used for MMT-SI of the broadcasting system;

FIG. 6C is a list (1) of descriptors used for MMT-SI of the broadcasting system;

FIG. 6D is a list (2) of descriptors used for MMT-SI of the broadcasting system;

FIG. 7B is a configuration diagram of a logical plane structure of a presentation function of the broadcast receiving apparatus according to the first embodiment;

FIG. 10B is a software configuration diagram of the portable information terminal according to the first embodiment;

FIG. 11A is a diagram showing a data structure of an MH-TOT of the broadcasting system;

FIG. 11B is a diagram showing a format of a JST_time parameter of the broadcasting system;

FIG. 12 is a diagram showing a method of calculating the current date from MJD of the broadcast receiving apparatus according to the first embodiment;

FIG. 13A is a diagram showing a configuration of an NTP format of the broadcasting system;

FIG. 13B is a diagram showing a data structure of an MPU timestamp descriptor of the broadcasting system;

FIG. 13C is a diagram showing a data structure of time information in a TMCC extension information region of the broadcasting system;

FIG. 14 is an operation sequence diagram at the time of channel scanning of the broadcast receiving apparatus according to the first embodiment;

FIG. 15A is a diagram showing a data structure of a TLV-NIT of the broadcasting system;

FIG. 15B is a diagram showing a data structure of a satellite delivery system descriptor of the broadcasting system;

FIG. 15C is a diagram showing a data structure of a service list descriptor of the broadcasting system;

FIG. 15D is a diagram showing a data structure of an AMT of the broadcasting system;

FIG. 17 is a diagram showing a data structure of an MPT of the broadcasting system;

FIG. 18 is a diagram showing a data structure of an LCT of the broadcasting system;

FIG. 19A is a diagram showing an example of layout assignment to a layout number based on the LCT;

FIG. 19B is a diagram showing another example of layout assignment to a layout number based on the LCT;

FIG. 19C is a diagram showing still another example of layout assignment to a layout number based on the LCT;

FIG. 19D is a diagram showing still another example of layout assignment to a layout number based on the LCT;

FIG. 21 is a diagram showing a data structure of an MH-EIT of the broadcasting system;

FIG. 22C is a screen display diagram of an EPG screen of the broadcast receiving apparatus according to the first embodiment;

FIG. 23 is a screen display diagram at the time of displaying an emergency warning broadcasting message of the broadcast receiving apparatus according to the first embodiment;

FIG. 25 is an explanatory diagram of inconsistent display of current time at the time of switching a broadcasting service;

FIG. 26 is an explanatory diagram of an operation of selection control of a reference source of current time information according to the second embodiment;

FIG. 27A is a screen display diagram of an EPG screen of the broadcast receiving apparatus according to the second embodiment;

FIG. 32A is an explanatory diagram of an operation of data output control of the broadcast receiving apparatus according to the third embodiment;

FIG. 32B is an explanatory diagram of an operation of data output control of the broadcast receiving apparatus according to the third embodiment;

FIG. 33 is a diagram showing a data structure of an MPU extension timestamp descriptor of the broadcasting system;

FIG. 34A is an explanatory diagram of an operation of data output control of the broadcast receiving apparatus according to the third embodiment;

FIG. 34B is an explanatory diagram of an operation of data output control of the broadcast receiving apparatus according to the third embodiment.

DETAILED DESCRIPTION OF PREFERRED EMBODIMENTS

Hereinafter, embodiments of the present invention will be described with reference to drawings.

First Embodiment

[System Configuration]

Figure 1:
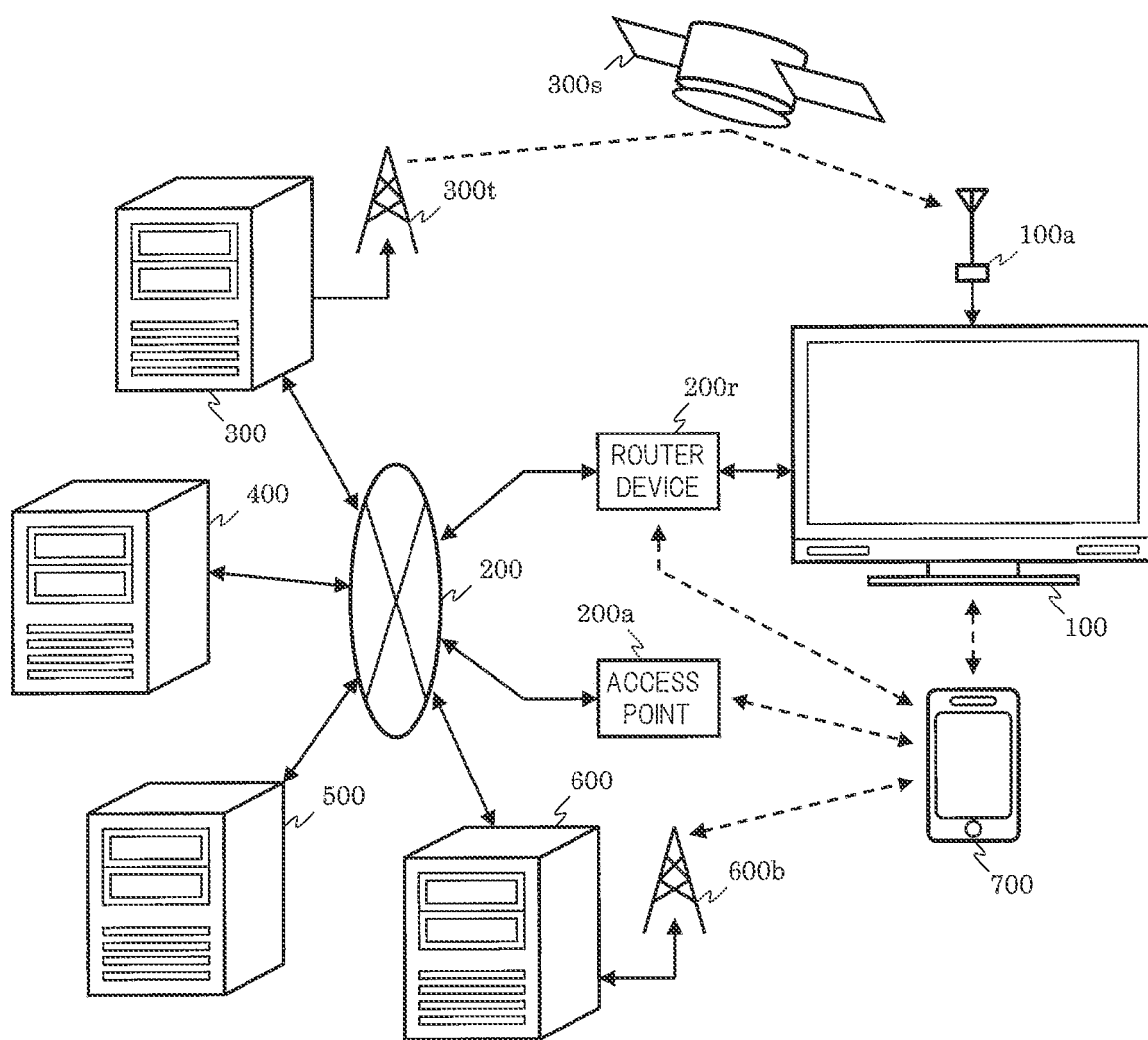
FIG. 1 is a system configuration diagram showing an example of a broadcast communication system including a broadcast receiving apparatus according to a first embodiment.

FIG. 1 is a system configuration diagram showing an example of a broadcast communication system including a broadcast receiving apparatus according to the present embodiment. The broadcast communication system of this embodiment includes a broadcast receiving apparatus 100, an antenna 100a, a broadband network such as the Internet 200, a router device 200r, an access point 200a, a radio tower 300t and a broadcast satellite (or communication satellite) 300s of a broadcast station, a broadcast station server 300, a service provider server 400, an other application server 500, a mobile phone communication server 600, a base station 600b of a mobile phone communication network, and a portable information terminal 700.

The broadcast receiving apparatus 100 receives broadcast waves transmitted from the radio tower 300t via the broadcast satellite (or communication satellite) 300s and the antenna 100a. Alternatively, the broadcast receiving apparatus 100 may receive broadcast waves transmitted from the radio tower 300t directly from the antenna 100a without passing through the broadcast satellite (or communication satellite) 300s. In addition, the broadcast receiving apparatus 100 can be connected to the Internet 200 via the router device 200r, and thus can perform data transmission and reception through the communication with server devices and other communication equipment on the Internet 200.

The router device 200r is connected to the Internet 200 through wired communication, to the broadcast receiving apparatus 100 through wired or wireless communication, and to the portable information terminal 700 through wireless communication. The wireless communication may be established by Wi-Fi (registered trademark) or the like. This allows the server devices and other communication equipment on the Internet 200, the broadcast receiving apparatus 100, and the portable information terminal 700 to perform data transmission and reception between one another via the router device 200r. Note that the communication between the broadcast receiving apparatus 100 and the portable information terminal 700 may be performed as direct communication by BlueTooth (registered trademark), NFC (Near Field Communication) or the like without passing through the rooter 200r.

The radio tower 300t is a broadcasting facility of the broadcast station and transmits broadcast waves including coded data of broadcasting programs, subtitle information, other applications, general-purpose data, and others. The broadcast satellite (or communication satellite) 300s is a relay device that receives broadcast waves transmitted from the radio tower 300t of the broadcast station, performs frequency conversion and others as appropriate, and then transmits the radio waves to the antenna 100a connected to the broadcast receiving apparatus 100. In addition, the broadcast station has the broadcast station server 300. The broadcast station server 300 can store metadata such as broadcasting programs (video contents, etc.) and the titles, IDs, summaries, casts, broadcasting dates and others of the broadcasting programs, and provide the video contents and metadata to a service provider based on a contract. Note that the video contents and metadata may be provided to the service provider through an API (Application Programming Interface) in the broadcast station server 300.

The service provider server 400 is a server device prepared by the service provider, and can provide various services cooperated with broadcasting programs distributed from the broadcast station. In addition, the service provider server 400 stores, manages, and distributes video contents and metadata delivered from the broadcast station server 300 and various contents, applications and others cooperated with the broadcasting programs. In addition, the service provider server 400 further has a function of searching for deliverable contents, applications and others and presenting a list of them in response to an inquiry from the television receiver and others. Note that the storage, management, and distribution of the contents and metadata and those of the applications may be performed by different server devices. The broadcast station and the service provider may be the same or different from each other. A plurality of service provider servers 400 may be prepared for different services. In addition, the broadcast station server 300 may be provided with the functions of the service provider server 400.

The other application server 500 is a publicly known server device that stores, manages, and distributes other general applications, operating programs, contents, data, and others. A plurality of other application servers 500 may be provided on the Internet 200.

The mobile phone communication server 600 is connected to the Internet 200 and is further connected to the portable information terminal 700 via the base station 600b. The mobile phone communication server 600 manages telephone communication (telephone call) and data transmission and reception performed by the portable information terminal 700 through the mobile phone communication network, and allows the portable information terminal 700 to perform data transmission and reception through the communication with server devices and other communication equipment on the Internet 200. The communication between the base station 600b and the portable information terminal 700 may be performed by W-CDMA (Wideband Code Division Multiple Access: registered trademark), GSM (Global System for Mobile Communications: registered trademark), LTE (Long Term Evolution), or other communication methods.

The portable information terminal 700 has a function of telephone communication (telephone call) and data transmission and reception through the mobile phone communication network and a function of wireless communication through Wi-Fi (registered trademark) or the like. The portable information terminal 700 can be connected to the Internet 200 via the router device 200r or the access point 200a or via the base station 600b and the mobile phone communication server 600 on the mobile phone communication network, and thus can perform data transmission and reception through the communication with server devices and other communication equipment on the Internet 200. The access point 200a is connected to the internet 200 through wired communication and is further connected to the portable information terminal 700 through wireless communication. The wireless communication may be established by Wi-Fi (registered trademark) or the like. Note that the communication between the portable information terminal 700 and the broadcast receiving apparatus 100 may be performed via the access point 200a, the Internet 200, and the router device 200r or via the base station 600b, the mobile phone communication server 600, the Internet 200, and the router device 200r.

[Outline of MMT Method]

The broadcast receiving apparatus 100 shown in FIG. 1 is a television receiver that supports MMT (MPEG Media Transport) as a media transport method for transmitting video and audio data, in place of TS (Transport Stream) defined in the MPEG (Moving Picture Experts Group)-2 system (hereinafter, "MPEG2-TS") mainly adopted by conventional digital broadcasting systems. The broadcast receiving apparatus 100 may be a television receiver supporting both MPEG2-TS and MMT.

MPEG2-TS has a characteristic of multiplexing video and audio components and others making up a program, in a single stream together with control signals and clocks. Since the components are treated as single stream with the inclusion of clocks, MPEG2-TS is suitable for the transmission of single contents through a single transmission path with an ensured transmission quality, and thus has been adopted by many conventional digital broadcasting systems. Meanwhile, because of the functional limitations of MPEG2-TS for the recent changes in the contents distribution environment including the diversification of contents, diversification of equipment using contents, diversification of transmission paths through which contents are distributed, and diversification of contents accumulation environment, MMT has been established as a new media transport method.

Figure 2A:
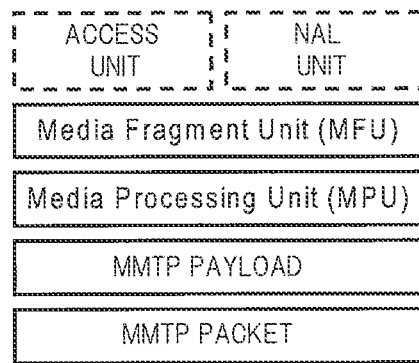
FIG. 2A is an explanatory diagram of an outline of a coded signal in MMT.
Figure 2B:
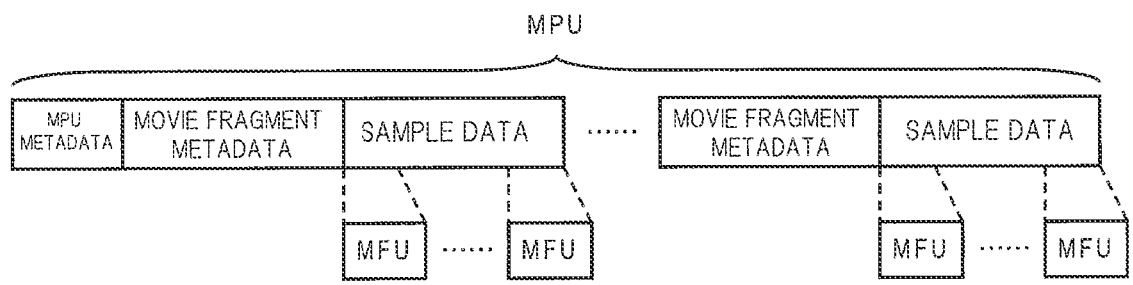
FIG. 2B is a configuration diagram of an MPU in MMT.

FIG. 2A shows an example of an outline of a coded signal in MMT of this embodiment. As shown in FIG. 2A, MMT of this embodiment has an MFU (Media Fragment Unit), an MPU (Media Processing Unit), an MMTP (MMT Protocol) payload, and an MMTP packet as elements making up the coded signal. The MFU is a format at the time of transmitting video, audio, and others, and may be configured in units of NAL (Network Abstraction Layer) unit or access unit. The MPU may be configured of MPU metadata including information related to the overall configuration of the MPU, movie fragment metadata including information of coded media data, and sample data that is coded media data. Also, MFU can be extracted from the sample data. Further, in the case of media such as video components and audio components, presentation time and decoding time may be specified in units of MPU or access unit. FIG. 2B shows an example of a configuration of the MPU.

Figure 2C:
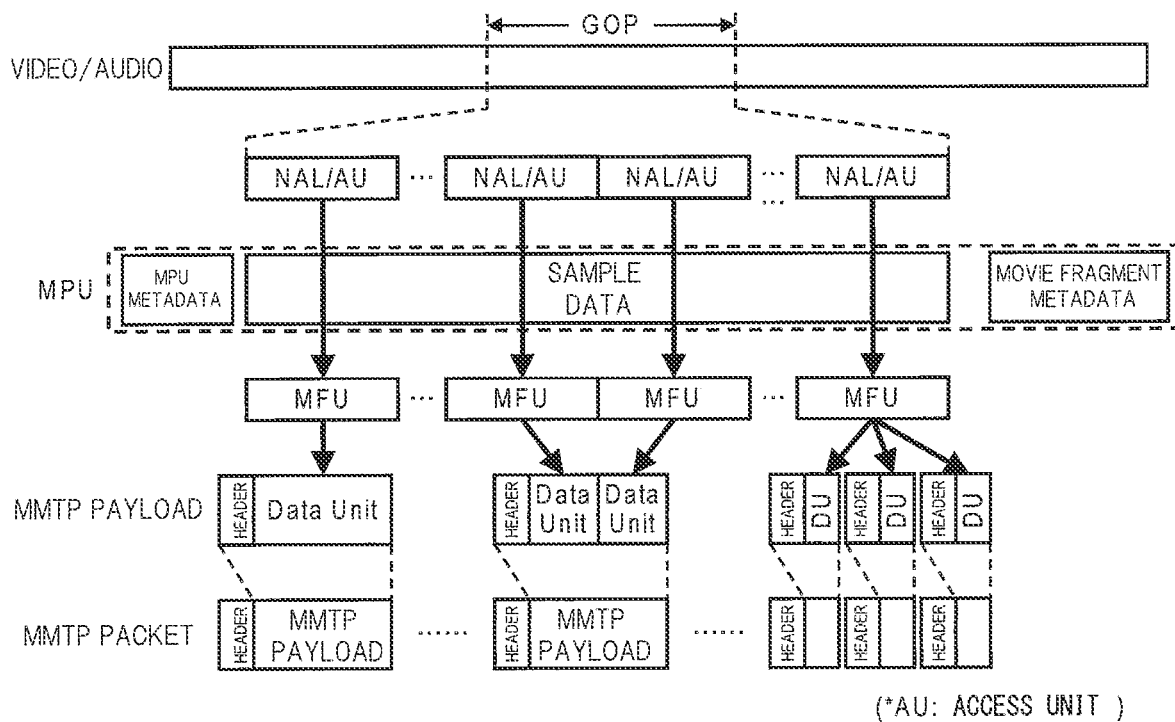
FIG. 2C is a configuration diagram of an MMTP packet in MMT.

The MMTP packet is configured of a header and an MMTP payload, and transmits control information of the MFU and MMT. The MMTP payload has a payload header corresponding to contents (data unit) stored in a payload section. FIG. 2C shows an example of an outline of a process of making the MFU from video and audio signals, storing the MFU in the MMTP payload, and then creating the MMTP packet. In the case of a video signal that is coded using inter-frame prediction, the MPU is desirably configured in units of GOP (Group of Pictures). In addition, when the size of MFU to be transmitted is small, a single MFU may be stored in a single payload section, or a plurality of MFUs may be stored in a single payload section. In addition, when the size of MFU to be transmitted is large, a single MFU may be divided and then stored in a plurality of payload sections. In order to recover a packet loss on a transmission path, the MMTP packet may be protected by such techniques as AL-FEC (Application Layer Forward Error Correction) and ARQ (Automatic Repeat Request).

The broadcasting system of this embodiment uses MPEG-H HEVC (High Efficiency Video Coding) as a video coding method, and uses MPEG-4 AAC (Advanced Audio Coding) or MPEG-4 ALS (Audio Lossless Coding) as an audio coding method. Coded data of video, audio, and others of broadcasting programs that are coded by the methods described above is formatted into MFU or MPU, stored in an MMTP payload, encapsulated in an MMTP packet, and then transmitted in the form of an IP (Internet Protocol) packet. In addition, data contents related to broadcasting programs may also be formatted into MFU or MPU, stored in an MMTP payload, encapsulated in an MMTP packet, and then transmitted in the form of an IP packet. Four types of data contents transmission methods are prepared, which include a subtitle/caption transmission method used for data steaming synchronous with broadcasting, an application transmission method used for data transmission asynchronous with broadcasting, an event message transmission method used for synchronous/asynchronous message notification to applications operating on the television receiver, and a general-purpose data transmission method for synchronous/asynchronous transmission of other general-purpose data.

In the transmission of MMTP packets, UDP/IP (User Datagram Protocol/Internet Protocol) is used for the broadcast transmission path, and UDP/IP or TCP/IP (Transmission Control Protocol/Internet Protocol) is used for the communication line. Also, TLV (Type Length Value) multiplexing is used in the broadcast transmission path for efficient transmission of IP packets. Examples of protocol stack for the broadcasting system of this embodiment are shown in FIG. 3. In FIG. 3, (A) shows an example of a protocol stack for the broadcast transmission path, and (B) shows an example of a protocol stack for the communication line.

The broadcasting system of this embodiment provides a scheme for transmitting two types of control information, that is, MMT-SI (MMT-Signaling Information) and TLV-SI (TLV-Signaling Information). MMT-SI is control information indicating the configuration of a broadcasting program and others. This control information is formatted into an MMT control message, stored in an MMTP payload, encapsulated in an MMTP packet, and then transmitted in the form of an IP packet. TLV-SI is control information related to IP packet multiplexing, and provides information for channel selection and correspondence information of IP addresses and services.

Also, even the broadcasting system using the MMT transmits time information in order to provide an absolute time. Note that component presentation time is indicated for each TS based on different clocks in the MPEG2-TS, while component presentation time is indicated based on the coordinated universal time (UTC) in the MMT. This scheme allows a terminal device to display components transmitted from different transmission points through different transmission paths in synchronization. IP packets conforming to an NTP (Network Time Protocol) are used for providing the UTC.

[Control Information of Broadcasting System Using MMT]

As described above, in the broadcasting system compatible with the broadcast receiving apparatus 100 of this embodiment, TLV-SI related to a TLV multiplexing method for multiplexing IP packets and MMT-SI related to MMT which is a media transport method are prepared as the control information. TLV-SI provides information with which the broadcast receiving apparatus 100 demultiplexes IP packets multiplexed in the broadcast transmission path. TLV-SI is composed of a "table" and a "descriptor". The "table" is transmitted in a section format, and the "descriptor" is placed in the "table". MMT-SI is transmission control information indicating the information related to configuration of an MMT package and broadcasting services. MMT-SI has a three-layer structure composed of a "message" layer storing "table" and "descriptor", a "table" layer having an element and property that indicate specific information, and a "descriptor" layer indicating more detailed information. An example of the layer structure of the control information used in the broadcasting system of this embodiment is shown in FIG. 4.

<Tables Used for TLV-SI>

FIG. 5A shows a list of "tables" used for TLV-SI of the broadcasting system compatible with the broadcast receiving apparatus 100 of this embodiment. In this embodiment, the following tables are used as "tables" of TLV-SI.

(1) TLV-NIT

A network information table for TLV (TLV-NIT) provides information related to the physical configuration of a TLV stream transmitted through a network and indicates the characteristics of the network.

(2) AMT

An address map table (AMT) provides a list of multicast groups of IP packets making up respective services transmitted through the network.

(3) Table Set by Provider

Other tables set uniquely by the service provider and others may be prepared.

<Descriptors Used for TLV-SI>

FIG. 5B shows a list of "descriptors" included in TLV-SI of the broadcasting system compatible with the broadcast receiving apparatus 100 of this embodiment. In this embodiment, the following descriptors are used as "descriptors" of TLV-SI.

(1) Service list descriptor

A service list descriptor provides a list of services classified by service identifications and service types.

(2) Satellite delivery system descriptor

A satellite delivery system descriptor indicates physical conditions for a satellite transmission path.

(3) System management descriptor

A system management descriptor is used to distinguish broadcasting from non-broadcasting.

(4) Network name descriptor

A network name descriptor describes a network name with character codes.

(5) Descriptor set by provider

Other descriptors set uniquely by the service provider and others may be prepared.

<Messages Used for MMT-SI>

FIG. 6A shows a list of "messages" used for MMT-SI of the broadcasting system compatible with the broadcast receiving apparatus 100 of this embodiment. In this embodiment, the following messages are used as "messages" of MMT-SI.

(1) PA Message

A package access (PA) message is used to transmit various tables.

(2) M2 Section Message

An M2 section message is used to transmit section extension format of the MPEG-2 Systems.

(3) CA Message

A CA message is used to transmit a table for identifying a conditional access method.

(4) M2 Short Section Message

An M2 short section message is used to transmit section short format of the MPEG-2 Systems.

(5) Data Transmission Message

A data transmission message is a message storing a table related to data transmission.

(6) Message Set by Provider

Other messages set uniquely by the service provider and others may be prepared.

<Tables Used for MMT-SI>

FIG. 6B shows a list of "tables" used for MMT-SI of the broadcasting system compatible with the broadcast receiving apparatus 100 of this embodiment. A table is control information having an element and property that indicate specific information. A table is stored in a message and is encapsulated in an MMTP packet to be transmitted. Note that a message that stores a table may be determined in accordance with the type of the table. In this embodiment, the following tables are used as "tables" of MMT-SI.

(1) MPT

An MMT package table (MPT) provides package configuration information such as a list of assets and locations of assets on the network. An MPT may be stored in a PA message.

(2) PLT

A package list table (PLT) presents a list of IP data flows for transmitting PA messages of MMT packages provided as a broadcasting service, packet IDs, and IP data flows for transmitting IP services. A PLT may be stored in a PA message.

(3) LCT

A layout configuration table (LCT) is used to correlate layout information for presentation with layout numbers. An LCT may be stored in a PA message.

(4) ECM

An entertainment control message (ECM) is common information made up of program information and control information, and delivers key information for descrambling and others. An ECM may be stored in an M2 section message.

(5) EMM

An entitlement management message (EMM) is used to transmit personal information including contract information for individual subscribers and key information for decoding ECM (common information). An EMM may be stored in an M2 section message.

(6) CAT (MH)

A conditional access table (CA table (CAT)) (MH) is used to store a descriptor for identifying a conditional access method. A CAT (MH) may be stored in a CA message.

(7) DCM

A download control message (DCM) transmits key-related information including a key for decoding a transmission path code for downloading. A DCM may be stored in an M2 section message.

(8) DMM

A download management message (DMM) transmits key-related information including a download key for decoding an encoded DCM. A DMM may be stored in an M2 section message.

(9) MH-EIT

An MH-event information table (MH-EIT) is time-series information related to events included in each service. An MH-EIT may be stored in an M2 section message.

(10) MH-AIT

An MH-application information table (MH-AIT) stores all the information related to applications and startup conditions required for applications. An MH-AIT may be stored in an M2 section message.

(11) MH-BIT

An MH-broadcaster information table (MH-BIT) is used to provide information of broadcasters present on the network. An MH-BIT may be stored in an M2 section message.

(12) MH-SDTT

An MH-software download trigger table (MH-SDTT) is used to provide download announcement information. An MH-SDTT may be stored in an M2 section message.

(13) MH-SDT

An MH-service description table (MH-SDT) has a sub-table indicating a service included in a specific TLV stream and transmits information related to a sub-channel such as a name of sub-channel and a name of a broadcaster. An MH-SDT may be stored in an M2 section message.

(14) MH-TOT

An MH-time offset table (MH-TOT) transmits JST time and date (Modified Julian Date) information. An MH-TOT may be stored in an M2 short section message.

(15) MH-CDT

An MH-common data table (MH-CDT) is used to transmit common data, which should be stored in a non-volatile memory, in a section format to all receivers that receive the MH-CDT. An MH-CDT may be stored in an M2 section message.

(16) DDM Table

A data directory management (DDM) table provides a directory configuration of files making up an application in order to separate a file configuration of the application from a configuration for file transmission. A DDM table may be stored in a data transmission message.

(17) DAM Table

A data asset management (DAM) table provides a configuration of MPU in an asset and version information of each MPU. A DAM table may be stored in a data transmission message.

(18) DCC Table

A data content configuration (DCC) table provides configuration information of files as data contents in order to achieve flexible and effective cache control. A DCC table may be stored in a data transmission message.

(19) EMT

An event message table (EMT) is used to transmit information related to an event message. An EMT may be stored in an M2 section message.

(20) Table Set by Provider

Other tables set uniquely by the service provider and others may be provided.

<Descriptors Used for MMT-SI>

FIGS. 6C and 6D show lists of "descriptors" included in MMT-SI of the broadcasting system compatible with the broadcast receiving apparatus 100 of this embodiment. A descriptor is control information that provides more detailed information, and is included in a table. Note that a table in which a descriptor is included may be determined in accordance with the type of the descriptor. In this embodiment, the following descriptors are used as "descriptors" of MMT-SI.

(1) Asset Group Descriptor

An asset group descriptor provides a relation of an asset group and a priority in the group. An asset group descriptor may be included in MPT.

(2) Event Package Descriptor

An event package descriptor provides a correlation between an event, which represents a program, and a package. An event package descriptor may be included in MH-EIT stored in an M2 section message to be transmitted.

(3) Background Color Specifying Descriptor

A background color specifying descriptor provides a background color of a rearmost plane in layout specification. A background color specifying descriptor may be included in LCT.

(4) MPU Presentation Region Specifying Descriptor

An MPU presentation region specifying descriptor provides a location of presentation of MPU. An MPU presentation region specifying descriptor may be included in MPT.

(5) MPU Timestamp Descriptor

An MPU timestamp descriptor indicates the time of presentation of the first access unit in the presentation order in MPU. An MPU timestamp descriptor may be included in MPT.

(6) Dependency Relation Descriptor

A dependency relation descriptor provides asset IDs for assets dependent on each other. A dependency relation descriptor may be included in MPT.

(7) Access Control Descriptor

An access control descriptor provides information for identifying the conditional access method. An access control descriptor may be included in MPT or CAT (MH).

(8) Scramble Method Descriptor

A scramble method descriptor provides information for identifying a target to be encoded at the time of scrambling and a type of an encoding algorithm. A scramble method descriptor may be included in MPT or CAT (MH).

(9) Message Authentication Method Descriptor

A message authentication method descriptor provides information for identifying a message authentication method when message authentication is performed. A message authentication method descriptor may be included in MPT or CAT (MH).

(10) Emergency Information Descriptor (MH)

An emergency information descriptor (MH) is used when emergency warning broadcasting is performed. An emergency information descriptor (MH) may be included in MPT.

(11) MH-MPEG-4 Audio Descriptor

An MH-MPEG-4 audio descriptor is used to describe basic information for specifying coding parameters of an audio stream defined in ISO/IEC 14496-3 (MPEG-4 audio). An MH-MPEG-4 audio descriptor may be included in MPT.

(12) MH-MPEG-4 Audio Extension Descriptor

An MH-MPEG-4 audio extension descriptor is used to describe a profile, level, and specific setting to a coding method of an MPEG-4 audio stream. An MH-MPEG-4 audio extension descriptor may be included in MPT.

(13) MH-HEVC Video Descriptor

An MH-HEVC video descriptor is used to describe basic coding parameters for a video stream (HEVC stream) defined in ITU-T Recommendation H.265 and ISO/IEC 23008-2. An MH-HEVC video descriptor may be included in MPT.

(14) MH-Link Descriptor

An MH-link descriptor identifies a service that is provided when a viewer demands additional information related to a specific matter described in a program arrangement information system. An MH-link descriptor may be included in MPT, MH-EIT, MH-SDT, and others.

(15) MH-Event Group Descriptor

An MH-event group descriptor is used to indicate that a plurality of events form a group when these events are related to one another. An MH-event group descriptor may be included in MH-EIT.

(16) MH-Service List Descriptor

An MH-service list descriptor provides a list of services classified by service identifications and service types. An MH-service list descriptor may be included in MH-BIT.

(17) MH-Short Format Event Descriptor

An MH-short format event descriptor represents an event name and a short description of the event in a text format. An MH-short format event descriptor may be included in MH-EIT.

(18) MH-Extension Format Event Descriptor

An MH-extension format event descriptor is added to an MH-short format event descriptor, and provides a detailed description of an event. An MH-extension format event descriptor may be included in MH-EIT.

(19) Video Component Descriptor

A video component descriptor provides parameters and description for a video component, and is used also for expressing an elementary stream in a text format. A video component descriptor may be included in MPT or MH-EIT.

(20) MH-Stream Identifying Descriptor

An MH-stream identifying descriptor is used to attach a label to a component stream for a service so that descriptive contents indicated by a video component descriptor in MH-EIT can be referred to with the label. An MH-stream identifying descriptor may be included in MPT.

(21) MH-Content Descriptor

An MH-content descriptor indicates the genre of an event. An MH-content descriptor may be included in MH-EIT.

(22) MH-Parental Rate Descriptor

An MH-parental rate descriptor indicates age-based viewing restriction, and is used to extend the range of restriction based on other restriction conditions. An MH-parental rate descriptor may be included in MPT or MH-EIT.

(23) MH-Audio Component Descriptor

An MH-audio component descriptor provides parameters for an audio elementary stream, and is used also for expressing the elementary stream in a text format. An MH-audio component descriptor may be included in MPT or MH-EIT.

(24) MH-Target Area Descriptor

An MH-target area descriptor is used to describe a target area of a program or some streams making up the program. An MH-target area descriptor may be included in MPT.

(25) MH-Series Descriptor

An MH-series descriptor is used to identify a series program. An MH-series descriptor may be included in MH-EIT.

(26) MH-SI Transmission Parameter Descriptor

An MH-SI transmission parameter descriptor is used to indicate SI transmission parameters. An MH-SI transmission parameter descriptor may be included in MH-BIT.

(27) MH-Broadcaster Name Descriptor

An MH-broadcaster name descriptor describes a name of a broadcaster. An MH-broadcaster name descriptor may be included in MH-BIT.

(28) MH-Service Descriptor

An MH-service descriptor expresses a name of a sub-channel and a name of a provider of the sub-channel in character code together with a service type. An MH-service descriptor may be included in MH-SDT.

(29) IP Data Flow Descriptor

An IP data flow descriptor provides information of IP data flow making up a service. An IP data flow descriptor may be included in MH-SDT.

(30) MH-CA Startup Descriptor

An MH-CA startup descriptor describes startup information for starting a CAS program on a CAS board. An MH-CA startup descriptor may be included in MPT or CAT (CA).

(31) MH-Type Descriptor

An MH-Type descriptor indicates a type of a file transmitted by an application transmission method. An MH-Type descriptor may be included in a DAM table.

(32) MH-Info Descriptor

An MH-Info descriptor describes information related to MPU or an item. An MH-Info descriptor may be included in a DAM table.

(33) MH-Expire Descriptor

An MH-Expire descriptor describes an expiration date of an item. An MH-Expire descriptor may be included in a DAM table.

(34) MH-Compression Type Descriptor

An MH-Compression Type descriptor states that an item to be transmitted is compressed, and indicates a compression algorithm for the compression and the number of bytes of the item before the compression. An MH-Compression Type descriptor may be included in a DAM table.

(35) MH-Data Coding Method Descriptor

An MH-data coding method descriptor is used to identify a data coding method. An MH-data coding method descriptor may be included in MPT.

(36) UTC-NPT Reference Descriptor

A UTC-NPT reference descriptor is used to transmit a relation between NPT (Normal Play Time) and UTC. A UTC-NPT reference descriptor may be included in EMT.

(37) Event Message Descriptor

An event message descriptor transmits information generally related to event messages. An event message descriptor may be included in EMT.

(38) MH-Local Time Offset Descriptor

An MH-local time offset descriptor is used to provide a given offset value to actual time (e.g., UTC+9 hours) and display time to a human system when a daylight saving time system is implemented. An MH-local time offset descriptor may be included in MH-TOT.

(39) MH-Component Group Descriptor

An MH-component group descriptor defines and identifies a combination of components in an event. An MH-component group descriptor may be included in MH-EIT.

(40) MH-Logo Transmission Descriptor

An MH-logo transmission descriptor is used to describe pointing to a character string for a simplified logo and a logo in a CDT format. An MH-logo transmission descriptor may be included in MH-SDT.

(41) MPU Extension Timestamp Descriptor

An MPU extension timestamp descriptor provides a time to decode an access unit in MPU. An MPU extension timestamp descriptor may be included in MPT.

(42) MPU Download Contents Descriptor

An MPU download contents descriptor is used to describe property information of contents that are downloaded using MPU. An MPU download contents descriptor may be included in MH-SDTT.

(43) MH-Network Download Contents Descriptor

An MH-network download contents descriptor is used to describe property information of contents that are downloaded through the network. An MH-network download contents descriptor may be included in MH-SDTT.

(44) MH-Application Descriptor

An MH-application descriptor describes information of an application. An MH-application descriptor may be included in MH-AIT.

(45) MH-Transmission Protocol Descriptor

An MH-transmission protocol descriptor is used to specify a transmission protocol for broadcasting, communication, and others, and to provide location information of an application depending on the transmission protocol. An MH-transmission protocol descriptor may be included in MH-AIT.

(46) MH-Simplified Application Location Descriptor

An MH-simplified application location descriptor provides the detailed description of an acquirer of an application. An MH-simplified application location descriptor may be included in MH-AIT.

(47) MH-Application Boundary Authority Setting Descriptor

An MH-application boundary authority setting descriptor provides a description for setting an application boundary and setting an authority for access to broadcasting resources for each region (URL). An MH-application boundary authority setting descriptor may be included in MH-AIT.

(48) MH-Startup Priority Information Descriptor

An MH-startup priority information descriptor provides a description for specifying a startup priority of an application. An MH-startup priority information descriptor may be included in MH-AIT.

(49) MH-Cache Information Descriptor

An MH-cache information descriptor provides a description used for cache control in a case where resources making up an application are saved in a cache when reuse of the application is assumed. An MH-cache information descriptor may be included in MH-AIT.

(50) MH-Probability-Applied Delay Descriptor

An MH-probability-applied delay descriptor provides a description for delaying the time of execution of application control by a delay time set probabilistically, with the expectation that server access loads for acquiring the application are to be dispersed. An MH-probability-applied delay descriptor may be included in MH-AIT.

(51) Link Destination PU Descriptor

A link destination PU descriptor describes another presentation unit (PU) to which a presentation unit may possibly make transition. A link destination PU descriptor may be included in a DCC table.

(52) Lock Cache Specifying Descriptor

A lock cache specifying descriptor describes a description for specifying a file to be cached and locked in a presentation unit. A lock cache specifying descriptor may be included in a DCC table.

(53) Unlock Cache Specifying Descriptor

An unlock cache specifying descriptor provides a description for specifying a file to be unlocked among locked files in a presentation unit. An unlock cache specifying descriptor may be included in a DCC table.

(54) Descriptor Set by Provider

Other descriptors set uniquely by the service provider and others may be prepared.

<Relation between Data Transmission and Control Information in MMT Method>

Here, the relation between data transmission and typical tables in the broadcasting system compatible with the broadcast receiving apparatus 100 of this embodiment will be described with reference to FIG. 6E.

The broadcasting system compatible with the broadcast receiving apparatus 100 of this embodiment can perform data transmission through a plurality of routes such as TLV streams transmitted through the broadcast transmission path and IP data flows transmitted through the communication line. A TLV stream includes TLV-SI such as TLV-NIT and AMT and an IP data flow which is a data flow of IP packets. The IP data flow includes a video asset including a series of video MPUs and an audio asset including a series of audio MPUs. Similarly, the IP data flow may include a subtitle asset including a series of subtitle MPUs, a caption asset including a series of caption MPUs, and a data asset including a series of data MPUs. These various assets are associated in units of "package" by MPT (MMT package table) which is stored in a PA message to be transmitted. Specifically, these assets are associated by describing a package ID (corresponding to "MMT_package_id_byte" parameter which will be shown later in FIG. 17) and asset IDs (corresponding to "asset_id_byte" parameter which will be shown later in FIG. 17) for respective assets included in the package, in the MPT.

Figure 6E:
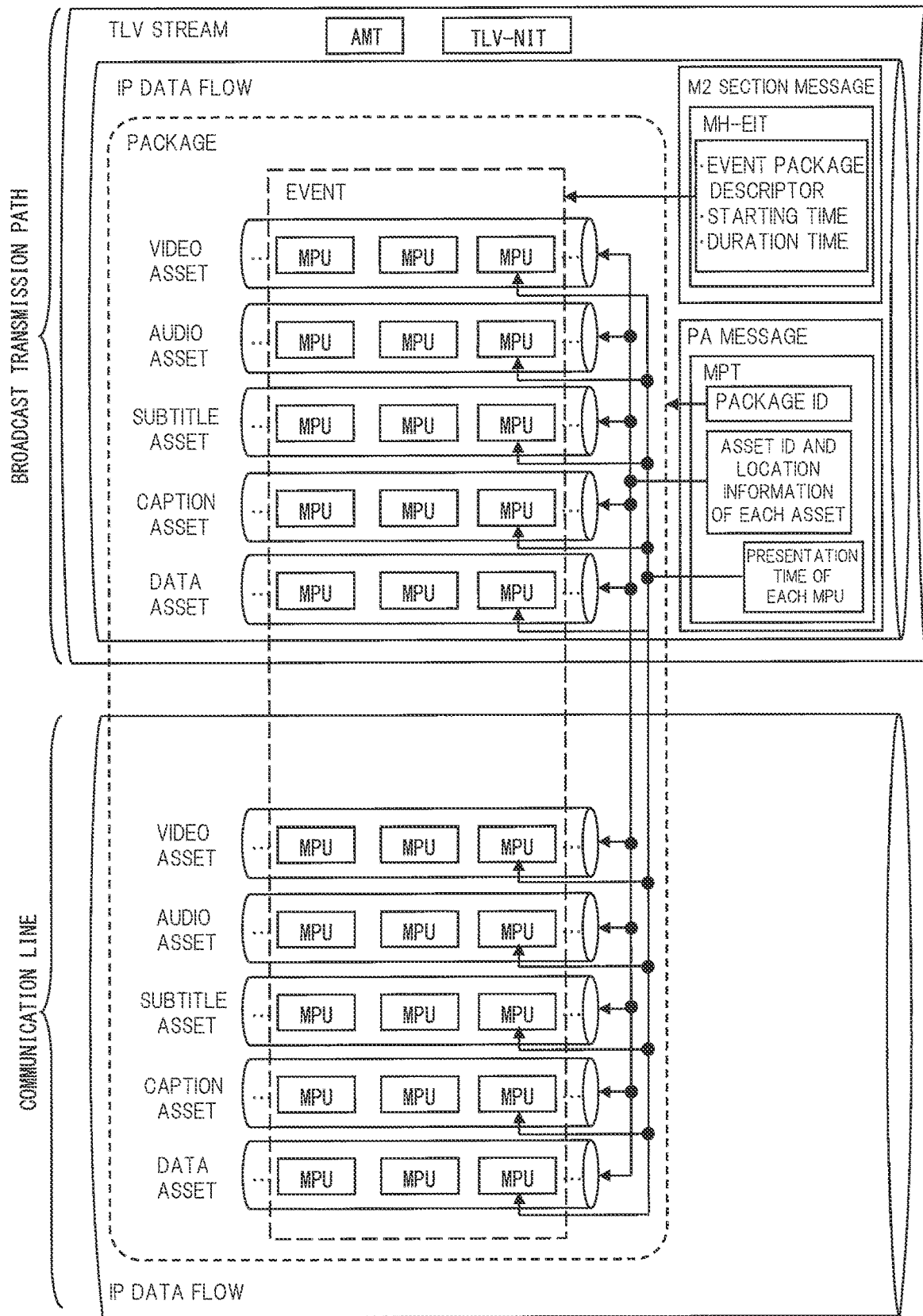
FIG. 6E is a diagram showing the relation between data transmission and each table in the broadcasting system.

The assets making up a package may be limited to assets in a TLV stream, but may include assets transmitted by an IP data flow through the communication line as shown in FIG. 6E. This is made possible by providing location information (corresponding to "MMT_general_location_info ( )" which will be shown later in FIG. 17) of the assets included in the package in the MPT so that the broadcast receiving apparatus 100 of this embodiment can know the reference destination of each asset. Specifically, by changing the value of an "MMT_general_location_infonolocation_type" parameter which is included in the location information, the broadcast receiving apparatus 100 can refer to various pieces of data transmitted through various transmission routes including:

(1) data multiplexed in the same IP data flow as the MPT (location_type=0X00);
(2) data multiplexed in an IPv4 data flow (location_type=0x01);
(3) data multiplexed in an IPv6 data flow (location_type=0x02);
(4) data multiplexed in a broadcasting MPEG2-TS (location_type=0x03);
(5) data multiplexed in an MPEG2-TS format in an IP data flow (location_type=0X04); and
(6) data located by a specified URL (location_type=0X05).

Among the above reference destinations, (1) is, for example, an IP data flow that is received in the form of a digital broadcasting signal received by a tuner/demodulating unit 131 of the broadcast receiving apparatus 100 to be described later with reference to FIG. 7A. When the MPT is included also in an IP data flow on the side of a communication line and is transmitted, the reference destination of (1) may be changed to an IP data flow received by a LAN communication unit 121 to be described later through the communication line. Also, (2), (3), (5), and (6) described above are IP data flows received by the LAN communication unit 121 to be described later through the communication line. In addition, (4) described above can be used when the data multiplexed in MPEG2-TS received by the receiving function of receiving digital broadcasting signals transmitted by the MPEG2-TS method is referred to based on location information ("MMT_general_location_info( )") of MPT included in a digital broadcasting signal transmitted by the MMT method, in the case of the broadcast receiving apparatus having both of a receiving function of receiving digital broadcasting signals transmitted by the MMT method and a receiving function of receiving digital broadcasting signals transmitted by the MPEG2-TS method, like a broadcast receiving apparatus 800 of a second embodiment to be descried later with reference to FIG. 24.

Note that the data making up the "package" is specified in the above-described manner, and a series of data grouped in a unit of "package" are treated as a "service" unit for digital broadcasting in the broadcasting system compatible with the broadcast receiving apparatus 100 of this embodiment.

Further, presentation time information of each MPU specified by the MPT (corresponding to "mpu_presentation_time" parameter to be shown later in FIG. 13B) is described in the MPT, and a plurality of MPUs specified by the MPT can be presented (displayed or output) in conjunction with each other by using the presentation time information, with reference to a clock based on the NTP which is time information expressed by the UTC notation. Presentation control of various data using the clock based on the NTP will be described later.

The data transmission method of this embodiment shown in FIG. 6E further includes a concept of "event". "Event" is a concept representing a so-called "program" handled by MH-EIT included in an M2 section message to be transmitted. Specifically, in the "package" indicated by an event package descriptor stored in the MH-EIT, a series of data included in a period between a start time (corresponding to a "start_time" parameter to be described later in FIG. 21) stored in the MH-EIT and the end of a duration time (corresponding to a "duration" parameter to be described later in FIG. 21) are data included in the concept of "event". The MH-EIT can be used for various processes performed in units of "event" (e.g., process of creating a program guide, process of controlling timer recording and viewing reservation, process of protecting copy rights such as temporary data storage, etc.) in the broadcast receiving apparatus 100 of this embodiment.

[Hardware Configuration of Broadcast Receiving Apparatus]

Figure 7A:
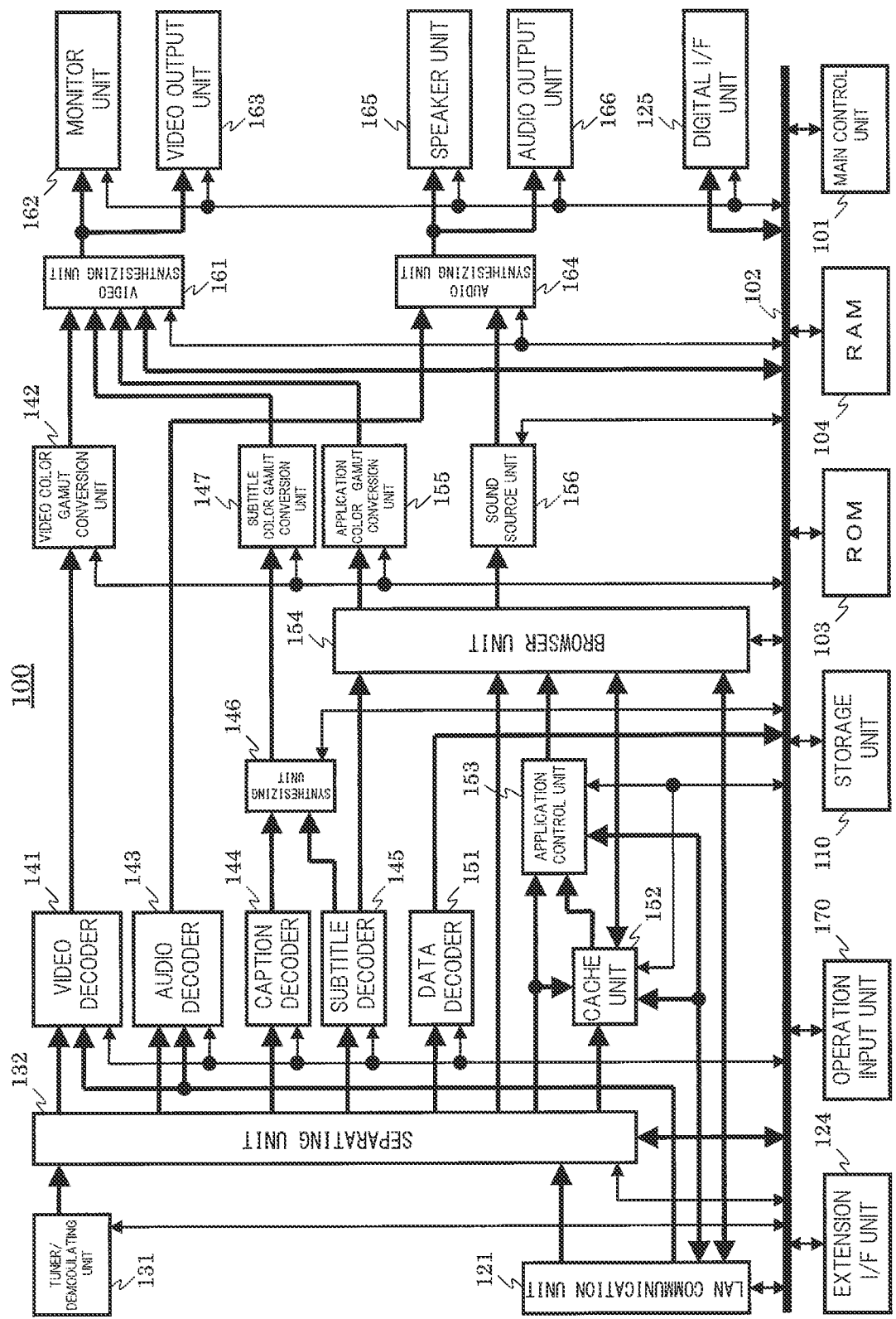
FIG. 7A is a block diagram of the broadcast receiving apparatus according to the first embodiment.

FIG. 7A is a block diagram showing an example of an internal configuration of the broadcast receiving apparatus 100. The broadcast receiving apparatus 100 includes a main control unit 101, a system bus 102, a ROM 103, a RAM 104, a storage (accumulation) unit 110, the LAN communication unit 121, an extension interface unit 124, a digital interface unit 125, the tuner/demodulating unit 131, a separating unit 132, a video decoder 141, a video color gamut conversion unit 142, an audio decoder 143, a caption decoder 144, a subtitle decoder 145, a subtitle synthesizing unit 146, a subtitle color gamut conversion unit 147, a data decoder 151, a cache unit 152, an application control unit 153, a browser unit 154, an application color gamut conversion unit 155, a sound source unit 156, a video synthesizing unit 161, a monitor unit 162, a video output unit 163, an audio synthesizing unit 164, a speaker unit 165, an audio output unit 166, and an operation input unit 170.

The main control unit 101 is a microprocessor unit that controls the whole of the broadcast receiving apparatus 100 in accordance with a predetermined operating program. The system bus 102 is a data communication path through which data is exchanged between the main control unit 101 and each of operating blocks in the broadcast receiving apparatus 100.

The ROM (Read Only Memory) 103 is a non-volatile memory storing a basic operating program such as operating system and other operating programs, and is provided as, for example, a rewritable ROM such as EEPROM (Electrically Erasable Programmable ROM) and flash ROM. The ROM 103 may store operation set values necessary for the operation of the broadcast receiving apparatus 100. The RAM (Random Access Memory) 104 serves as a work area used when the basic operating program and other operating programs are executed. The ROM 103 and the RAM 104 may be integrated with the main control unit 101. Also, a part of the memory region of the storage (accumulation) unit 110 may be used as the ROM 103 instead of providing the ROM 103 having the independent configuration shown in FIG. 7A.

The storage (accumulation) unit 110 stores the operating programs and operation set values of the broadcast receiving apparatus 100 and personal information of the user of the broadcast receiving apparatus 100. In addition, the storage (accumulation) unit 110 can store an operating program downloaded through the Internet 200 and various data created by the operating program. Further, the storage (accumulation) unit 110 can store such contents as moving images, still images, and sounds that are acquired from broadcast waves or downloaded through the Internet 200. A part of the memory region of the storage (accumulation) unit 110 may be used to substitute for a part or the whole of the function of the ROM 103. Also, the storage (accumulation) unit 110 needs to retain the stored information even when power is not supplied to the broadcast receiving apparatus 100 from an external power source. Therefore, the storage (accumulation) unit 110 is provided as, for example, a non-volatile semiconductor element memory such as flash ROM or SSD (Solid State Driver) or a magnetic disc drive such as HDD (Hard Disc Drive).

Note that the operating programs stored in the ROM 103 and the storage (accumulation) unit 110 can be added, updated and functionally extended by the downloading process from server devices on the Internet 200.

The LAN (Local Area Network) communication unit 121 is connected to the Internet 200 via the router device 200r, and transmits and receives data to and from server devices and other communication equipment on the Internet 200. Also, the LAN communication unit 121 acquires an MMT data string (or part of it) of a program transmitted through the communication line. The LAN communication unit 121 may be connected to the router device 200r through wired communication or wireless communication such as Wi-Fi (registered trademark). The LAN communication unit 121 has a coding circuit, a decoding circuit, and others. In addition, the broadcast receiving apparatus 100 may further include other communication units such as a BlueTooth (registered trademark) communication unit, an NFC communication unit, and an infrared communication unit.

The tuner/demodulating unit 131 receives broadcast waves transmitted from the radio tower 300t via the antenna 100a, and tunes to (selects) a channel giving a service that the user wishes to have, under the control by the main control unit 101. Further, the tuner/demodulating unit 131 demodulates a received broadcasting signal to acquire an MMT data string. Although the example of FIG. 7A shows the configuration in which the broadcast receiving apparatus 100 has one tuner/demodulating unit, the broadcast receiving apparatus 100 may be configured to have a plurality of tuner/demodulating units for the purpose of simultaneously displaying a plurality of screens or recording a program on a different channel.

The separating unit 132 is an MMT decoder, and distributes a video data string, an audio data string, a caption data string, a subtitle data string, and others which are real-time presentation elements to the video decoder 141, the audio decoder 143, the caption decoder 144, the subtitle decoder 145, and others, respectively, based on a control signal included in an MMT data string input to the separating unit 132. Data input to the separating unit 132 may be an MMT data string transmitted through the broadcast transmission path to the tuner/demodulating unit 131 and demodulated therein or an MMT data string transmitted through the communication line to the LAN communication unit 121.

Also, the separating unit 132 reproduces a multimedia application and filed data which is an element making up the multimedia application, and stores them temporarily in the cache unit 152. In addition, the separating unit 132 extracts and outputs general-purpose data to the data decoder 151 in order to use it for the streaming of data used by a player that presents data other than video, audio, and subtitle or for the streaming of data for an application. Also, the separating unit 132 may perform control such as error correction, access restriction, and others on the input MMT data string under the control by the main control unit 101.

The video decoder 141 decodes a video data string input from the separating unit 132 and outputs video information. The video color gamut conversion unit 142 performs a color space conversion process on the video information decoded in the video decoder 141 when necessary, in preparation for a video synthesizing process in the video synthesizing unit 161. The audio decoder 143 decodes an audio data string input from the separating unit 132 and outputs audio information. Also, for example, streaming data of an MPEG-DASH (MPEG-Dynamic Adaptive Streaming over HTTP) format or the like acquired from the Internet 200 through the LAN communication unit 121 may be input to the video decoder 141 and the audio decoder 143. A plurality of video decoders 141, video color gamut conversion units 142, audio decoders 143, and others may be provided in order to simultaneously decode a plurality of kinds of video data strings and audio data strings.

The caption decoder 144 decodes a caption data string input from the separating unit 132 and outputs caption information. The subtitle decoder 145 decodes a subtitle data string input from the separating unit 132 and outputs subtitle information. The caption information output from the caption decoder 144 and the subtitle information output from the subtitle decoder 145 are subjected to a synthesizing process in the subtitle synthesizing unit 146 and then subjected to a color space conversion process in the subtitle color gamut conversion unit 147 when necessary, in preparation for the video synthesizing process in the video synthesizing unit 161. In this embodiment, among services presented simultaneously with the video of a broadcasting program and provided mainly as text information, a service related to the video contents is referred to as subtitle, while a service other than that is referred to as caption. When these services are not distinguished from each other, they are collectively referred to as subtitle.

The browser unit 154 presents a multimedia application file and filed data making up the multimedia application file, which are acquired from the cache unit 152 or a server device on the Internet 200 through the LAN communication unit 121, in accordance with an instruction of the application control unit 153, which interprets control information included in an MMT data string and control information acquired from a server device on the Internet 200 through the LAN communication unit 121. Note that the multimedia application file may be, for example, an HTML (Hyper Text Markup Language) document or BML (Broadcast Markup Language) document. The application information output from the browser unit 154 is subjected to a color space conversion process in the application color gamut conversion unit 155 when necessary, in preparation for the video synthesizing process in the video synthesizing unit 161. Also, the browser unit 154 causes the sound source unit 156 to reproduce application audio information.

The video synthesizing unit 161 receives video information output from the video color gamut conversion unit 142, subtitle information output from the subtitle color gamut conversion unit 147, application information output from the application color gamut conversion unit 155, and others, and performs a selection process and/or a superposition process as appropriate. The video synthesizing unit 161 has a video RAM (not shown), and the monitor unit 162 and others are driven based on video information and others input to the video RAM. Also, the video synthesizing unit 161 performs a scaling process and a superposing process of EPG (Electronic Program Guide) screen information created based on information such as MH-EIT included in MMT-SI when necessary under the control by the main control unit 101. The monitor unit 162 is, for example, a display device such as liquid crystal panel, and offers the video information subjected to the selection process and/or superposition process in the video synthesizing unit 161, to the user of the broadcast receiving apparatus 100. The video output unit 163 is a video output interface that outputs the video information subjected to the selection process and/or superposition process in the video synthesizing unit 161.

Note that the presentation function of the broadcast receiving apparatus 100 of this embodiment has a logical plane structure for displaying a multimedia service in accordance with the intention of the service provider. FIG. 7B shows an example of a configuration of the logical plane structure that the presentation function of the broadcast receiving apparatus 100 of this embodiment has. In the logical plane structure, a caption plane that displays captions is located on the forefront layer, a subtitle plane that displays subtitles is located on the second layer, a multimedia plane that displays broadcast video, multimedia application or synthesized video thereof is located on the third layer, and a background plane is located on the rearmost layer. The subtitle synthesizing unit 146 and the video synthesizing unit 161 draw the caption information on the caption plane, the subtitle information on the subtitle plane, and the video information, application information, and others on the multimedia plane. Also, background color is drawn on the background plane based on an LCT included in MMT-SI. Note that it is also possible to provide a plurality of multimedia planes on the third layer in accordance with the number of video decoders 141. However, even when a plurality of multimedia planes are provided, application information and others output from the application color gamut conversion unit 155 are displayed only on the multimedia plane located on the forefront layer.

The audio synthesizing unit 164 receives audio information output from the audio decoder 143 and application audio information reproduced in the sound source unit 156, and performs a selection process and/or a mixing process as appropriate. The speaker unit 165 offers audio information subjected to the selection process and/or mixing process in the audio synthesizing unit 164 to the user of the broadcast receiving apparatus 100. The audio output unit 166 is an audio output interface that outputs the audio information subjected to the selection process and/or mixing process in the audio synthesizing unit 164.

The extension interface unit 124 is a group of interfaces for extending the function of the broadcast receiving apparatus 100, and is configured of an analog video and audio interface, a USB (Universal Serial Bus) interface, a memory interface, and others in this embodiment. The analog video and audio interface receives analog video and audio signals from external video and audio output devices, and outputs analog video and audio signals to external video and audio input devices. The USB interface is connected to a PC and others and transmits and receives data to and from the PC and others. An HDD may be connected to the USB interface to record broadcasting programs and contents. A keyboard and other USB devices may also be connected to the USB interface. A memory card and other memory media are connected to the memory interface to transmit and receive data to and from them.

The digital interface unit 125 is an interface that outputs or receives coded digital video data and/or digital audio data. The digital interface unit 125 can output an MMT data string acquired by the demodulation in the tuner/demodulating unit 131, an MMT data string acquired through the LAN communication unit 121, or mixed data of the MMT data strings as it is. Also, the MMT data string input from the digital interface unit 125 may be controlled to be input to the separating unit 132. It is also possible to output the digital contents stored in the storage (accumulation) unit 110 via the digital interface unit 125 or store the digital contents to the storage (accumulation) unit 110 via the digital interface unit 125.

The digital interface unit 125 is provided as a DVI terminal, HDMI (registered trademark) terminal, or Displayer Port (registered trademark) terminal, and thus outputs and receives data in the format in accordance with DVI specifications, HDMI specifications, or Displayer Port specifications. Alternatively, the digital interface unit 125 may output or receive data in a serial data format conforming to IEEE 1394 specifications and others. Further, the digital interface unit 125 may be configured as an IP interface that performs the digital interface output via hardware such as Ethernet (registered trademark) and wireless LAN. In such a case, the digital interface unit 125 and the LAN communication unit 121 may share the hardware configuration.

The operation input unit 170 is an instruction input unit on which operation instructions to the broadcast receiving apparatus 100 are input. In this embodiment, the operation input unit 170 is configured of a remote control receiving unit that receives commands transmitted from a remote controller and operation keys in which button switches are arranged (not shown), or may be configured of either the remote control receiving unit or the operation keys. Alternatively, the operation input unit 170 may be substituted by a touch panel overlaid on the monitor unit 162 or by a keyboard and others connected to the extension interface unit 124. The remote controller (not shown) may be substituted by the portable information terminal 700 having a remote control command transmission function.

Note that, when the broadcast receiving apparatus 100 is a television receiver or the like as mentioned above, the video output unit 163 and the audio output unit 166 are not essential constituent elements of the present invention. Also, the broadcast receiving apparatus 100 is not limited to a television receiver, but may be an optical disc drive recorder such as DVD (Digital Versatile Disc) recorder, a magnetic disc drive recorder such as HDD recorder, or an STB (Set Top Box). The broadcast receiving apparatus 100 may also be a PC (Personal Computer), a tablet terminal, a navigation device, a game machine, and others having a digital broadcast receiving function and a broadcasting/communication cooperation function. When the broadcast receiving apparatus 100 is the DVD recorder, the HDD recorder, STB, or the like, the broadcast receiving apparatus 100 does not have to be provided with the monitor unit 162 and the speaker unit 165. In such a case, the operation similar to that of the broadcast receiving apparatus 100 of this embodiment is possible by connecting an external monitor and an external speaker to the video output unit 163, the audio output unit 166, or the digital interface unit 125.

[System Configuration for Clock Synchronization/Presentation Synchronization in Broadcast Receiving Apparatus]

Figure 7C:
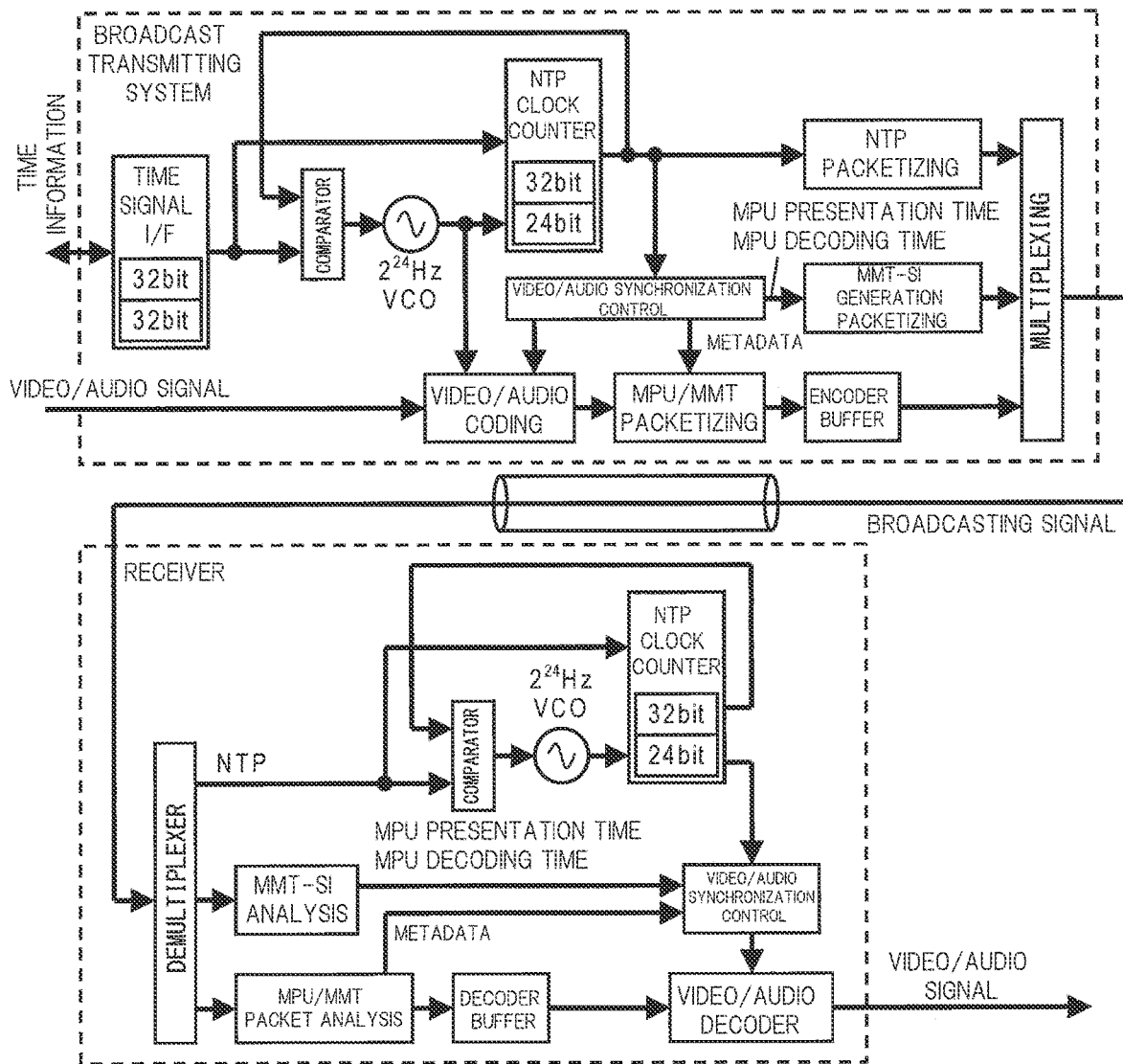
FIG. 7C is a system configuration diagram for clock synchronization/presentation synchronization in the broadcast receiving apparatus according to the first embodiment.

FIG. 7C shows an example of a system configuration for clock synchronization/presentation synchronization in the broadcasting system compatible with the broadcast receiving apparatus 100 of this embodiment. In the broadcasting system of this embodiment, UTC expressed in a 64-bit-length NTP timestamp format is transmitted from the broadcast transmitting system to the receiver (broadcast receiving apparatus 100 of this embodiment). In the NTP timestamp format, "second or more" of UTC is expressed by 32 bits, and "less than second" is also expressed by 32 bits. In practice, however, it is difficult to reproduce one second in 32-bit precision. For this reason, for example, a clock with a frequency of "$24^{th}$ power of 2" Hz (about 16.8 MHz) may be used as a system clock for video system synchronization and a system clock for operating a timepiece conforming to the NTP as shown in FIG. 7C. Considering the fact that the frequency of a system clock adopted in a conventional broadcasting system is 27 MHz and the hardware configuration of the receiver can be simplified, it is desirable that a clock whose frequency is exponentiation of 2 ranging from "$24^{th}$ power of 2" to "$28^{th}$ power of 2" is adopted as the system clock.

When the frequency of the system clock is set to exponentiation of 2 ranging from "$24^{th}$ power of 2" to "$28^{th}$ power of 2" in the broadcast transmitting system and the receiver as described above, 4 to 8 low-order bits in the NTP timestamp format transmitted from the broadcast transmitting system to the receiver, the low-order bits being not referred to by a PLL (Phase Locked Loop) system for reproducing the system clock or the timepiece conforming to the NTP, may be fixed to "0" or "1". Namely, when the frequency of the system cock is "$n^{th}$ power of 2" Hz (n=24 in FIG. 7C), "32-n" low-order bits in the NTP timestamp format may be fixed to "0" or "1". Alternatively, the receiver may perform the process without regard for the "32-n" low-order bits in the NTP timestamp format.

When receiving time information in the NTP format, the broadcast transmitting system builds the PLL system with a 32+n bit counter including VCO (Voltage Controlled Oscillator) with a frequency of "$n^{th}$ power of 2" Hz, thereby providing a transmission system clock that synchronizes with the time information given from outside. Also, the broadcast transmitting system causes the overall signal processing units to operate in synchronization with the system clock of "$n^{th}$ power of 2" Hz. In addition, the broadcast transmitting system periodically transmits the output of the transmission system clock as time information in the NTP-length format to the receiver through the broadcast transmission path.

The receiver receives the time information in the NTP-length format through the broadcast transmission path and reproduces a reception system clock by the PLL system including the VCO with the frequency of "$n^{th}$ power of 2" Hz in the same manner as the broadcast transmitting system. As a result, the reception system clock works in synchronization with the transmission system clock of the broadcast transmitting system. Also, by operating the signal processing system of the receiver in synchronization with the system clock of "$n^{th}$ power of 2" Hz, clock synchronization between the broadcast transmitting system and the receiver can be achieved, and thus the stable signal reproduction can be achieved. Also, decoding time and presentation time in units of presentation of video and audio signals are set based on the time information in the NTP format in the broadcast transmitting system. Here, an MPU timestamp descriptor to be described later with reference to FIG. 13B is stored in the MPT which is stored in a PA message transmitted by a broadcasting signal. In the MPU timestamp descriptor shown in FIG. 13B, an "mpu_sequence_number (MPU sequence number)" parameter indicates a sequence number for an MPU that describes a timestamp, and an "mpu_presentation_time (MPU presentation time)" parameter indicates the presentation time of the MPU in the 64-bit NTP timestamp format. Thus, the receiver can control timing of presenting (displaying or outputting) video signals, audio signals, subtitles, captions, and others for each of MPUs by referring to the MPU timestamp descriptor stored in the MPT.

When paying attention to the above-described control of decoding timing and presentation timing of video and audio signals in units of presentation, synchronization of video and audio signals can be ensured by a clock with a frequency of about "$16^{th}$ power of 2" Hz (about 65.5 KHz). In this case, it is not necessary to refer to 16 low-order bits in an NTP timestamp format described in an MPU timestamp descriptor or the like. Namely, when a clock of "$m^{th}$ power of 2" Hz, which is generated by dividing the frequency of system clock, is used for the control of decoding timing and presentation timing, it is not necessary to refer to "32-m" low-order bits in an NTP timestamp format described in an MPU timestamp descriptor or the like. Thus, the "32-m" low-order bits in the NTP timestamp format described in the MPU timestamp descriptor or the like may be fixed to "0" or "1".

[Software Configuration of Broadcast Receiving Apparatus]

Figure 7D:
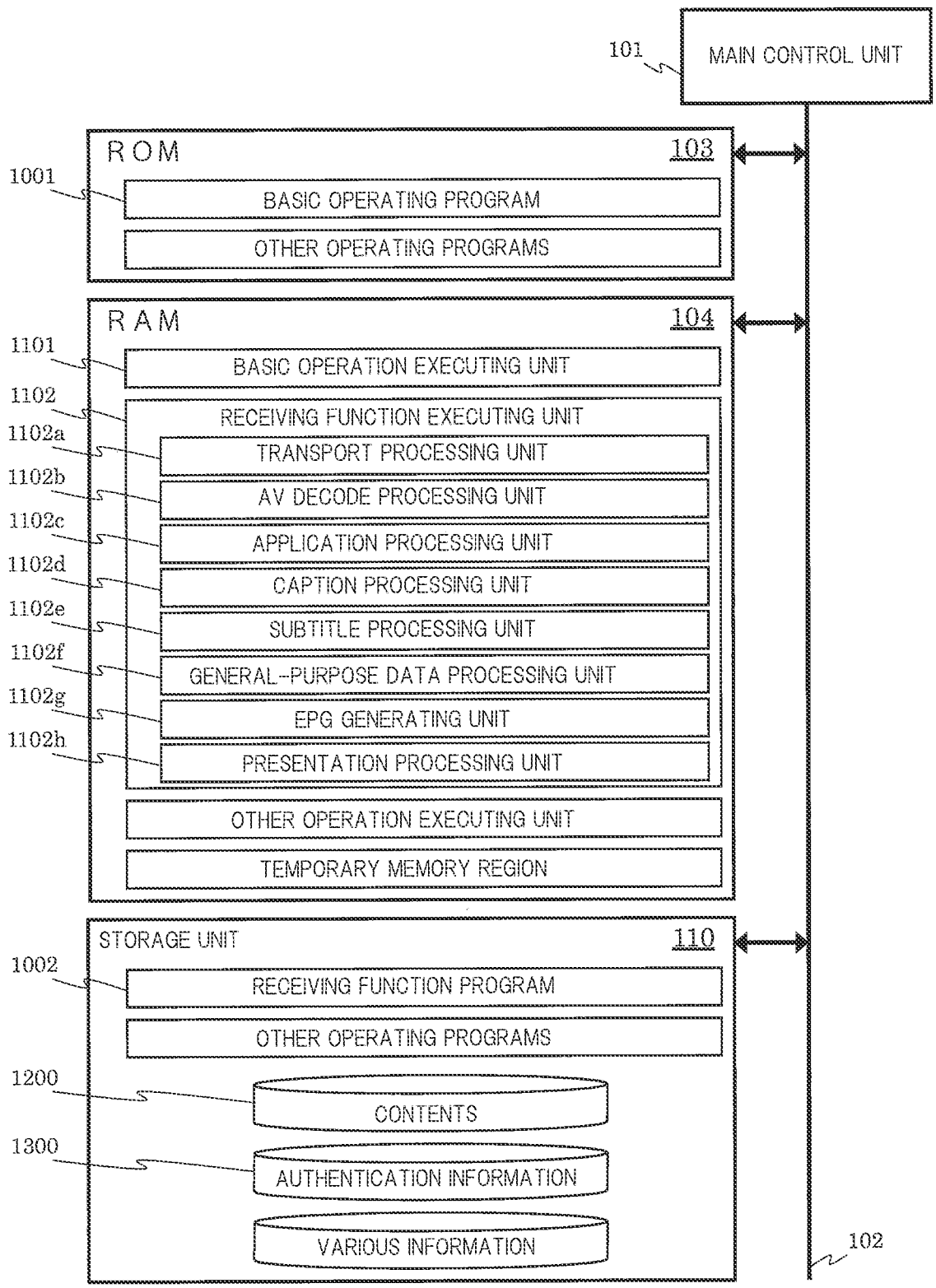
FIG. 7D is a software configuration diagram of the broadcast receiving apparatus according to the first embodiment.

FIG. 7D is a software configuration diagram of the broadcast receiving apparatus 100 of this embodiment, and shows respective software configurations of the ROM 103, the RAM 104, and the storage (accumulation) unit 110. In this embodiment, the ROM 103 stores a basic operating program 1001 and other operating programs, and the storage (accumulation) unit 110 stores a receiving function program 1002 and other operating programs. Also, the storage (accumulation) unit 110 includes a contents memory region 1200 storing such contents as moving images, still images, and sounds, an authentication information memory region 1300 storing authentication information and others needed when access is made to an external portable terminal or server device, and a various information memory region storing other various types of information.

The basic operating program 1001 stored in the ROM 103 is loaded onto the RAM 104, and the loaded basic operating program is executed by the main control unit 101 to configure a basic operation executing unit 1101. Similarly, the receiving function program 1002 stored in the storage (accumulation) unit 110 is loaded onto the RAM 104, and the loaded receiving function program is executed by the main control unit 101 to configure a receiving function executing unit 1102. Also, the RAM 104 has a temporary memory region that temporarily saves data created at execution of each operating program when necessary.

In the following, for simpler description, a process in which the main control unit 101 loads the basic operating program 1001 from the ROM 103 onto the RAM 104 and executes the basic operating program 1001 to control each operating block is described simply as a process in which the basic operation executing unit 1101 performs control of each operating block. The same applies also to the description of other operating programs.

The receiving function executing unit 1102 controls each operating block of the broadcast receiving apparatus 100 to reproduce video and audio components transmitted by the broadcasting system of this embodiment. In particular, a transport processing unit 1102a mainly controls the MMT decoder function of the separating unit 132, and distributes a video data string, audio data string, and others separated from an MMT data string to corresponding decode processing units, respectively. An AV decode processing unit 1102b mainly controls the video decoder 141, the audio decoder 143, and others. An application processing unit 1102c mainly controls the cache unit 152, the application control unit 153, the browser unit 154, and the sound source unit 156. A caption processing unit 1102d mainly controls the caption decoder 144. A subtitle processing unit 1102e mainly controls the subtitle decoder 145. A general-purpose data processing unit 1102f mainly controls the data decoder 151. An EPG generating unit 1102g interprets the descriptive contents of an MH-EIT and others included in MMT-SI to generate an EPG screen. A presentation processing unit 1102h mainly controls the video color gamut conversion unit 142, the subtitle synthesizing unit 146, the subtitle color gamut conversion unit 147, the application color gamut conversion unit 155, the video synthesizing unit 161, and the audio synthesizing unit 164 based on the logical plane structure.

The above-described operating programs may be stored in advance in the ROM 103 and/or the storage (accumulation) unit 110 at the time of product shipment, or may be acquired from the other application server 500 and others on the Internet 200 through the LAN communication unit 121 after the product shipment. Alternatively, the operating programs stored in a memory card, optical disc, and others may be acquired through the extension interface unit 124 and others.

[Configuration of Broadcast Station Server]

Figure 8:
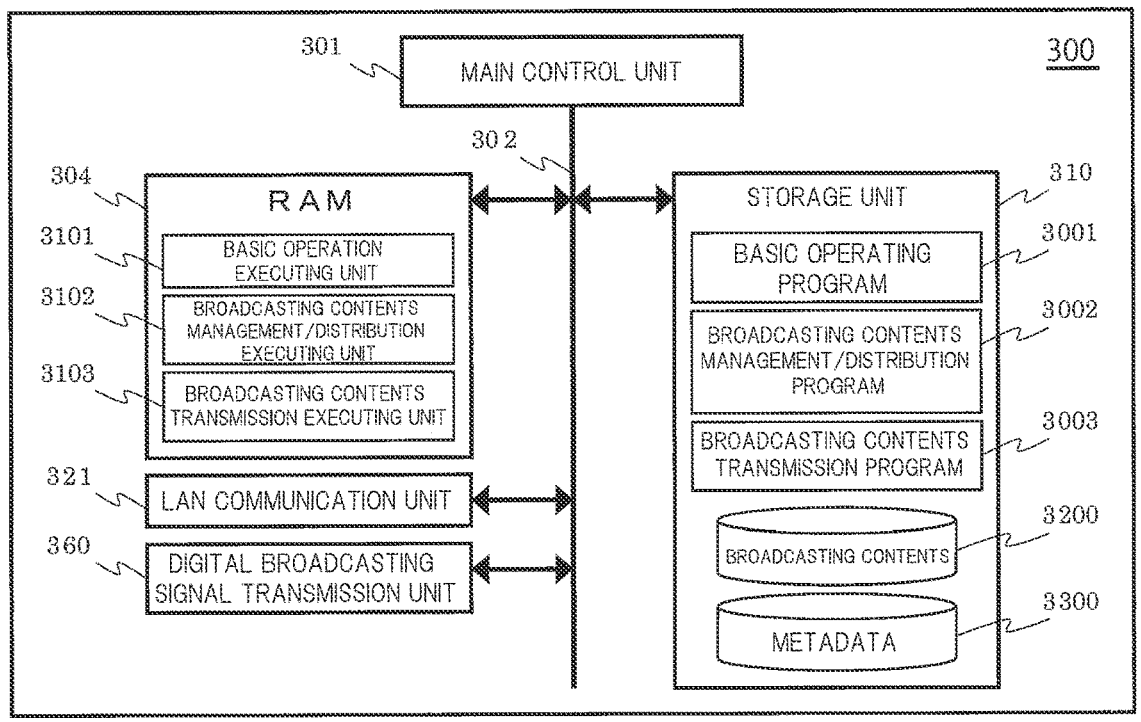
FIG. 8 is a block diagram of a broadcast station server according to the first embodiment.

FIG. 8 is a block diagram showing an example of an internal configuration of the broadcast station server 300. The broadcast station server 300 includes a main control unit 301, a system bus 302, a RAM 304, a storage unit 310, a LAN communication unit 321, and a digital broadcasting signal transmission unit 360.

The main control unit 301 is a microprocessor unit that controls the whole of the broadcast station server 300 in accordance with a predetermined operating program. The system bus 302 is a data communication path through which data is exchanged between the main control unit 301 and each of operating blocks in the broadcast station server 300. The ROM 304 serves as a work area used when each operating program is executed.

The storage unit 310 stores a basic operating program 3001, a broadcasting contents management/distribution program 3002, and a broadcasting contents transmission program 3003, and includes a broadcasting contents memory region 3200 and a metadata memory region 3300. The broadcasting contents memory region 3200 stores the contents of broadcasting programs and others broadcasted by the broadcast station. The metadata memory region 3300 stores metadata such as the titles, IDs, summaries, casts, and broadcasting dates of the broadcasting programs and copy control information related to program contents.

Also, the basic operating program 3001, the broadcasting contents management/distribution program 3002, and the broadcasting contents transmission program 3003 stored in the storage unit 310 are loaded onto the RAM 304, and the respective loaded programs are executed by the main control unit 301 to configure a basic operation executing unit 3101, a broadcasting contents management/distribution executing unit 3102, and a broadcasting contents transmission executing unit 3103.

In the following, for simpler description, a process in which the main control unit 301 loads the basic operating program 3001 from the storage unit 310 onto the RAM 304 and executes the basic operating program 3001 to control each operating block is described simply as a process in which the basic operation executing unit 3101 performs control of each operating block. The same applies also to the description of other operating programs.

The broadcasting contents management/distribution executing unit 3102 performs management of the contents of broadcasting programs stored in the broadcasting contents memory region 3200 and the metadata stored in the metadata memory region 3300, and performs control when the contents of broadcasting programs and metadata are delivered to a service provider based on a contract. Further, when delivering the contents of broadcasting programs and metadata to the service provider, the broadcasting contents management/distribution executing unit 3102 may perform a process of authenticating the service provider server 400 based on the contract when necessary.

The broadcasting contents transmission executing unit 3103 manages a time schedule and others when transmitting an MMT data string, which includes the contents of broadcasting programs accumulated in the broadcasting contents memory region 3200, and the titles and IDs of broadcasting programs and copy control information of program contents accumulated in the metadata memory region 3300, from the radio tower 300t via the digital broadcasting signal transmission unit 360.

The LAN communication unit 321 is connected to the Internet 200, and communicates with the service provider server 400 and others on the Internet 200. The LAN communication unit 321 has a coding circuit, a decoding circuit, and others. The digital broadcasting signal transmission unit 360 modulates an MMT data string composed of a video data string, audio data string, program data string, and others of the contents of broadcasting programs accumulated in the broadcasting contents memory region 3200, and transmits the modulated data string as the digital broadcast waves through the radio tower 300t.

[Configuration of Service Provider Server]

Figure 9:
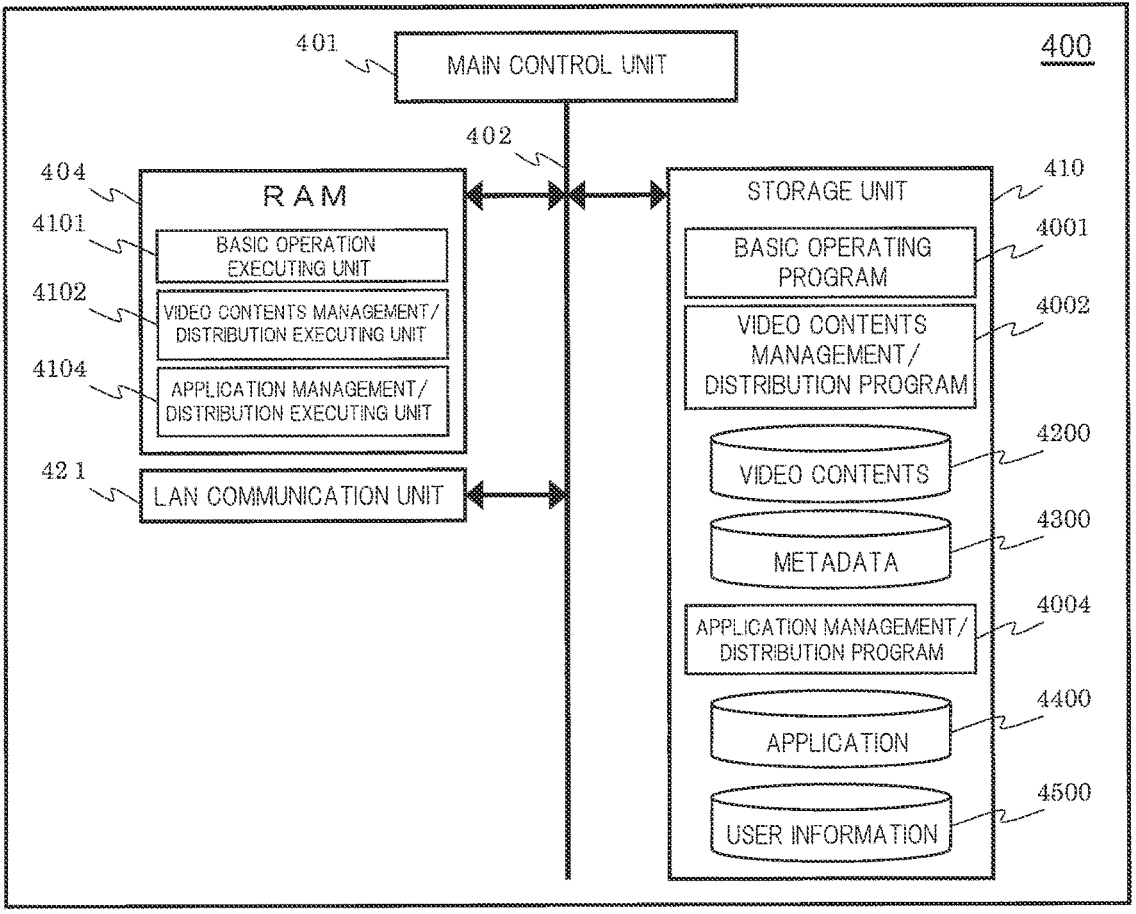
FIG. 9 is a block diagram of a service provider server according to the first embodiment.

FIG. 9 is a block diagram showing an example of an internal configuration of the service provider server 400. The service provider server 400 includes a main control unit 401, a system bus 402, a RAM 404, a storage unit 410, and a LAN communication unit 421.

The main control unit 401 is a microprocessor unit that controls the whole of the service provider server 400 in accordance with a predetermined operating program. The system bus 402 is a data communication path through which data is exchanged between the main control unit 401 and each of operating blocks in the service provider server 400. The ROM 404 serves as a work area that is used when each operating program is executed.

The storage unit 410 stores a basic operating program 4001, a video contents management/distribution program 4002, and an application management/distribution program 4004, and includes a video contents memory region 4200, a metadata memory region 4300, an application memory region 4400, and a user information memory region 4500. The video contents memory region 4200 stores the contents of broadcasting programs provided from the broadcast station server 300 as video contents, and stores video contents and others created by the service provider. The metadata memory region 4300 stores metadata provided from the broadcast station server 300 and metadata related to video contents created by the service provider. The application memory region 4400 stores various applications and others for distributing the services cooperated with broadcasting programs in response to demands from television receivers. The user information memory region 4500 stores information (personal information, authentication information, etc.) related to a user who is permitted to access the service provider server 400.

Also, the basic operating program 4001, the video contents management/distribution program 4002, and the application management/distribution program 4004 stored in the storage unit 410 are loaded onto the RAM 404, and the respective loaded basic operating program, video contents management/distribution program, and application management/distribution program are executed by the main control unit 401 to configure a basic operation executing unit 4101, a video contents management/distribution executing unit 4102, and an application management/distribution executing unit 4104.

In the following, for simpler description, a process in which the main control unit 401 loads the basic operating program 4001 stored in the storage unit 410 onto the RAM 404 and executes the basic operating program 4001 to control each operating block is described simply as a process in which the basic operation executing unit 4101 performs control of each operating block. The same applies also to description of other operating programs.

The video contents management/distribution executing unit 4102 acquires the contents and others of broadcasting programs and metadata from the broadcast station server 300, manages video contents and others and metadata stored in the video contents memory region 4200 and the metadata memory region 4300, and controls distribution of the video contents and others and metadata to television receivers. Further, when distributing the video contents and others and metadata to the television receivers, the video contents management/distribution executing unit 4102 may perform a process of authenticating the television receivers when necessary. Also, the application management/distribution executing unit 4104 manages applications stored in the application memory region 4400 and controls distribution of the applications in response to demands from the television receivers. Further, when distributing the applications to the television receivers, the application management/distribution executing unit 4104 may perform a process of authenticating the television receivers when necessary.

The LAN communication unit 421 is connected to the Internet 200, and communicates with the broadcast station server 300 on the Internet 200 and the broadcast receiving apparatus 100 via the router device 200r. The LAN communication unit 421 includes a coding circuit, a decoding circuit, and others.

[Hardware Configuration of Portable Information Terminal]

Figure 10A:
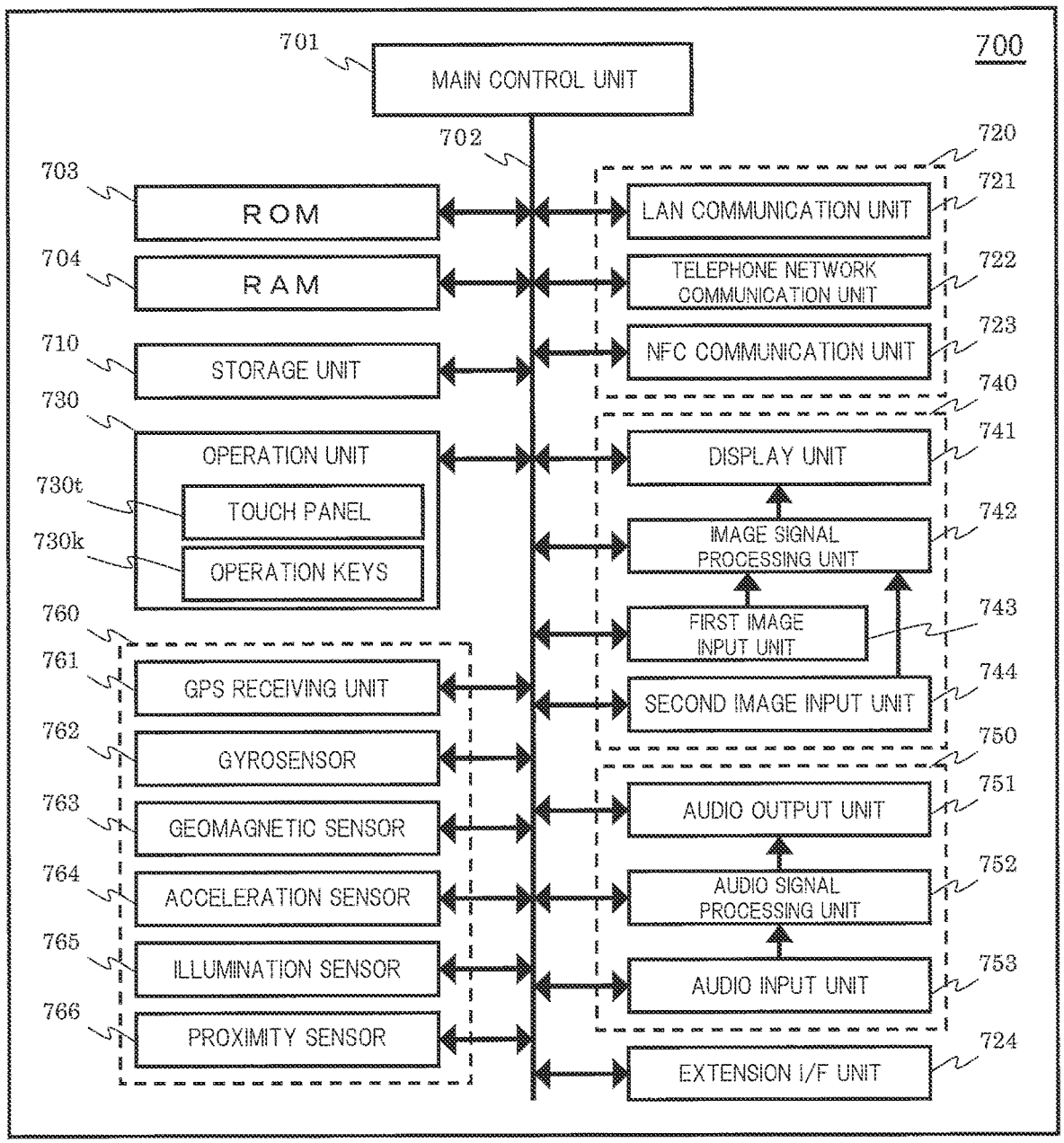
FIG. 10A is a block diagram of a portable information terminal according to the first embodiment.

FIG. 10A is a block diagram showing an example of an internal configuration of the portable information terminal 700. The portable information terminal 700 includes a main control unit 701, a system bus 702, a ROM 703, a RAM 704, a storage unit 710, a communication processing unit 720, an extension interface unit 724, an operation unit 730, an image processing unit 740, an audio processing unit 750, and a sensor unit 760.

The main control unit 701 is a microprocessor unit that controls the whole of the portable information terminal 700 in accordance with a predetermined operating program. The system bus 702 is a data communication path through which data is exchanged between the main control unit 701 and each of operating blocks in the portable information terminal 700.

The ROM 703 is a memory storing a basic operating program such as operating system and other operating programs, and is provided as, for example, a rewritable ROM such as EEPROM and flash ROM. The RAM 704 serves as a work area used when the basic operating program and other operating programs are executed. The ROM 703 and the RAM 704 may be integrated with the main control unit 701. Also, a part of the memory region of the storage unit 710 may be used as the ROM 703 instead of providing the ROM 703 having the independent configuration shown in FIG. 10A.

The storage unit 710 stores the operating programs and operation set values of the portable information terminal 700 and personal information of the user of the portable information terminal 700. In addition, the storage unit 710 can store an operating program downloaded through the Internet 200 and various data created by the operating program. Further, the storage unit 710 can store such contents as moving images, still images, and sounds that are downloaded through the Internet 200. A part of the memory region of the storage unit 710 may be used to substitute for a part or the whole of the function of the ROM 703. Also, the storage unit 710 needs to retain the stored information even when power is not supplied to portable information terminal 700 from an external power source. Therefore, the storage unit 710 is provided as, for example, a non-volatile semiconductor element memory such as flash ROM or SSD or a magnetic disc drive such as HDD.

Note that the operating programs stored in the ROM 703 and the storage unit 710 can be added, updated and functionally extended by the downloading process from server devices on the Internet 200.

The communication processing unit 720 includes a LAN communication unit 721, a mobile phone network communication unit 722, and an NFC communication unit 723. The LAN communication unit 721 is connected to the Internet 200 via the router device 200r and the access point 200a, and transmits and receives data to and from server devices and other communication equipment on the Internet 200. The LAN communication unit 721 is connected to the router device 200r and the access point 200a through wireless communication such as Wi-Fi (registered trademark). The mobile phone network communication unit 722 performs telephone communication (telephone call) and data transmission and reception through wireless communication with the base station 600b on the mobile phone communication network. The NFC communication unit 723 communicates wirelessly with the corresponding reader/writer when located in proximity to the reader/writer. The LAN communication unit 721, the mobile phone network communication unit 722, and the NFC communication unit 723 each have a coding circuit, a decoding circuit, an antenna, and others. The communication processing unit 720 may further includes other communication units such as a BlueTooth (registered trademark) communication unit and an infrared communication unit.

The extension interface unit 724 is a group of interfaces for extending the function of the portable information terminal 700, and is configured of a video and audio interface, a USB interface, a memory interface, and others in this embodiment. The video and audio interface receives video and audio signals from external video and audio output devices, and outputs video and audio signals to external video and audio input devices. The USB interface is connected to a PC and others and transmits and receives data to and from the PC and others. A keyboard and other USB devices may also be connected to the USB interface. A memory card and other memory media are connected to the memory interface to transmit and receive data to and from them.

The operation unit 730 is an instruction input unit that inputs operation instructions to the portable information terminal 700. In this embodiment, the operation unit 730 is composed of a touch panel 730t overlaid on a display unit 741 and operation keys 730k in which button switches are arranged. The operation unit 730 may be composed of either the touch panel 730t or the operation keys 730k. The portable information terminal 700 may be operated using a keyboard or the like connected to the extension interface unit 724, or may be operated using a separate terminal device connected through wired communication or wireless communication. Namely, the portable information terminal 700 may be operated through instructions from the broadcast receiving apparatus 100. Also, the display unit 741 may be provided with the above-described touch panel function.

The image processing unit 740 includes the display unit 741, an image signal processing unit 742, a first image input unit 743, and a second image input unit 744. The display unit 741 is, for example, a display device such as liquid crystal panel, and offers image data processed in the image signal processing unit 742 to the user of the portable information terminal 700. The image signal processing unit 742 has a video RAM (not shown), and the display unit 741 is driven based on image data input to the video RAM. Also, the image signal processing unit 742 has a function of performing processes of converting formats, superposing a menu and other OSD (On Screen Display) signals, and others when necessary. Each of the first image input unit 743 and the second image input unit 744 is a camera unit that inputs image data of surroundings or a target object by converting light input through a lens into electrical signals by using an electronic device such as a CCD (Charge Coupled Device) and CMOS (Complementary Metal Oxide Semiconductor) sensor.

The audio processing unit 750 includes an audio output unit 751, an audio signal processing unit 752, and an audio input unit 753. The audio output unit 751 is a speaker, and offers an audio signal processed in the audio signal processing unit 752 to the user of the portable information terminal 700. The audio input unit 753 is a microphone, and converts the voice of the user and others into audio data to input it to the portable information terminal 700.

The sensor unit 760 is a group of sensors that detect the state of the portable information terminal 700, and includes a GPS receiving unit 761, a gyrosensor 762, a geomagnetic sensor 763, an acceleration sensor 764, an illuminance sensor 765, and a proximity sensor 766 in this embodiment. These sensors make it possible to detect the location, tilt, angle, and motion of the portable information terminal 700, and the brightness and the proximity of an object around the portable information terminal 700. The portable information terminal 700 may further include other sensors such as a pressure sensor in addition to these sensors.

The portable information terminal 700 may be provided as a cellular phone, a smartphone, or a tablet terminal, or may be provided as a PDA (Personal Digital Assistants), a notebook PC, or the like. Alternatively, the portable information terminal 700 may be provided as a digital still camera, a video camera capable of taking moving pictures, a portable game machine, a navigation device, or other portable digital devices.

The configuration example of the portable information terminal 700 shown in FIG. 10A includes a number of constituent elements that are not essential to this embodiment such as the sensor unit 760, but even the configuration that does not include such constituent elements does not impair the effect of this embodiment. The portable information terminal 700 may further include additional constituent elements (not shown) such as a digital broadcast receiving function and an electronic money settlement function.

[Software Configuration of Portable Information Terminal]

FIG. 10B is a software configuration diagram of the portable information terminal 700 of this embodiment, and shows respective software configurations of the ROM 703, the RAM 704, and the storage unit 710. In this embodiment, the ROM 703 stores a basic operating program 7001 and other operating programs, and the storage unit 710 stores a cooperation control program 7002 and other operating programs. Also, the storage unit 710 includes a contents memory region 7200 storing such contents as moving images, still images, and sounds, an authentication information memory region 7300 storing authentication information and others needed when access is made to the television receiver or each server device, and a various information memory region storing other various types of information.

The basic operating program 7001 stored in the ROM 703 is loaded onto the RAM 704, and the loaded basic operating program is executed by the main control unit 701 to configure a basic operation executing unit 7101. Similarly, the cooperation control program 7002 stored in the storage unit 710 is loaded onto the RAM 704, and the loaded cooperation control program 7002 is executed by the main control unit 701 to configure a cooperation control executing unit 7102. Also, the RAM 704 has a temporary memory region that temporarily saves data created at execution of each operating program when necessary.

In the following, for simpler description, a process in which the main control unit 701 loads the basic operating program 7001 from the ROM 703 onto the RAM 704 and executes the basic operating program 7001 to control each operating block is described simply as a process in which the basic operation executing unit 7101 performs control of each operating block. The same applies also to the description of other operating programs.

The cooperation control executing unit 7102 manages device authentication, connection, data transmission and reception, and others when the portable information terminal 700 performs operations cooperated with the television receiver. Also, the cooperation control executing unit 7102 has a browser engine function for executing an application cooperated with the television receiver.

The above-described operating programs may be stored in advance in the ROM 703 and/or the storage unit 710 at the time of product shipment, or may be acquired from the other application server 500 and others on the Internet 200 through the LAN communication unit 721 or the mobile phone network communication unit 722 after the product shipment. Alternatively, the operating programs stored in a memory card, optical disc, and others may be acquired through the extension interface unit 724 and others.

[Time Management of Broadcast Receiving Apparatus]

The broadcast receiving apparatus of this embodiment has two types of time management functions. The first time management function is the time management function based on the NTP, which has been already described above with reference to FIG. 7C. The second time management function is a time management function based on an MH-TOT, and is the time managed based on time information transmitted by the MH-TOT described in FIG. 6B.

FIG. 13A shows an example of a configuration of time information transmitted in the NTP format. FIG. 13B shows an example of the data structure of the above-described MPU timestamp descriptor. A "reference_timestamp" parameter, "transmit_timestamp" parameter, and others in the NTP format represent time data in the NTP-length format with a 64-bit length, and an "mpu_presentation_time" parameter in the MPU timestamp descriptor also represents time data in the NTP timestamp format with a 64-bit length. In the time data in the NTP-length format and the time data in the NTP timestamp format, "second or more" of UTC is expressed by 32 bits, and "less than second" is also expressed by 32 bits. Namely, the time information in the NTP format can transmit the time information up to "less than second". Further, since the time information in the NTP format is expressed by the UTC notation, it is compatible with NTP data included in a signal received through the communication line (e.g., signal received by the LAN communication unit 121 of FIG. 7A) as shown in FIG. 3(B), unlike the clock management in the conventional digital broadcasting.

Meanwhile, the information transmitted by the MH-TOT is as follows. The broadcast receiving apparatus 100 can acquire the current date and Japan Standard Time through the MH-TOT. FIG. 11A shows an example of the data structure of the MH-TOT. The broadcast receiving apparatus 100 can acquire the current date and current time from a "JST_time" parameter included in the MH-TOT. As shown in FIG. 11B, the "JST_time" parameter includes the information of 16 lower-order bits of coded data of the current date based on the Modified Julian Date (MJD) and the information of 24 bits representing the Japan Standard Time (JST) with 6 blocks of 4-bit binary-coded decimal (BCD). The current date can be calculated by performing a given calculation on the 16-bit coded data of the MJD. The 6 blocks of 4-bit binary-coded decimal are made up of 2 blocks of 4-bit binary-coded decimal that represent "hour" with a two-digit decimal number, next 2 blocks of 4-bit binary-coded decimal that represent "minute" with a two-digit decimal number, and last 2 blocks of 4-bit binary-coded decimal that represent "second" with a two-digit decimal number.

Thus, the difference between time information based on the NTP and time information based on the MH-TOT is that the NTP is the information expressed in the UTC notation that covers time units up to "less than second" as described above, while the information based on the MH-TOT is the information expressed in the JST notation that covers time units up to "second".

In the broadcast receiving apparatus 100 of this embodiment, the time management function based on the NTP that is the time information expressed in the UTC notation is used for the synchronization in decoding process and display process of broadcasting signal contents including video, audio, subtitles, and captions, and other presentation data, and thus it is possible to achieve a highly accurate synchronization process. Further, by referring to time information expressed in the UTC notation instead of time information based on clocks of the broadcast station, it is also possible to perform the synchronization in decoding process and display process between broadcasting signal contents received by broadcasting signals including video, audio, subtitles, captions, and other data and data received through the communication line including video, audio, subtitles, and captions, and other data.

In addition, in the broadcast receiving apparatus 100 of this embodiment, the time management function based on the "JST_time" including the 24-bit information expressed by 6 blocks of 4-bit binary-coded decimal in the MH-TOT may be used for performing each of the process of presenting the current time to the user and the process handling the MH-event information table (MH-EIT) described in FIG. 6B. In general, in the process of presenting the current time to the user, the broadcast receiving apparatus is rarely required to have the accuracy to the extent of less than "second". Each piece of time information in the MH-event information table (MH-EIT) is stored as 24-bit information composed of 6 blocks of 4-bit binary-coded decimal, expressing "hour", "minute", and "second" with two-digit decimal numbers, like the EIT for conventional digital broadcasting that is transmitted by the MPEG2-TS method. For this reason, the time management function based on the MH-TOT of the broadcast receiving apparatus 100 of this embodiment easily matches with a process using the MH-EIT. The process using the MH-EIT includes, specifically, a process of creating a program guide (to be described later), a process of controlling timer recording and viewing reservation, a process of protecting copy rights such as temporary data storage, and others. This is because each of these processes is rarely required to have the accuracy to the extent of less than "second", and the accuracy covering up to time unit "second" is enough.

Also, the process of creating a program guide, the process of controlling timer recording and viewing reservation, and the process of protecting copy rights such as temporary data storage are functions incorporated even in a receiver of the conventional digital broadcasting system using the MPEG2-TS method. Accordingly, if the broadcasting system of this embodiment is configured in such a way as to exert the time management process compatible with the time management function of the conventional digital broadcasting system using the MPEG2-TS method in performing the process of creating a program guide, the process of controlling timer recording and viewing reservation, the process of protecting copy rights such as temporary data storage, and others, it becomes unnecessary to separately design process algorithms for these processes (process of creating a program guide, process of controlling timer recording and viewing reservation, process of protecting copy rights such as temporary data storage, etc.) when the broadcast receiving apparatus having both of a receiving function of digital broadcasting by the conventional MPEG2-TS method and a receiving function of digital broadcasting by the MMT method is configured, and the cost is thus reduced.

Also, even in a receiver that does not have the receiving function of digital broadcasting by the conventional MPEG2-TS method but has only the receiving function of digital broadcasting by the MMT method, algorithms for the function incorporated in the receiver of digital broadcasting system using the conventional MPEG2-TS method can be applied without creating new algorithms for the processes of creating a program guide, controlling timer recording and viewing reservation, protecting copy rights such as temporary data storage, and others, and thus the development with less cost is possible.

Consequently, with the configuration in which the time management function based on the "JST_time" parameter in the MH-TOT is used for performing these processes (process of creating a program guide, process of controlling timer recording and viewing reservation, process of protecting copy rights such as temporary data storage, etc.), even the broadcast receiving apparatus for the digital broadcasting by the MMT method is made highly compatible with the broadcasting system using the conventional broadcasting method, and therefore can be provided at low cost.

As describe above, the broadcast receiving apparatus 100 of this embodiment has the time management function using two types of time information different in accuracy from each other. One time information is expressed in the notation consistent with the conventional digital broadcasting system, while the other time information has higher resolution power than the one time information. Using the latter time information for the process of synchronizing contents data of broadcasting signals achieves the information presentation process more accurate than that in the conventional broadcasting system, and using the former time information for the processes of creating a program guide, controlling timer recording and viewing reservation, protecting copy rights such as temporary data storage, and others allows the broadcast receiving apparatus to be provided at low cost.

Therefore, the broadcast receiving apparatus 100 of this embodiment has the two types of time management function described above, and it is thus possible to achieve both of the highly accurate information presentation and the cost reduction.

First Modification Example of Time Management

Next, a first modification example of the time management in the broadcasting system of this embodiment will be described below.

In the configuration of the first modification example, in order to improve the accuracy of time management by the NTP-based time management function that has already been described with reference to FIG. 7C, information related to an estimated delay time in time information transmission from a time management server (not shown) or the broadcast station server 300 to the broadcast receiving apparatus 100 is included in a broadcasting signal to be transmitted, and the information related to the estimated delay time is used to correct a system clock for the NTP-based time management function in the broadcast receiving apparatus 100.

At this time, the information related to the estimated delay time may be included in a TMCC (Transmission and Multiplexing Configuration Control) region outside the TLV multiplexing stream instead of the TLV multiplexing stream shown in FIG. 3(A). By transmitting the information in the TMCC region, the information related to the estimated delay time can be extracted without performing a process of separating the TLV multiplexing stream (demultiplexing process) in the broadcast receiving apparatus 100. Namely, the information acquisition that is less likely to be affected by the delay in the separating process in the broadcast receiving apparatus 100 is possible, and thus a highly accurate correcting process of the system clock can be performed. An example of the data structure of time information transmitted in the TMCC signal will be described with reference to FIG. 13C. For example, the time information is preferably stored in a TMCC extension information region to be transmitted. In the time information in the TMCC extension information region of FIG. 13C, a "delta" parameter expresses the estimated value of transmission delay from a time management server that distributes the UTC or a server device that generates a TMCC signal to a general broadcast receiving apparatus, in the form of a 32-bit signed fixed-point value. Note that the 16 high-order bits thereof represent an integer part and 16 low-order bits thereof represent a decimal fraction. A "transmit_timestamp" parameter is a transmission timestamp, and expresses a time at which the TMCC signal is transmitted from the server device, in the NTP timestamp-length format. The 32 high-order bits thereof represent an integer part, and the 32 low-order bits thereof represent a decimal fraction.

In the first modification example, the broadcast receiving apparatus 100 of this embodiment can correct more accurately the system clock for the NTP-based time management function, which is used for the process of synchronizing contents data of broadcasting signals, by using the information related to the estimated delay time (e.g., the "delta" parameter and/or the "transmit_timestamp" parameter) described in the time information stored and transmitted in the TMCC extension information region.

Second Modification Example of Time Management

Next, a second modification example of the time management in the broadcasting system of this embodiment will be described below.

As describe above, the broadcast receiving apparatus 100 of this embodiment has the time management function of managing the time by acquiring the current date and the Japan Standard Time from the information transmitted in the MH-TOT. The current date and the Japan Standard Time acquired from the information transmitted in the MH-TOT are superposed on video information, application information, and others in the video synthesizing unit 161 of the broadcast receiving apparatus 100, and are offered to the user by outputting them to the monitor unit 162 and video output unit 163. As described above, the MH-TOT has the data structure shown in FIG. 11A, and the broadcast receiving apparatus 100 can acquire the current date and the current time from the "JST_time" parameter in the MH-TOT.

However, since the "JST_time" parameter uses only the 16 low-order bits of the MJD coded data, calculation for determining a date of "Apr. 22, 2038" ends up in arithmetic overflow, and the above-described predetermined calculation cannot express the date following "Apr. 23, 2038". To deal with this problem, in the second modification example of this embodiment, the calculation method is switched depending on whether the value of the MJD is equal to or larger than a given value or the value is smaller than the given value so that the date following "Apr. 23, 2038" can be expressed.

FIG. 12 shows a first calculation method that is used when the value of the MJD is equal to or larger than the given value and a second calculation method that is used when the value of the MJD is smaller than the given value. For example, when the given value is set to "32768 (0x8000)", the current date is calculated by using the first calculation method in the case where the value of the MJD is equal to or larger than "32768", and is calculated by using the second calculation method in the case where the value of the MJD is smaller than "32768". Note that the case in which the value of the MJD is smaller than "32768" is equivalent to the case in which the most significant bit of the 16-bit data of the MJD is "0". In this manner, the broadcast receiving apparatus 100 of this embodiment can express the date following "Apr. 23, 2038". However, the given value can be determined arbitrarily, and it may be set to, for example, "16384 (0x4000)" or "49152 (0xC000)". The condition for switching the calculation method may be set to the case where the 2 high-order bits of the 16-bit data of the MJD are "00" or the case where the 2 high-order bits of the 16-bit data of the MJD are not "11". Note that, when the given value is set to "32768" and the above-described method is used, a date preceding "Sep. 4, 1948" cannot be expressed, but it does not pose a specific problem regarding the practical use of the television receiver.

Alternatively, the first calculation method and the second calculation method may be switched depending on a flag that replaces a part or the whole of a "reserved" parameter in the data structure of the MH-TOT of FIG. 11A or depending on a newly added flag, instead of switching the first calculation method and the second calculation method depending on the result of comparison between the MJD and the given value. For example, in the case where the most significant bit of the 16-bit coded data of the MJD is "0", the flag is set to "1" when the MJD value represents the date following "Apr. 23, 2038", and the flag is set to "0" when the MJD value does not represent the date following "Apr. 23, 2038". Then, when the flag is "1", the second calculation method shown in FIG. 12 is used, while when the flag is "0", the first calculation method is used. Alternatively, a descriptor having the same meaning as the above-mentioned flag may be newly prepared and added to the MH-TOT.

As described above, in the broadcasting system of this embodiment, absolute time data in the NTP format is transmitted, and the broadcast receiving apparatus 100 of this embodiment has the NTP-based time management function. In addition, the broadcast receiving apparatus 100 of this embodiment controls the decoding timing and presentation timing of video and audio signals in units of presentation by referring to NTP timestamps and others described in MPU timestamp descriptors set in units of MPU. As described above, the time information in the NTP format has the configuration shown in FIG. 13A. Also, the MPU timestamp descriptor has the configuration shown in FIG. 13B.

Accordingly, the broadcast receiving apparatus 100 of this embodiment may select either the first calculation method or the second calculation method in accordance with the value of time data and others obtained by referring to the "reference_tiemstamp" parameter, the "transmit_timestamp" parameter, or the "mpu_presentation_time" parameter. Specifically, for example, when the most significant bit of the 64-bit time data in the NTP-length format is "0", the second calculation method is used, and when the most significant bit is not "0", the first calculation method is used.

By any of the above methods, the broadcast receiving apparatus 100 of this embodiment can express the date following "Apr. 23, 2038".

[Channel Selection Process (Initial Scan) in Broadcast Receiving Apparatus]

The AMT of the broadcasting system of this embodiment provides a list of IP packet multicast groups that is used to receive IP packets transmitted by the TLV multiplexing method without distinguishing them from IP packets transmitted through the communication line as much as possible. A plurality of IP multicast groups can be listed for one service identification. In addition, in order to describe a series of IP addresses efficiently, an address mask can be used.

In the broadcast receiving apparatus 100 of this embodiment, a list of services acquired from the TLV-NIT can be stored in a non-volatile memory such as the ROM 103 and the storage unit 110 at the time of channel scan in the initial setting or rescan for the setting change, and a list of IP multicast groups corresponding to the services can be associated with the services as IP-related information and stored in the non-volatile memory. The list of services and IP-related information are stored in the non-volatile memory to be referred to constantly, so that a need of acquiring the TLV-NIT or AMT at the time of channel switching and others is eliminated, and thus the broadcasting contents can be efficiently acquired.

FIG. 14 is a diagram showing an example of an operation sequence at the time of channel scan (rescan) in the broadcast receiving apparatus 100 of this embodiment.

When the channel scan starts, the receiving function executing unit 1102 sets an initial frequency value for the tuner/demodulating unit 131 and instructs the tuner/demodulating unit 131 to tune to the frequency value (S101). When the tuner/demodulating unit 131 succeeds in locking to the set frequency value (S102: Yes), the receiving function executing unit 1102 acquires the TLV-NIT from a received signal (S103).

When the TLV-NIT acquired in the process of S103 is valid data (S104: Yes), the receiving function executing unit 1102 acquires information of a TLV stream ID, an original network ID, and others from the acquired TLV-NIT (S105). FIG. 15A shows an example of the data structure of the TLV-NIT. The information of the TLV stream ID and the information of the original network ID can be acquired from a "tlv_streant_id" parameter and an "original_network_id" parameter, respectively. Furthermore, delivery system information related to physical conditions for the broadcast transmission path corresponding to the TLV stream ID and the original network ID is acquired from a delivery system descriptor (S106), and a service ID list is acquired from a service list descriptor (S107). FIG. 15B shows an example of the data structure of a satellite delivery system descriptor. FIG. 15C shows an example of the data structure of a service list descriptor. Note that, when the TLV-NIT has a plurality of different pieces of data such as the TLV stream ID, the original network ID, the delivery system information, and the service ID list, the processes of S105 to S107 are repeated. Subsequently, the receiving function executing unit 1102 creates a service list based on data acquired in the processes of S105 to S107 such as the TLV stream ID, the original network ID, the delivery system information, and the service ID list, and stores the created service list in the ROM 103 or the storage unit 110 (updates the service list at the time of rescan) (S108).

Next, the receiving function executing unit 1102 then acquires an AMT from the received signal (S109), and further acquires a list of IP multicast groups related to each service ID stored in the service list (S110). FIG. 15D shows an example of the data structure of the AMT. Note that, when the AMT has lists of IP multicast groups related to a plurality of service IDs, the process of S110 is repeated. When there are a plurality of AMTs having lists of IP multicast groups related to different service IDs, the processes of S109 and S110 are repeated. Next, the receiving function executing unit 1102 then associates the list of IP multicast groups acquired in the process of S110 with the service ID as IP-related information, and stores the IP-related information in the ROM 103 or the storage unit 110 (updates the IP-related information at the time of rescan) (S111).

When the tuner/demodulating unit 131 fails in locking to the set frequency value in the process of S102 (S102: No) and when the TLV-NIT acquired in the process of S103 is not valid data (S104: No), the processes of S105 to S111 are not performed.

After finishing the process of S111, when finding that the frequency value set for the tuner/demodulating unit 131 is a final frequency value in a channel scan range (S112: Yes), the receiving function executing unit 1102 ends the operation sequence. Meanwhile, when finding that the set frequency value is not the final frequency value in the channel scan range (S112: No), the receiving function executing unit 1102 increases the frequency value set for the tuner/demodulating unit 131 (S113) and repeats the processes of S102 to S111. Note that, if the service IDs for all services making up the broadcasting network can be acquired from one TLV-NIT and an AMT having lists of IP multicast groups related to the service IDs can be acquired, the processes of S112 and S113 are unnecessary.

Through the series of processes described above, when performing the channel scan for initial setting or the rescan for setting change, the broadcast receiving apparatus 100 of this embodiment can create/update a list of services making up the broadcasting network (service list), and at the same time, create/update a list of IP multicast groups corresponding to each service (IP-related information) and store the created service list and IP-related information in a non-volatile memory such as the ROM 103 and the storage unit 110.

Note that the rescan for setting change may be automatically performed when a change in the information in the table is detected by referring to respective "version_number" parameters of the TLV-NIT and AMT. When a change in the "version_number" parameter of either the TLV-NIT or AMT is detected, only the information related to the table in which the change in parameter is detected may be automatically updated. However, when the above-described automatic updating is performed, execution of the automatic rescan should preferably be reported to the user. Alternatively, the change in the information in the table may be reported to the user so that the user makes a decision on whether or not to perform the rescan.

[Channel Selection Process (Channel Switching) in Broadcast Receiving Apparatus]

Figure 16:
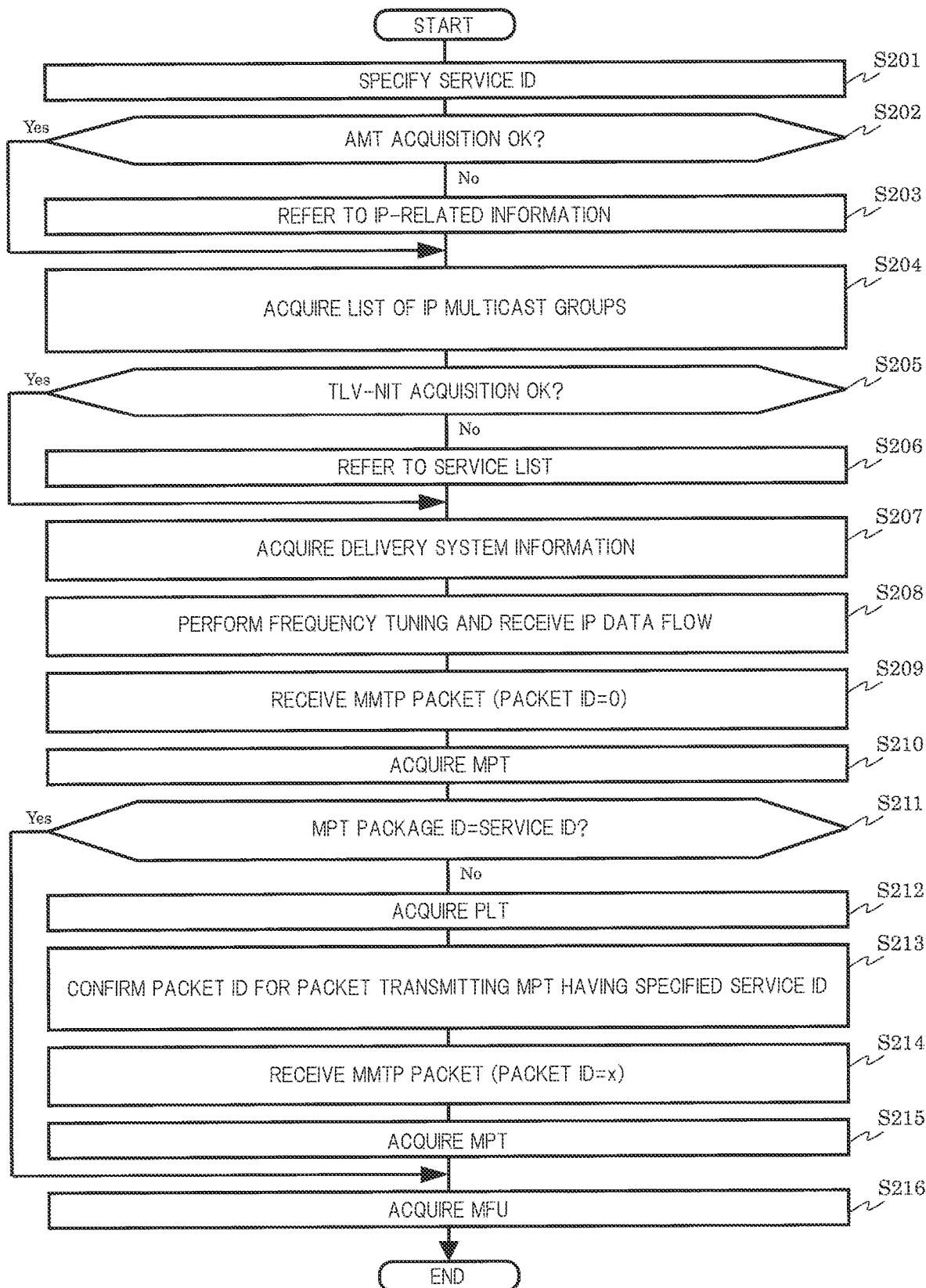
FIG. 16 is an operation sequence diagram at the time of channel selection of the broadcast receiving apparatus according to the first embodiment.

FIG. 16 is a diagram showing an example of an operation sequence at the time of channel selection (channel switching) in the broadcast receiving apparatus 100 of this embodiment.

When the user gives a command to switch a channel by operating a remote controller and others (not shown), the receiving function executing unit 1102 interprets the command transmitted from the remote controller and specifies a service ID of an intended service (S201). Next, the receiving function executing unit 1102 then starts to acquire an AMT from the signal received from the tuner/demodulating unit 131. When succeeding in acquiring the AMT within a given time (S202: Yes), the receiving function executing unit 1102 acquires information related to a list of IP multicast groups corresponding to the service ID, from the acquired AMT (S204). When failing to acquire the AMT within the given time (S202: No), the receiving function executing unit 1102 refers to the IP-related information stored in the ROM 103 or the storage unit 110 (S203), thereby acquiring information related to the list of IP multicast groups corresponding to the service ID (S204). Note that the receiving function executing unit 1102 may always refer to the IP-related information stored in the ROM 103 or the storage unit 110 without performing the determination process of S202.

Subsequently, the receiving function executing unit 1102 starts to acquire the TLV-NIT from the signal received from the tuner/demodulating unit 131. When succeeding in acquiring the TLV-NIT within a given time (S205: Yes), the receiving function executing unit 1102 acquires delivery system information for acquiring an IP data flow corresponding to the service ID, from the acquired TLV-NIT (S207). When failing to acquire the TLV-NIT within the given time (S205: No), the receiving function executing unit 1102 refers to the service list stored in the ROM 103 or the storage unit 110 (S206), thereby acquiring the delivery system information for acquiring the IP data flow corresponding to the service ID (3207). Note that the receiving function executing unit 1102 may always refer to the service list stored in the ROM 103 or the storage unit 110 without performing the determination process of S205. When the delivery system information has been acquired in the process of S207, the receiving function executing unit 1102 then controls the tuner/demodulating unit 131 with the frequency value specified by the acquired delivery system information, receives the IP data flow corresponding to the service ID (S208), extracts an MMT data string from the received IP data flow, and outputs the MMT data string to the separating unit 132.

In the separating unit 132, the transport processing unit 1102a acquires an MMTP packet with a packet ID "0", from the input MMT data string (S209), and further acquires an MPT from the acquired MMTP packet (S210). Next, the transport processing unit 1102a then refers to an "MMT_package_id_byte" parameter included in the acquired MPT, and checks whether the 16 low-order bits of the "MMT_package_id_byte" parameter have the same value as the service ID. When the 16 low-order bits of the "MMT_package_id_byte" parameter have the same value as the service ID in the example of the data structure of the MPT shown in FIG. 17 (S211: Yes), it is determined that the MMTP packet with the packet ID "0" is an MMTP packet having the data of the program corresponding to the service ID, and acquisition of an MFU is executed based on information included in the acquired MPT (S216).

Meanwhile, when the 16 low-order bits of the "MMT_package_id_byte" parameter do not have the same value as the service ID (S211: No), it is determined that the MMTP packet with the packet ID "0" is not the MMTP packet having data of the program corresponding to the service ID. In this case, the transport processing unit 1102a newly acquires a PLT (S212), and checks the acquired PLT to confirm a packet ID (x in this case) of an MMTP packet that transmits an MPT having the "MMT_package_id_byte" parameter corresponding to the service ID (S213). Further, the transport processing unit 1102a then acquires an MMTP packet with a packet ID "x" from the above-mentioned input MMT data string (S214), and acquires an MPT from the acquired MMTP packet (S215). Also, the transport processing unit 1102a then acquires an MFU based on information included in the acquired MPT (S216).

Note that the transport processing unit 1102a may always perform the processes of S212 to S215 without performing the processes of S209 to S211. In this case, the process time can be reduced when the data of the program corresponding to the service ID is stored in an MMTP packet other than the MMTP packet with the packet ID "0".

After the MFU is acquired in the process of S216, the transport processing unit 1102a extracts coded video data, coded audio data, and others from the acquired MFU, and outputs the coded video data, coded audio data, and others to the video decoder 141, audio decoder 143, and others. Thereafter, a video and audio decoding process under the control by the AV decode processing unit 1102b and a presentation process under the control by the presentation processing unit 1102h are performed, but these processes are known to the public and detailed descriptions thereof are omitted.

Through the series of processes described above, the broadcast receiving apparatus 100 of this embodiment can execute a channel selection (channel switching) operation. In particular, as described above with reference to FIGS. 14 and 16, a service list and IP-related information are created and are stored in a non-volatile memory such as the ROM 103 and the storage unit 110 so as to be referred to constantly at the time of channel scan for initial setting or rescan for setting change, and the service list and IP-related information stored in a non-volatile memory such as the ROM 103 and the storage unit 110 are referred to at the time of channel selection (channel switching), so that the efficiency of the channel selection (channel switching) operation can be improved. Namely, the time taken from the start to end of the channel selection (channel switching) can be reduced, compared to a case where the AMT and TLV-NIT are acquired again at the time of channel selection (channel switching).

[Screen Layout Control of Broadcast Receiving Apparatus]

The broadcast receiving apparatus 100 of this embodiment can control the screen layout based on the description of an LCT. FIG. 18 shows an example of the data structure of the LCT.

In FIG. 18, a "left_top_pos_x" parameter and a "right_down_pos_x" parameter indicate a horizontal position on the top left of a region and a horizontal position on the bottom right of the region in terms of the ratio of the number of pixels to the total number of pixels arranged in the horizontal direction, respectively, when the left side of the full-screen display is defined as "0" and the right side of the same is defined as "100". A "left_top_pos_y" parameter and a "right_down_pos_y" parameter indicate a vertical position on the top left of the region and a vertical position on the bottom right of the region in terms of the ratio of the number of pixels to the total number of pixels arranged in the vertical direction, respectively, when the top side of the full-screen display is defined as "0" and the bottom side of the same is defined as "100". Also, a "layer_order" parameter indicates a relative position in the depth direction of the region.

Examples of layout assignment to layout numbers based on the parameter settings are shown in FIGS. 19A to 19D together with set values for the parameters.

FIG. 19A shows default layout setting of the broadcast receiving apparatus 100 of this embodiment, and shows an example in which one region is set for the full-screen. FIG. 19B shows an example in which the full-screen is divided into three regions, and the respective regions are defined as "region 0", "region 1" and "region 2". For example, when the full-screen is made up of 7680 horizontal pixels×4320 vertical pixels, the "region 0" is set within a range of (0, 0)-(6143, 3455) because the "left_top_pos_x" parameter is "0", the "left_top_pos_y" parameter is "0", the "right_down_pos_x" parameter is "80", and the "right_down_pos_y" parameter is "80". In the same manner, the "region 1" is set within a range of (6144, 0)-(7679, 4319), and the "region 2" is set within a range of (0, 3456)-(6143, 4319).

FIG. 19C shows an example in which three regions are set like the example of FIG. 19B. In the example of FIG. 19C, however, the "region 0" is set within a range of (0, 0)-(7679, 4319), and the "region 1" and "region 2" are set within the same ranges of the "region 1" and "region 2" described above and are located in front of the "region 0" in accordance with the setting of the "layer_order" parameter. FIG. 19D shows an example in which the "region 0" is set in a device 0 (default device: broadcast receiving apparatus 100 in this embodiment) and the "region 1" is set in a device 1 (portable information terminal 700 in this embodiment).

As described above, in the broadcasting system of this embodiment, screen layout control for displaying multimedia services on the receiver in a manner intended by the service provider can be performed by using the LCT.

Note that decimal fractions that are generated when the screen is divided in accordance with the setting values of the "left_top_pos_x" parameter and others are rounded up or down, or rounded off (or in the case of binary numbers, "0" is rounded down while "1" is rounded up). For example, when the full-screen is made up of 7680 horizontal pixels× 4320 vertical pixels and the "left_top_pos_x" parameter of the "region 0" is "0", the "left_top_pos_y" parameter is "0", the "right_down_pos_x" parameter is "51", and the "right_down_pos_y" parameter is "51", the "region 0" may be set within a range of (0, 0)-(3916, 2203) by rounding up decimal fractions or may be set within a range of (0, 0)-(3915, 2202) by rounding down decimal fractions. Alternatively, decimal fractions may be rounded up or down in units of 8-pixel blocks or 16-pixel blocks in consideration of macro-blocks at the time of an image compression process. Through the process described above, region setting based on the LCT and conversion of the resolution of multimedia contents in the above region can be performed efficiently.

[Exceptional Process of Screen Layout Control of Broadcast Receiving Apparatus]

Figure 20A:
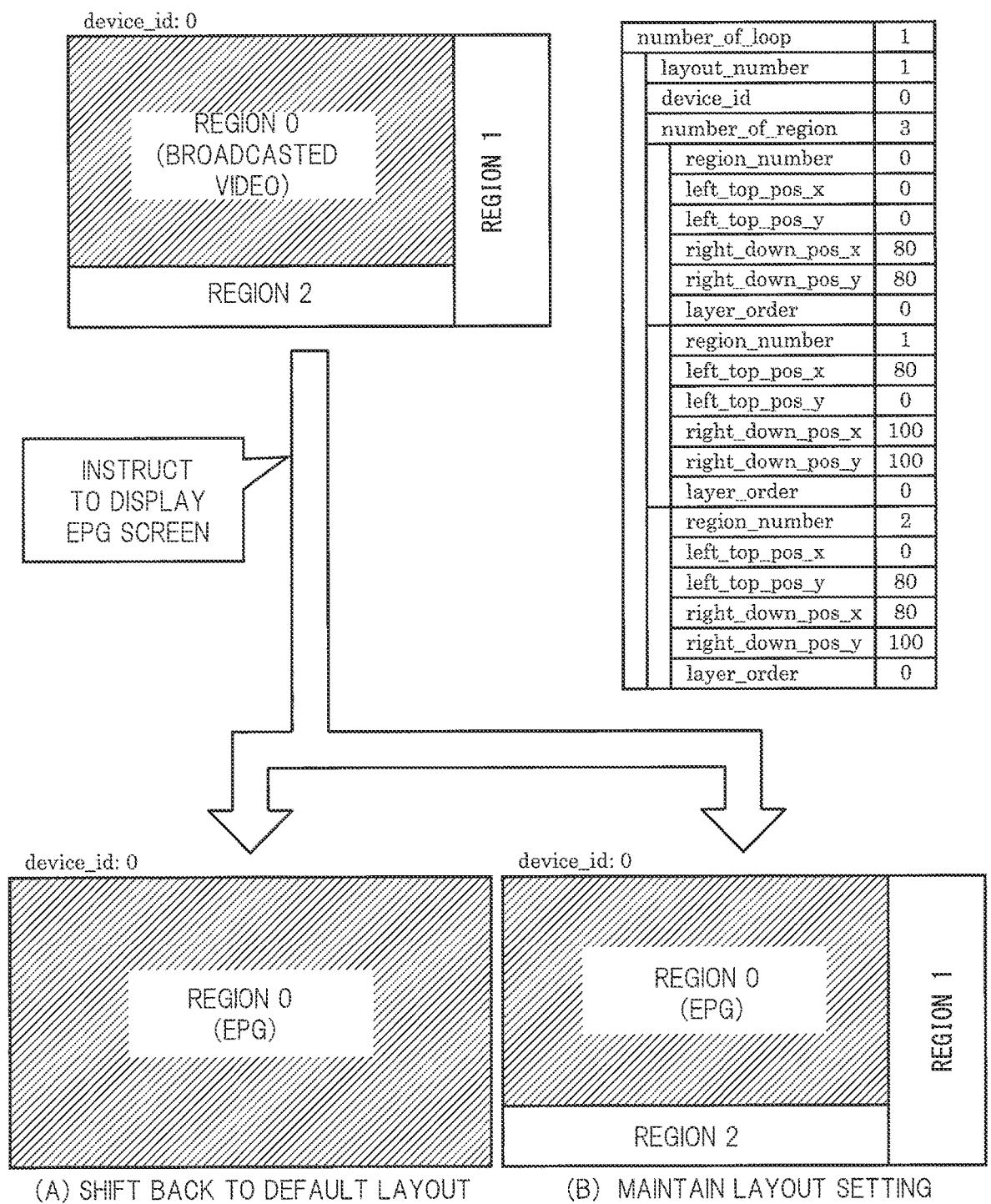
FIG. 20A is an explanatory diagram of an operation of an exceptional process of screen layout control based on the LCT.

Even when the control of the screen layout region is performed based on the LCT in the broadcast receiving apparatus 100 of this embodiment, if the user gives an instruction to display an EPG screen, the broadcast receiving apparatus 100 of this embodiment can perform the screen layout control in which the descriptive contents of the LCT is left out of account, as an exceptional process. FIG. 20A shows an example of an operation of the exceptional process of the screen layout control based on the LCT.

When the screen layout control similar to that shown in FIG. 19B is performed based on the descriptive contents of the LCT, a video of broadcasting program is displayed in the "region 0", and broadcasting contents such as program-cooperation data cooperated with the broadcasting program are displayed in the "region 1" and the "region 2", if the user gives an instruction to display an EPG screen with the remote controller (not shown), the broadcast receiving apparatus 100 of this embodiment shifts the screen layout setting back to the default setting (i.e., a state in which the screen layout control similar to that shown in FIG. 19A is performed) as shown in FIG. 20A(A) regardless of the descriptive contents of the LCT, and controls the screen layout to display the EPG screen on the entire screen. Further, when the user gives an instruction to end the display of the EPG screen, the broadcast receiving apparatus 100 executes again the screen layout control in accordance with the descriptive contents of the LCT.

By performing the control described above, the EPG screen can be displayed in a large size and easiness to see the EPG screen can be improved, compared to the case where the EPG screen is displayed while maintaining the control of screen layout region as shown in FIG. 20A(B).

Figure 20B:
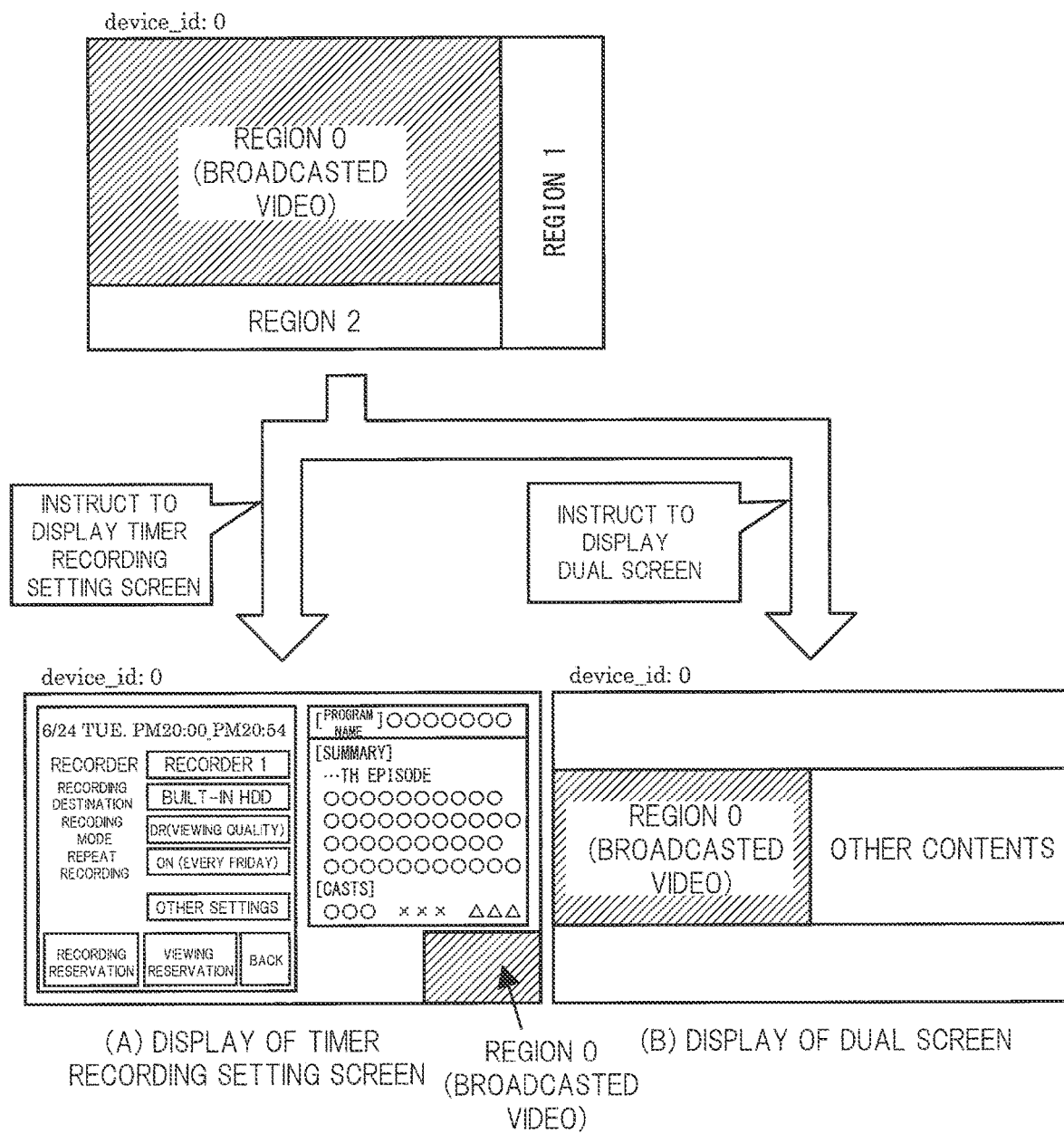
FIG. 20B is an explanatory diagram of an operation of an exceptional process of screen layout control based on the LCT.

Note that the exceptional process of the screen layout control is applied not only to the case of displaying the EPG screen but also to the case of displaying sub-screens of various setting screens (timer recording setting screen in the example of FIG. 20B(A)) or displaying dual screens in the broadcast receiving apparatus 100, as shown in FIG. 20B.

In the case of the timer recording setting screen shown in FIG. 20B(A), the display area of broadcasting contents is shifted from the full-screen region to a sub-screen region on the right bottom corner of the screen. In the case of the dual screen display shown in FIG. 20B(B), the display area of broadcasting contents is shifted from the full-screen region to a divided screen region in the middle left side of the screen. In both cases, since the display area for displaying broadcasting contents is narrowed, compared to the case of using the entire screen, it is not preferable to maintain the control of screen layout region in the display area (that is, a plurality of broadcasting contents are kept displayed simultaneously in divided regions) from the viewpoint of offering fine visibility. For this reason, in the above-described situation, the broadcast receiving apparatus 100 of this embodiment selects the broadcasting contents of the "region 0" and displays only the selected contents in the display area. Note that the broadcasting contents of the "region 1" or "region 2" may be selected and displayed depending on a region selection state right before the selection.

By performing the control described above, the easiness to see the broadcasting contents can be improved, compared to the case where various broadcasting contents are displayed while maintaining the control of screen layout region. The same applies also to the cases of displaying a sub-screen for a timer recording program list, displaying internet contents on a browser, and others.

[Display of EPG in Broadcast Receiving Apparatus]

In the broadcasting system of this embodiment, time-series information related to events (so-called programs) included in services making up the broadcasting network is transmitted in the form of MH-EIT. FIG. 21 shows an example of the data structure of the MH-EIT of this embodiment. The MH-EIT is classified into two classes by a table ID (corresponding to a "table_id" parameter in FIG. 21), and can provide information of the current and next events in its own TLV stream and schedule information of events in its own TLV stream. The broadcast receiving apparatus 100 of this embodiment refers to the MH-EIT and others to identity a service with a service ID (corresponding to a "service_id" parameter in FIG. 21), thereby acquiring information of the start time, broadcasting time, and others of each event to create an EPG screen. Further, the broadcast receiving apparatus 100 can display the created EPG screen on the monitor unit 162 by superposing it on video information and others in the video synthesizing unit 161.

Figure 22A:
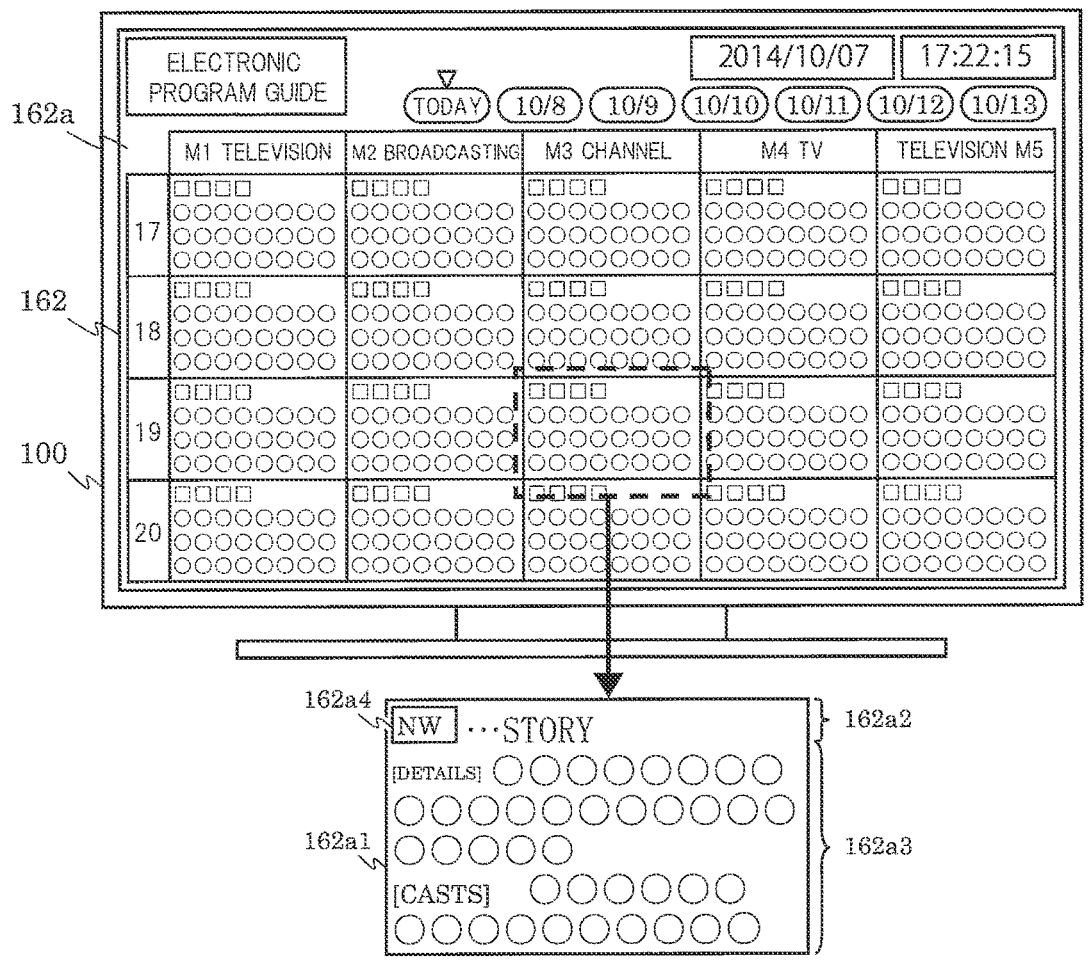
FIG. 22A is a screen display diagram of an EPG screen of the broadcast receiving apparatus according to the first embodiment.

FIG. 22A is a diagram showing an example of an EPG screen in the broadcast receiving apparatus 100 of this embodiment. An EPG screen 162*a* has a matrix form with the vertical axis representing time and the horizontal axis representing service IDs (channels), and displays detailed information of broadcasting programs to be broadcasted in each channel in each time zone. Also, detailed information 162*a*1 of each broadcasting program is composed mainly of a title region 162*a*2 and a detail description region 162*a*3.

In the title region 162*a*2, symbols and others expressing the title and properties of the broadcasting program are displayed. The symbols and others expressing the properties of the broadcasting program are, for example, symbols/characters indicating that the broadcasting program is a new program or rerun program, or may be a mark or the like standing for "data" indicating that the program supports data broadcasting by a broadcasting service, or may be a mark 162*a*4 or the like standing for "NetWork" indicating that contents, applications, and others related to the broadcasting program can be acquired through the network. In addition, the symbols and others expressing the properties of the broadcasting program may be substituted by differentiating the background color of the detailed information 162*a*1 from others or enclosing the display region of the detailed information 162*a*1 with a thick line.

Note that, even when control information (messages, tables, descriptors, etc.) in the broadcasting system of this embodiment indicates that contents, applications, and others related to the broadcasting program can be acquired through the network, if access to server devices on the network cannot be made for such a reason that a LAN cable is not connected to the LAN communication unit 121 of the broadcast receiving apparatus 100, the screen may be controlled so as not to display the mark 162a4 or the like standing for "NetWork".

Figure 22B:
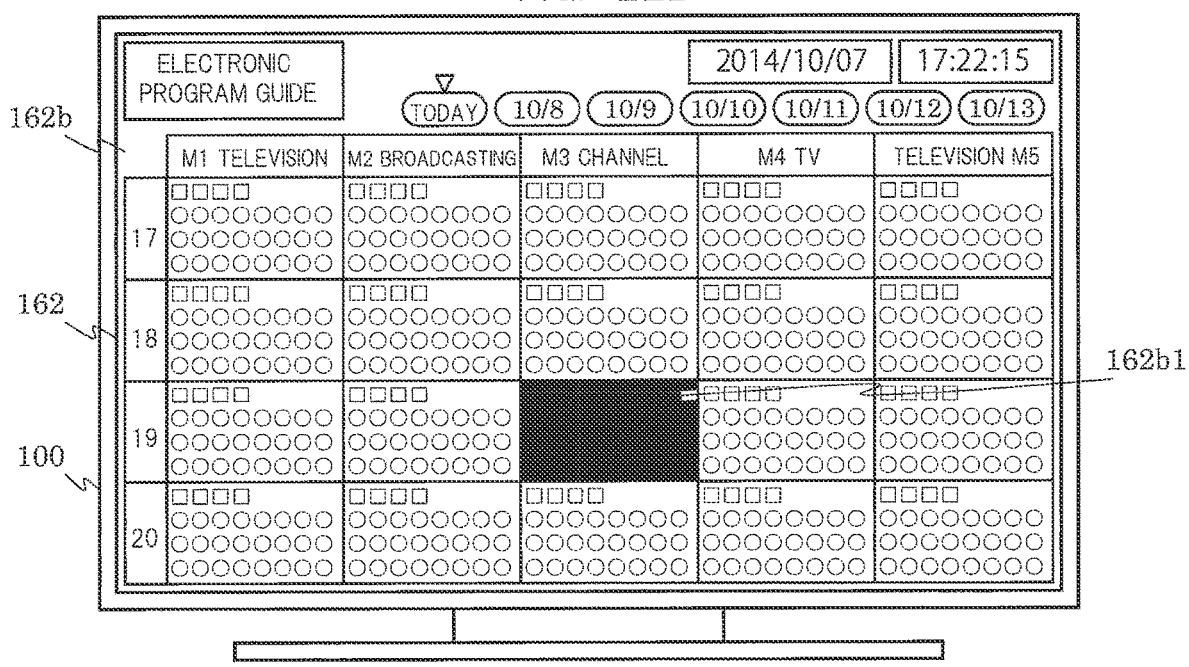
FIG. 22B is a screen display diagram of an EPG screen of the broadcast receiving apparatus according to the first embodiment.

In addition, when the broadcasting program is a network-distribution program distributed through the Internet 200 and therefore cannot be acquired from broadcast waves, and further the broadcast receiving apparatus 100 cannot access server devices on the network like in the case described above, the screen may be controlled so that a region of detailed information 162b1 displayed on an EPG screen 162b is grayed out as shown in FIG. 22B. Namely, the screen is controlled so as not to display detailed information of a network-distribution program that the user is not allowed to view. Alternatively, the gray-out process may be substituted by differentiating the background color of the detailed information 162b1 from others. It is also possible to notify the user that the broadcast receiving apparatus 100 is incapable of accessing server devices on the network or the user is not allowed to view a network-distribution program associated with the detailed information 162b1, by a popup message or the like when the user operates the remote controller (not shown) to select the detailed information 162b1.

Through the control described above, the broadcast receiving apparatus 100 can provide the user with information of broadcasting programs in a form that does not give any sense of discomfort to the user in accordance with the network connection state.

FIG. 22C is a diagram showing another example of the EPG screen in the broadcast receiving apparatus 100 of this embodiment. In FIG. 22C, "M1 television", "M2 broadcasting", "M3 channel", "M4 TV", "Television M5", and others are the names of broadcast stations of respective channels, and the "M2 broadcasting" station provides broadcasting programs distributed through broadcast waves as well as network-distribution programs (information 162c1 indicated in a column of "network broadcasting" in FIG. 22C) distributed through the Internet 200 at the same time.

As shown in FIG. 22C, when a channel that provides only the network-distribution programs distributed through the Internet 200 is present, the screen is usually controlled to display the information of all the channels (including the information 162c1) as shown by an EPG screen 162c in FIG. 22C (A). Meanwhile, in the case where the broadcast receiving apparatus 100 cannot access server devices on the network or the like, the screen may be controlled so as not to display information of the channel of "M2 broadcasting (network broadcasting)" that provides only the network-distribution programs distributed through the Internet 200 (information 162c1 in FIG. 22C(A)) as shown by an EPG screen 162d in FIG. 22C(B).

Through the control described above, it becomes unnecessary for the user of the broadcast receiving apparatus 100 to check the information of a channel that provides programs that the user is not allowed to view.

[Display of Emergency Warning Broadcasting in Broadcast Receiving Apparatus]

The broadcast receiving apparatus 100 of this embodiment can perform a process of receiving emergency warning broadcasting when an emergency warning broadcasting start control signal bit of a TMCC signal, which is included in transmission data including a TLV stream, changes from "0" to "1".

The emergency warning broadcasting may be provided as an application that displays a warning message on the full-screen scale or may be provided as character information in the form of a caption message. When the emergency warning broadcasting is provided as character information in the form of a caption message, the character information in the form of a caption message should preferably be displayed regardless of the condition of the broadcast receiving apparatus 100 just before reception of the emergency warning broadcasting. Namely, as shown in FIG. 23, when the broadcast receiving apparatus 100 receives emergency warning broadcasting in a state where the user views a regular broadcasting program by watching a program screen 162e of the broadcasting program displayed on the monitor unit 162, character information 162e1 by the emergency warning broadcasting is superposed and displayed on the program screen 162e. In the same manner, when the broadcast receiving apparatus 100 receives emergency warning broadcasting in a state where an EPG screen 162f is displayed on the monitor unit 162 in accordance with an instruction given by the user to display the EPG screen, character information 162f1 by the emergency warning broadcasting is superposed and displayed on the EPG screen 162f.

Through the control described above, even when the user selects an EPG screen, a setting screen, a timer recording program list screen, or an internet browser screen and causes the broadcast receiving apparatus 100 to display such a screen, it is possible to avoid overlooking important character information based on the received emergency warning broadcasting. Note that this control may be performed for the character information of an ordinary caption other than the emergency warning broadcasting.

[Various Exceptional Processes]

When failing to acquire data of a transmission path other than a TLV stream in the same package, the broadcast receiving apparatus 100 of this embodiment may perform, for example, the following exceptional processes.

As described above with reference to FIG. 6E, in the broadcasting system compatible with the broadcast receiving apparatus 100 of this embodiment, data acquired from a TLV stream and data acquired from a transmission path other than the TLV stream can be included in the same package, based on location information (corresponding to the "MMT_general_location_info( )" in FIG. 17) stored in the MPT. However, the data transmission path other than the TLV stream that is indicated by the location information (e.g., IPv4 data flow, IPv6 data flow, MPEG2-TS of broadcasting, etc.) is a receiving function different from a receiving function of TLV/MMT streams. For this reason, even when the broadcast receiving apparatus 100 is in operation, the data may not be acquired from such a data transmission path in a situation where the receiving function of the data transmission path is not working, a situation where the receiving function is working but a relay device and others are not operating, a situation where a wired or wireless connection of the transmission path is not established, and a situation where the broadcast receiving apparatus 100 is placed in an environment in which the data transmission path cannot be connected.

In such situations, when the broadcast receiving apparatus 100 of this embodiment receives an event in which the location information stored in the MPT indicates that the data acquired from the TLV stream and the data acquired from the transmission path other than the TLV stream are correlated to be included in the same package, the broadcast receiving apparatus 100 may perform the following operations.

For example, when an LCT specifies a plurality of regions on the screen as shown in FIGS. 19B and 19C, and video included in the TLV stream and data acquired from a transmission path other than the TLV stream are correlated so that the video is displayed in the "region 0" and the data is displayed in the "region 1" and "region 2", but the data from the transmission path other than the TLV stream to be displayed in the "region 1" and "region 2" cannot be acquired, the layout display of a plurality of regions specified by the LCT may be forbidden. Specifically, even when the LCT is received, the video contents received from the TLV stream is kept displayed in the "region 0" in the default layout display shown in FIG. 19A, and this layout is prevented from shifting to the layout display of a plurality of regions shown in FIGS. 19B and 19C. Further, even if an instruction to make a layout change from the default layout to the layout specified by the LCT is input to the operation input unit 170 of FIG. 7A in this state, a shift to the layout display of a plurality of regions of FIGS. 19B and 19C may be prevented by maintaining the default layout of FIG. 19A or shifting the screen to a different data broadcasting screen.

As another operation example when an LCT specifies a plurality of regions on the screen as shown in FIGS. 19B and 19C, and video included in the TLV stream and data acquired from a transmission path other than the TLV stream are correlated so that the video is displayed in the "region 0" and the data is displayed in the "region 1" and "region 2", but the data from the transmission path other than the TLV stream to be displayed in the "region 1" and "region 2" cannot be acquired, a display frame for the plurality of regions of FIGS. 19B and 19C specified by the LCT is displayed temporarily to display a background color or a given still image in the "region 1" and "region 2", and if the data from the transmission path other than the TLV stream indicated by the location information of the MPT cannot be acquired after an elapse of a given time, the display layout is shifted back to the default layout display shown in FIG. 19A. In this case, it is preferable that the screen is controlled so that the program video included in the TLV stream is kept displayed in the "region 0" even in the layout change shown in FIGS. 19A, 19B, and 19C because the program video itself for the user continues.

Also, even in a state where the video contents received in the TLV stream are displayed in the "region 0" in the default layout display of FIG. 19A because the data from the transmission path other than the TLV stream to be displayed in the "region 1" and "region 2" cannot be acquired, operations of various communication functions and receiving functions of the broadcast receiving apparatus 100 of this embodiment are started or communication environment and communication state of the various communication functions and reception environment and reception state of the various receiving functions are changed in some cases, with the result that it becomes possible to acquire the data from the transmission path other than the TLV stream to be displayed in the "region 1" and "region 2". In such a case, the broadcast receiving apparatus 100 of this embodiment may immediately shift the display layout from the default layout display of FIG. 19A to the layout of a plurality of regions of FIGS. 19B and 19C specified by the LCT so that the video contents received from the TLV stream are displayed in the "region 0" and the data acquired from the transmission path other than the TLV stream is displayed in the "region 1" and "region 2". Alternatively, the layout change may be performed after an instruction to make a layout change from the default layout to the layout specified by the LCT is input to the operation input unit 170, instead of performing the layout change immediately.

COPY RIGHT PROTECTION FUNCTION

In the digital broadcasting system compatible with the broadcast receiving apparatus 100 of this embodiment, the copy control information may be included in the MPT so that the copy control information is transmitted to indicate copy control states of contents that the MPT refers to, and the copy control states includes "freely copiable" (which may be divided into two types such as "freely copiable and requiring encoding process upon storage and output" and "freely copiable and not requiring encoding process upon storage and output"), "copiable only for one generation", "copiable given times" (e.g., a so-called "dubbing 10" if copiable nine times+allowing move once), and "copy prohibited". In this case, the broadcast receiving apparatus 100 of this embodiment may be configured to control the processes of storing the contents in the storage (accumulation) unit 110, recoding the contents on a removable recording medium, outputting the contents to external equipment, copying the contents to external equipment, and moving the contents to external equipment in accordance with the copy control information. Note that data to be subjected to the storage process may include not only the data stored in the storage (accumulation) unit 110 in the broadcast receiving apparatus 100 but also a record that is protected by an encoding process or the like so as to be reproduced only by the broadcast receiving apparatus 100. Specifically, data to be subjected to the storage process includes the data recorded in an external recording device in the state of being reproduced only by the broadcast receiving apparatus 100.

Specific examples of processes based on the copy control information will be described below.

First, when the copy control information included in the MPT indicates "freely copiable", the broadcast receiving apparatus 100 of this embodiment is allowed to perform the processes of storage to the storage (accumulation) unit 110, recoding on the removable recording medium, output to external equipment, copy to external equipment, and move to external equipment, without limitations. However, in the case where "freely copiable" is divided into "freely copiable and requiring encoding process upon storage and output" and "freely copiable and not requiring encoding process upon storage and output" and when the copy control information indicates "freely copiable and requiring encoding process upon storage and output", the broadcast receiving apparatus 100 is allowed to perform the processes of storage to the storage (accumulation) unit 110, recoding on the removable recording medium, output to external equipment, copy to external equipment, and move to external equipment any number of times without any limitation, but has to apply the encoding process in any cases.

Also, when the copy control information included in the MPT indicates "copiable only for one generation", the broadcast receiving apparatus 100 of this embodiment is allowed to store encoded contents in the storage (accumulation) unit 110, but when the stored contents are to be output to external equipment for viewing, the broadcast receiving apparatus 100 has to output the contents after encoding the contents together with the copy control information indicating "copy prohibited". However, the broadcast receiving apparatus 100 is allowed to perform the so-called move process to the external equipment (the process of copying the contents to the external equipment and disabling the reproduction of the contents in the storage (accumulation) unit 110 of the broadcast receiving apparatus 100 by, for example, deleting the contents).

Also, when the copy control information included in the MPT indicates "copiable given times", the broadcast receiving apparatus 100 of this embodiment is allowed to store encoded contents in the storage (accumulation) unit 110, but when the stored contents are to be output to external equipment for viewing, the broadcast receiving apparatus 100 has to output the contents after encoding the contents together with the copy control information indicating "copy prohibited". However, the broadcast receiving apparatus 100 is allowed to perform the copying and move process of contents to the external equipment predetermined times. In the case of the so-called "dubbing 10", the broadcast receiving apparatus 100 is allowed to perform copying to the external equipment nine times and the move process to the external equipment once.

Also, when the copy control information included in the MPT indicates "copy prohibited", the broadcast receiving apparatus 100 of this embodiment is prohibited from copying to the storage (accumulation) unit 110. However, when the broadcast receiving apparatus 100 is configured to have a "temporary storage" mode in which storage to the storage (accumulation) unit 110 is allowed only for a predetermined given time or a given time specified by control information (e.g., the MH-Expire descriptor or the like shown in FIG. 6D) included in a broadcasting signal, the broadcast receiving apparatus 100 is allowed to store the contents temporarily in the storage (accumulation) unit 110 even when the copy control information included in the MPT indicates "copy prohibited". When the contents for which the copy control information included in the MPT indicates "copy prohibited" are to be output to external equipment for viewing, the broadcast receiving apparatus 100 has to output the contents after encoding the contents together with the copy control information indicating "copy prohibited".

Note that the output of the contents to the external equipment for viewing can be performed by the video output unit 163 and the audio output unit 166 or through the digital IF unit 125 and the LAN communication unit 121 of FIG. 7A. The copying or move process to the external equipment can be performed through the digital IF unit 125 and the LAN communication unit 121 of FIG. 7A.

According to the processes described above, proper contents protection can be achieved in accordance with the copy control information correlated with contents.

Also, the copying process of the contents for which the copy control information indicates copy limitations such as "copiable only for one generation", "copiable given times", and "copy prohibited" to external equipment through the LAN communication unit 121 may be allowed only when the IP address of the external equipment which is the destination of a transmission packet sent from the broadcast receiving apparatus 100 is present in the same subnet as the IP address of the broadcast receiving apparatus 100, and may be prohibited when the IP address of the external equipment is outside the subnet in which the IP address of the broadcast receiving apparatus 100 is present. The same applies also to the case of the contents for which the copy control information indicates "freely copiable and requiring encoding process upon storage and output".

Similarly, the process of storing the contents for which the copy control information indicates copy limitations such as "copiable only for one generation", "copiable given times", and "freely copiable and requiring encoding process upon storage and output" temporarily in the storage (accumulation) unit 110 and then moving the contents to external equipment through the LAN communication unit 121 may be allowed only when the IP address of the external equipment which is the destination of a transmission packet sent from the broadcast receiving apparatus 100 is present in the same subnet as the IP address of the broadcast receiving apparatus 100, and may be prohibited when the IP address of the external equipment is outside the subnet in which the IP address of the broadcast receiving apparatus 100 is present.

Video and audio output for viewing contents stored in the storage (accumulation) unit 110 of the broadcast receiving apparatus 100 is allowed in principle only when the IP address of the external equipment which is the destination of a transmission packet sent from the broadcast receiving apparatus 100 is present in the same subnet as the IP address of the broadcast receiving apparatus 100, and the output is prohibited when the IP address of the external equipment is outside the subnet in which the IP address of the broadcast receiving apparatus 100 is present. However, when the external equipment is connected within a given period in the subnet in which the IP address of the broadcast receiving apparatus 100 is present and is registered (by paring) as equipment allowed to view the contents even outside the subnet in which the IP address of the broadcast receiving apparatus 100 is present, video and audio output for viewing the contents stored in the storage (accumulation) unit 110 of the broadcast receiving apparatus 100 to the external equipment may be allowed even when the IP address of the external equipment is outside the subnet in which the IP address of the broadcast receiving apparatus 100 is present. In this case, the video and audio output for viewing the contents is performed by encoding the contents.

According to the process described above, different processes are performed depending on whether the IP address of the external equipment is present in the same subnet as the IP address of the broadcast receiving apparatus 100 or is outside the same subnet, so that both of the user convenience and contents protection can be achieved.

Next, as described above with reference to FIG. 6E, in the digital broadcasting system compatible with the broadcast receiving apparatus 100 of this embodiment, data that is acquired from a path (IPv4, IPv6, MPEG2-TS, URL, etc.) different from data that is acquired from a TLV stream of the broadcasting path may be included in the same package and the same event as the data that is acquired from the TLV stream based on the location information ("MMT_general_location_info( )" of FIG. 17) in the MTP. The contents protection that is performed when copy control information is included in the MPT in this case will be described.

First, when copy control information is included in the MPT, data that is included in the same package and the same event based on the location information may be controlled in accordance with the copy control information included in the TLV stream even if the data is acquired from a path (IPv4, IPv6, MPEG2-TS, URL, etc.) different from data that is acquired from a TLV stream of the broadcasting path. As described above, the copy control states of contents specified by the copy control information include "freely copiable" (which may be divided into two types such as "freely copiable and requiring encoding process upon storage and output" and "freely copiable and not requiring encoding process upon storage and output"), "copiable only for one generation", "copiable given times" (e.g., a so-called "dubbing 10" if copiable nine times+allowing move once), and "copy prohibited".

Herein, if data location indicated by the location information includes MPEG2-TS data transmitted by a different digital broadcasting signal, the transmitted MPEG2-TS data is correlated with copy control information also in the different digital broadcasting signal. Accordingly, a problem arises as to in what way and in accordance with which information the copy control of the MPEG2-TS data should be performed (which of the copy control information included in the TLV/MMT stream and the copy control information included in the MPEG2-TS should be referred to in performing copy control).

In the digital broadcasting system of this embodiment, this problem can be solved by performing any one of the following operations in the broadcast receiving apparatus 100.

First Operation Example

In a first operation example, when copy control information is included in the MPT and data that is included in the same package and the same event based on the location information includes MPEG2-TS data transmitted by a different digital broadcasting signal, priority is given to a copy control state indicated by the copy control information included in the TLV stream over a copy control state indicated by the copy control information included in the MPEG2-TS in performing copy control.

For example, when the copy control state indicated by the copy control information included in the TLV stream is "copiable only for one generation" while the copy control state indicated by the copy control information included in the MPEG2-TS is "copiable given times", even the data acquired from a path (digital broadcasting in the MPEG2-TS transmission format) different from the data acquired from the TLV stream may be subjected to copy control as the data contents of "copiable only for one generation". For example, when the copy control state indicated by the copy control information included in the TLV stream is "freely copiable" while the copy control state indicated by the copy control information included in the MPEG2-TS is "copiable given times", even the data acquired from a path (digital broadcasting in the MPEG2-TS transmission format) different from the data acquired from the TLV stream may be subjected to copy control as the data contents of "freely copiable".

By this operation, data acquired from a path other than the TLV stream can also be put in a copy control state desired in the broadcasting system compatible with the broadcast receiving apparatus 100 of this embodiment.

Second Operation Example

In a second operation example, when copy control information is included in the MPT and data that is included in the same package and the same event based on the location information includes MPEG2-TS data transmitted by a different digital broadcasting signal, a copy control state indicated by the copy control information included in the TLV stream is compared with a copy control state indicated by the copy control information included in the MPEG2-TS, and if the copy control state indicated by the copy control information included in the MPEG2-TS is severer than the copy control state indicated by the copy control information included in the TLV stream, the MPEG2-TS data is excluded from contents to be processed when performing the storing process to the storage (accumulation) unit 110, recording process on the removable recoding medium, or outputting process from the digital interface.

By this operation, with respect to the data acquired from the path other than the TLV stream, the original copy control information of the data set in the broadcasting system in which the data is transmitted is taken into account, and also the redundant copy control states on the broadcast receiving apparatus 100 of this embodiment can be eliminated.

Also, if the copy control state indicated by the copy control information included in the MPEG2-TS is identical to or less severe than the copy control state indicated by the copy control information included in the TLV stream as a result of the above comparison, the MPEG2-TS data that is included in the same package and the same event based on the location information may be subjected to copy control as contents in the copy control state indicated by the copy control information included in the TLV stream.

By this operation, with respect to the data acquired from the path other than the TLV stream, the original copy control information of the data set in the broadcasting system in which the data is transmitted is taken into account, and the redundant copy control states on the broadcast receiving apparatus 100 of this embodiment can be eliminated.

The copy right protection function of the broadcast receiving apparatus 100 of this embodiment has been described as being performed based on the copy control information included in the MPT. However, the MPT is not the only table including the copy control information. The copy control information may be included also in tables other than the MPT such as the MH-service description table (MH-SDT), the MH-event information table (MH-EIT), or other tables shown in FIG. 6B, and the broadcast receiving apparatus 100 can perform the copy right protection process in accordance with the copy control information transmitted in these tables.

According to the above-described embodiment, it is possible to provide the broadcasting receiver supporting MMT digital broadcasting.

Second Embodiment

A second embodiment of the present invention will be described below. Constituent elements, processes, effects and others of the second embodiment are the same as those of the first embodiment unless otherwise specified. For this reason, in the following description, differences between the first embodiment and the second embodiment are mainly described, and description of the matters common to both embodiments is omitted as much as possible in order to avoid redundant description. Also, the following description will be made based on the assumption that a broadcast receiving apparatus of the second embodiment is a television receiver that supports both of MMT method and MPEG2-TS method as the media transport method.

[Hardware Configuration of Broadcast Receiving Apparatus]

Figure 24:
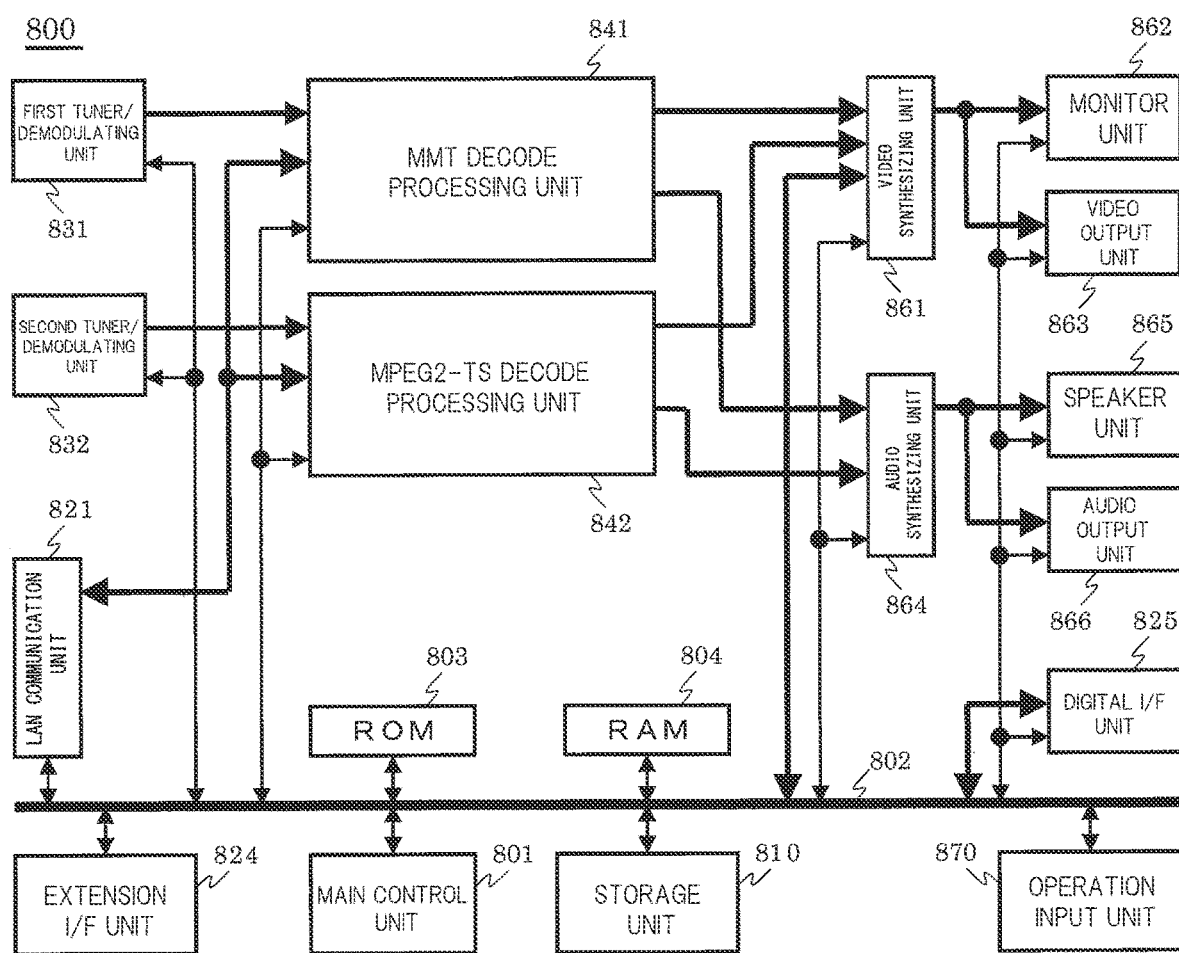
FIG. 24 is a block diagram of a broadcast receiving apparatus according to a second embodiment.

FIG. 24 is a block diagram showing an example of an internal configuration of a broadcast receiving apparatus 800. The broadcast receiving apparatus 800 includes a main control unit 801, a system bus 802, a ROM 803, a RAM 804, a storage unit 810, a LAN communication unit 821, an extension interface unit 824, a digital interface unit 825, a first tuner/demodulating unit 831, a second tuner/demodulating unit 832, an MMT decode processing unit 841, an MPEG2-TS decode processing unit 842, a video synthesizing unit 861, a monitor unit 862, a video output unit 863, an audio synthesizing unit 864, a speaker unit 865, an audio output unit 866, and an operation input unit 870.

The main control unit 801, the system bus 802, the ROM 803, the RAM 804, the storage unit 810, the extension interface unit 824, the digital interface unit 825, the monitor unit 862, the video output unit 863, the speaker unit 865, the audio output unit 866, the operation input unit 870, and others have functions equivalent to those of the main control unit 101, the system bus 102, the ROM 103, the RAM 104, the storage (accumulation) unit 110, the extension interface unit 124, the digital interface unit 125, the monitor unit 162, the video output unit 163, the speaker unit 165, the audio output unit 166, the operation input unit 170, and others in the broadcast receiving apparatus 100 of the first embodiment, respectively, and detail descriptions thereof are omitted.

The first tuner/demodulating unit 831 receives broadcast waves of a broadcasting service adopting the MMT method as the media transport method via an antenna (not shown), and tunes to (selects) a channel giving a service that the user wishes to have, under the control by the main control unit 801. Further, the first tuner/demodulating unit 831 demodulates a received broadcasting signal to acquire an MMT data string, and outputs the MMT data string to the MMT decode processing unit 841. The second tuner/demodulating unit 832 receives broadcast waves of a broadcasting service adopting the MPEG2-TS method as the media transport method via an antenna (not shown), and tunes to (selects) a channel giving a service that the user wishes to have, under the control by the main control unit 801. Further, the second tuner/demodulating unit 832 demodulates a received broadcasting signal to acquire an MPEG2-TS data string, and outputs the MPEG2-TS data string to the MPEG2-TS decode processing unit 842.

The MMT decode processing unit 841 receives the MMT data string output from the first tuner/demodulating unit 831, and performs processes of separating and decoding a video data string, an audio data string, a caption data string, a subtitle data string, and others, which are real-time presentation elements, based on a control signal included in the MMT data string. The MMT decode processing unit 841 has the functions equivalent to those of the separating unit 132, the video decoder 141, the video color gamut conversion unit 142, the audio decoder 143, the caption decoder 144, the subtitle decoder 145, the subtitle synthesizing unit 146, the subtitle color gamut conversion unit 147, the data decoder 151, the cache unit 152, the application control unit 153, the browser unit 154, the application color gamut conversion unit 155, the sound source unit 156, and others in the broadcast receiving apparatus 100 of the first embodiment. The MMT decode processing unit 841 is capable of performing the various processes described in the first embodiment. The details of the various processes have been described in the first embodiment, and further descriptions thereof are omitted.

The MPEG2-TS decode processing unit 842 receives the MPEG2-TS data string output from the second tuner/demodulating unit 832, and performs processes of separating and decoding a video data string, an audio data string, a caption data string, a subtitle data string, and others, which are real-time presentation elements, based on a control signal included in the MPEG2-TS data string. The MPEG2-TS decode processing unit 842 has the function equivalent to that of an IRD (Integrated Reviver Decoder) of a conventional television receiver that receives broadcast waves of a broadcasting service adopting the MPEG2-TS method as the media transport method, and detailed descriptions thereof are omitted.

The video synthesizing unit 861 receives video information, subtitle information, and application information output from the MMT decode processing unit 841 and video information, subtitle information, and application information output from the MPEG2-TS decode processing unit 842, and properly performs a selection process and/or a superposition process. The video synthesizing unit 861 has a video RAM (not shown), and the monitor unit 862 and others are driven based on video information and others input to the video RAM. In addition, the video synthesizing unit 861 performs a scaling process, a superposing process of EPG screen information, and others under the control by the main control unit 801 when necessary. The audio synthesizing unit 864 receives audio information output from the MMT decode processing unit 841 and audio information output from the MPEG2-TS decode processing unit 842, and properly performs a selection process and/or a mixing process.

The LAN communication unit 821 is connected to the Internet 200 via the router device 200r, and transmits and receives data to and from server devices and other communication equipment on the Internet 200. Also, the LAN communication unit 821 acquires an MMT data string (or part of it) and an MPEG2-TS data string (or part of it) of a program transmitted through the communication line, and properly outputs them to the MMT decode processing unit 841 and the MPEG2-TS decode processing unit.

[Time Display in Broadcast Receiving Apparatus]

The broadcast receiving apparatus 800 of this embodiment can display the current date and current time on the EPG screen and other various setting screens. Information related to the current date and current time is transmitted by an MH-TOT or the like in the case of a broadcasting service adopting the MMT method as the media transport method, and the information is transmitted by a TOT (Time Offset Table) or the like provided in SI (Service Information) defined in the MPEG-2 system in the case of a broadcasting service adopting the MPEG2-TS method as the media transport method. The broadcast receiving apparatus 800 can acquire the information related to the current date and current time by referring to the MH-TOT and the TOT.

In general, when the video synthesizing unit 861 mainly selects video information and others output from the MMT decode processing unit 841, the video synthesizing unit 861 superposes the information related to the current date and current time acquired from the MH-TOT on the video information and others, and when the video synthesizing unit 861 mainly selects video information and others output from the MPEG2-TS decode processing unit 842, the video synthesizing unit 861 superposes the information related to the current date and current time acquired from the TOT on the video information and others.

However, since the broadcasting service adopting the MMT method as the media transport method is different from the broadcasting service adopting the MPEG2-TS method as the media transport method in coding/decoding processes, transmission paths, and others, there is a possibility that inconsistency occurs in current time display between the case of selecting the broadcasting service adopting the MMT method as the media transport method and the case of selecting the broadcasting service adopting the MPEG2-TS method as the media transport method. For example, when an EPG screen 162g displaying channel information of the broadcasting service adopting the MMT method as the media transport method is switched to an EPG screen 162h displaying channel information of the broadcasting service adopting the MPEG2-TS method as the media transport method as shown in FIG. 25, the inconsistency caused when the display of current time is switched from a current time display 162g1 to a current time display 162h1 may give the user a feeling of visual discomfort.

In order to prevent the user from having such a feeling of visual discomfort, the broadcast receiving apparatus 800 of this embodiment performs control to superpose the information related to the current date and current time acquired from the TOT on the video information and others even when the video synthesizing unit 861 mainly selects the video information and others output from the MMT decode processing unit 841. Namely, the broadcast receiving apparatus 800 of this embodiment performs control to superpose current time information provided by the broadcasting service adopting the MPEG2-TS method as the media transport method, on the contents of the broadcasting service adopting the MMT method as the media transport method.

Through the control described above, the broadcast receiving apparatus 800 of this embodiment always displays the current time information that is acquired by referring to the TOT. Thus, even when the broadcasting service adopting the MMT method as the media transport method and the broadcasting service adopting the MPEG2-TS method as the media transport method are switched to each other, it is possible to prevent the user from having such a feeling of visual discomfort due to inconsistency in the display of current time.

FIG. 26 shows an example of selection control of a reference source of current time information in accordance with the reception state of broadcasting services in the broadcast receiving apparatus 800 of this embodiment. The broadcast receiving apparatus 800 of this embodiment always refers to the TOT to acquire current time information when the broadcast receiving apparatus 800 is in a condition in which it can receive the broadcasting service adopting the MPEG2-TS method as the media transport method, and refers to the MH-TOT to acquire current time information only when the broadcast receiving apparatus 800 is in a condition in which it cannot receive the broadcasting service adopting the MPEG2-TS method as the media transport method but can receive the broadcasting service adopting the MMT method as the media transport method.

In addition, the above-mentioned effect can be achieved also by performing control to superpose current time information provided by the broadcasting service adopting the MMT method as the media transport method on contents of the broadcasting service adopting the MPEG2-TS method as the media transport method contrary to the above control.

In both of the case of control in which current time information provided by the broadcasting service adopting the MPEG2-TS method as the media transport method is superposed on contents of the broadcasting service adopting the MMT method as the media transport method and the case of control in which current time information provided by the broadcasting service adopting the MMT method as the media transport method is superposed on contents of the broadcasting service adopting the MPEG2-TS method as the media transport method, the current time information can be corrected by referring to the "delta" parameter of the time information in the TMCC extension information region as described above in [Time Management of Broadcast Receiving Apparatus] of the first embodiment.

[Display of EPG in Broadcast Receiving Apparatus]

Event schedule information of the broadcasting service adopting the MMT method as the media transport method is transmitted by MH-EIT or the like. Meanwhile, event schedule information of the broadcasting service adopting the MPEG2-TS method as the media transport method is transmitted by EIT (Event Information Table) or the like included in SI defined in the MPEG-2 system. Therefore, in general, when video information or the like provided by the broadcasting service adopting the MMT method as the media transport method is displayed, the event schedule information (MH-EIT) of the broadcasting service adopting the MMT method can be acquired, and when video information or the like provided by the broadcasting service adopting the MPEG2-TS method as the media transport method is displayed, the event schedule information (EIT) of the broadcasting service adopting the MPEG2-TS method can be acquired.

However, the broadcast receiving apparatus 800 of this embodiment can acquire both MH-EIT and EIT when displaying video information or the like provided by the broadcasting service adopting the MMT method as the media transport method as well as when displaying video information or the like provided by the broadcasting service adopting the MPEG2-TS method as the media transport method, and thus the user friendliness can be improved.

FIG. 27A shows an example of the EPG screen in the broadcast receiving apparatus 800 of this embodiment. In FIG. 27A, an EPG screen 162i is an EPG screen that is created based on the MH-EIT of the broadcasting service adopting the MMT method as the media transport method, and "M1 television", "M2 broadcasting", "M3 channel", "M4 TV", "television M5" and others are the names of broadcast stations that provide the broadcasting service adopting the MMT method as the media transport method. Also, an EPG screen 162j is an EPG screen that is created based on the EIT of the broadcasting service adopting the MPEG2-TS method as the media transport method, and "T6 television", "T7 broadcasting", "T8 channel", "T9 TV", "television TA" and others are the names of broadcast stations that provide the broadcasting service adopting the MPEG2-TS method as the media transport method.

For example, when the user who is watching a broadcasting program provided by the broadcasting service adopting the MMT method as the media transport method gives an instruction to display the EPG screen by operating the remote controller (not shown), an initial EPG screen (not shown) appears. The initial EPG screen is an EPG screen that is created based on the MH-EIT of the broadcasting service adopting the MMT method as the media transport method, and shows detailed information of broadcasting programs of respective channels in a time zone of "from 17:00 (around current time)" on "Oct. 7, 2014 (today)". Then, if the user wishes to check detailed information of broadcasting programs of respective channels in a time zone of "from 20:00" on "Oct. 9, 2014" and gives an instruction to update the EPG screen by operating the remote controller (not shown), the EPG screen 162i appears.

Subsequently, if the user wishes to check detailed information of broadcasting programs provided by the broadcasting service adopting the MPEG2-TS method as the media transport method and gives a network switching instruction by operating the remote controller (not shown), the EPG screen 162j appears. At this time, the broadcast receiving apparatus 800 of this embodiment controls the screen to display detailed information of broadcasting programs of the respective channels in the same time zone on the same date (i.e., "from 20:00" on "Oct. 9, 2014") as those of the EPG screen 162*i* displayed just before the network switching, instead of the initial EPG screen that is created based on the EIT of the broadcasting service adopting the MPEG2-TS method as the media transport method (i.e., detailed information of broadcasting programs of the respective channels in the time zone of "from 17:00" on "Oct. 7, 2014").

Through the control described above, the user can consecutively check detailed information of broadcasting programs provided in the same time zone on the same date by a plurality of networks with different media transport methods by a simple operation. Namely, the user friendliness of the broadcast receiving apparatus 800 can be improved.

Figure 27B:
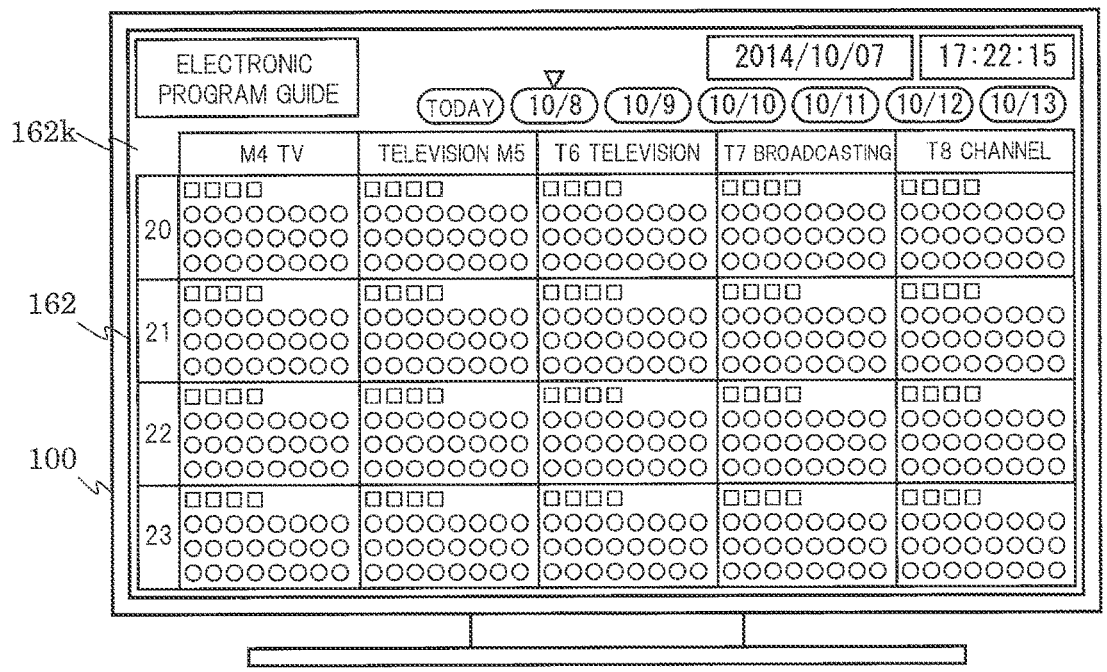
FIG. 27B is a screen display diagram of an EPG screen of the broadcast receiving apparatus according to the second embodiment.

FIG. 27B is a diagram showing an example of the EPG screen in the broadcast receiving apparatus 800 of this embodiment that is different from the example mentioned above. An EPG screen 162*k* shows a state obtained by scrolling the EPG screen 162*i* of FIG. 27A in the direction of arrangement of the channels (horizontal direction) by the operation of the remote controller (not shown). Namely, in the example of FIG. 27B, by scrolling the EPG screen in the direction of arrangement of the channels (horizontal direction), the channel information that is created based on the MH-EIT of the broadcasting service adopting the MMT method as the media transport method and the channel information that is created based on the EIT of the broadcasting service adopting the MPEG2-TS method as the media transport method are displayed on the same time axis in a seamless manner.

Accordingly, even when the user wishes to check the channel information that is created based on the EIT of the broadcasting service adopting the MPEG2-TS method as the media transport method while checking the channel information that is created based on the MH-EIT of the broadcasting service adopting the MMT method as the media transport method, the user does not need to give a network switching instruction or the like by the operation of the remote controller (not shown). In addition, the user is allowed to collectively check detailed information of broadcasting programs provided in the same time zone on the same date by a plurality of networks with different media transport methods. Namely, the user friendliness of the broadcast receiving apparatus 800 can be improved.

Third Embodiment

A third embodiment of the present invention will be described below. Constituent elements, effects and others of the third embodiment are the same as those of the first embodiment unless otherwise specified. For this reason, in the following description, differences between the first embodiment and the third embodiment are mainly described, and description of the matters common to both embodiments is omitted as much as possible in order to avoid redundant description.

[System Configuration]

Figure 28:
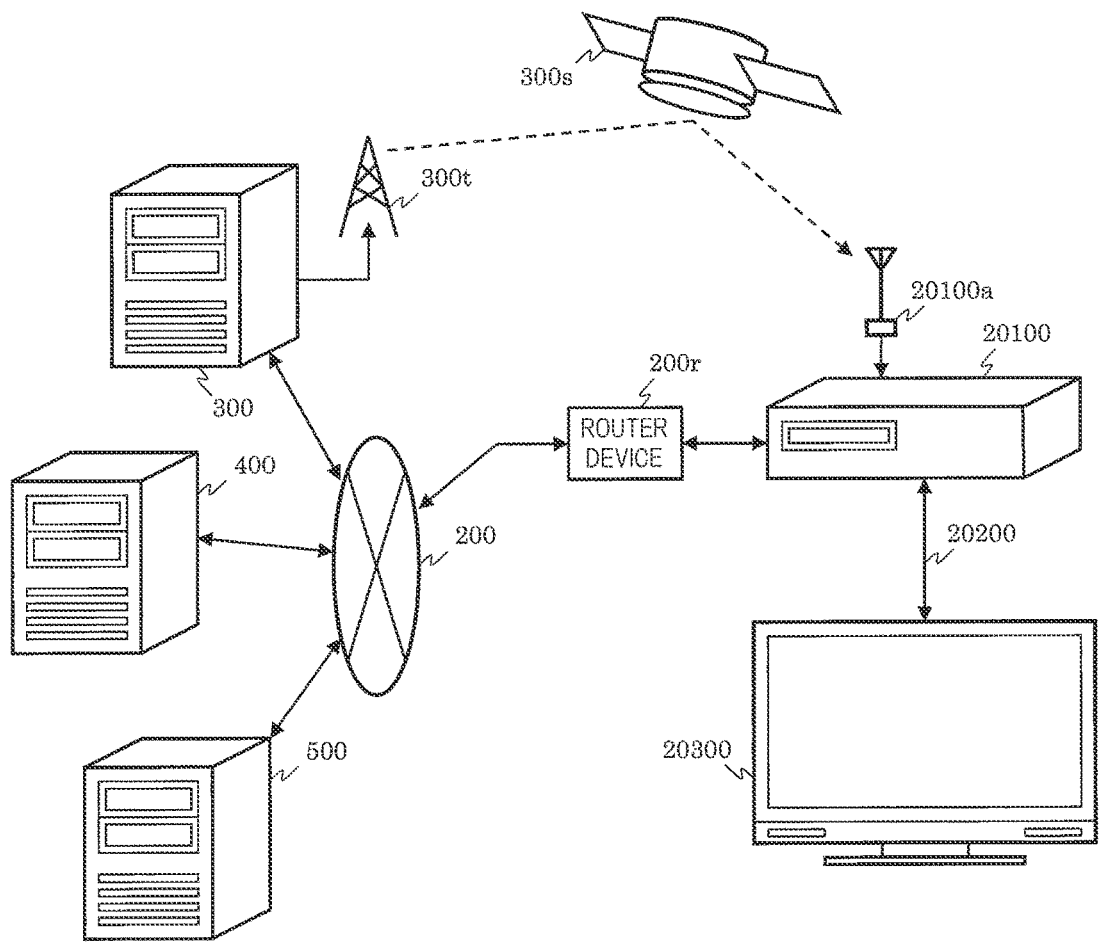
FIG. 28 is a system configuration diagram showing an example of a broadcast communication system including a broadcast receiving apparatus according to a third embodiment.

FIG. 28 is a system configuration diagram showing an example of a broadcast communication system including a broadcast receiving apparatus according to the third embodiment. The broadcast communication system of this embodiment includes a broadcast receiving apparatus 20100, an antenna 20100*a*, a connection cable 20200, a monitor device 20300, the broadband network 200 such as the Internet, the router device 200*r*, the radio tower 300*t* and the broadcast satellite (or communication satellite) 300*s* of the broadcast station, the broadcast station server 300, the service provider server 400, and the other application server 500. Though not shown, the broadcast communication system of this embodiment may further include the access point 200*a*, the mobile phone communication server 600, the base station 600*b* for mobile phone communication network, and the portable information terminal 700 like in the system configuration diagram of the broadcast communication system of the first embodiment. In this case, the portable information terminal 700 may communicate directly with the broadcast receiving apparatus 20100 without passing through the router device 220*r* and others.

The broadcast receiving apparatus 20100 receives broadcast waves transmitted from the radio tower 300*t* via the broadcast satellite (or communication satellite) 300*s* and the antenna 20100*a*. Alternatively, the broadcast receiving apparatus 20100 may receive broadcast waves transmitted from the radio tower 300*t* directly from the antenna 20100*a* without passing through the broadcast satellite (or communication satellite) 300*s*. In addition, the broadcast receiving apparatus 20100 can be connected to the Internet 200 via the router device 200*r*, and thus can perform data transmission and reception through the communication with server devices and other communication equipment on the Internet 200.

The connection cable 20200 is a communication cable that connects the broadcast receiving apparatus 20100 and the monitor device 20300, and transmits coded video and audio data and others output from the broadcast receiving apparatus 20100. The monitor device 20300 is a video display device that offers video and audio information acquired by decoding coded video and audio data and others received through the connection cable 20200, to the user by using a display device such as a liquid crystal panel and a speaker.

[Hardware Configuration of Broadcast Receiving Apparatus]

Figure 29A:
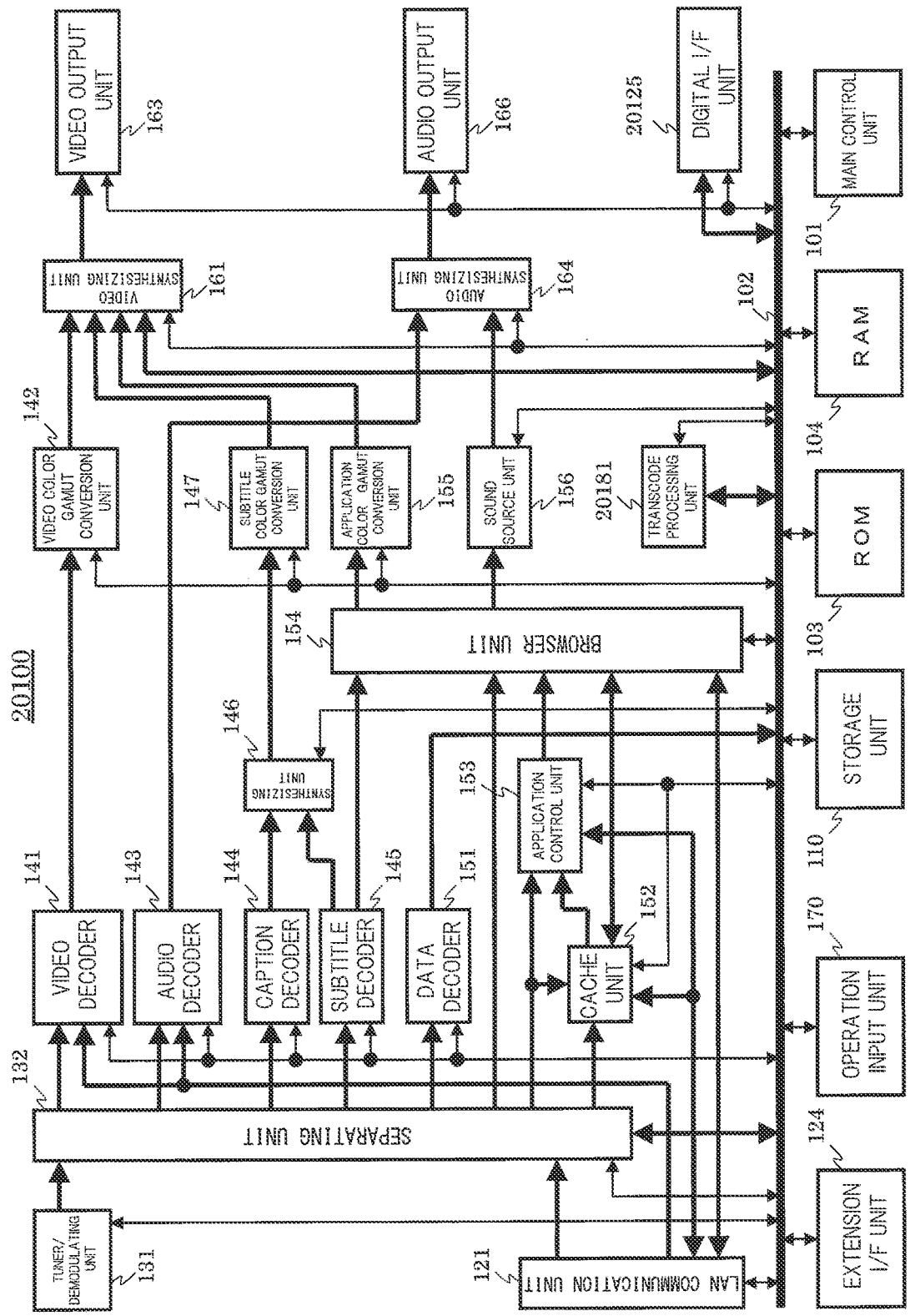
FIG. 29A is a block diagram of the broadcast receiving apparatus according to the third embodiment.

FIG. 29A is a block diagram showing an example of an internal configuration of the broadcast receiving apparatus 20100. The broadcast receiving apparatus 20100 includes the main control unit 101, the system bus 102, the ROM 103, the RAM 104, the storage (accumulation) unit 110, the LAN communication unit 121, the extension interface unit 124, a digital interface unit 20125, the tuner/demodulating unit 131, the separating unit 132, the video decoder 141, the video color gamut conversion unit 142, the audio decoder 143, the caption decoder 144, the subtitle decoder 145, the subtitle synthesizing unit 146, the subtitle color gamut conversion unit 147, the data decoder 151, the cache unit 152, the application control unit 153, the browser unit 154, the application color gamut conversion unit 155, the sound source unit 156, the video synthesizing unit 161, the video output unit 163, the audio synthesizing unit 164, the audio output unit 166, the operation input unit 170, and a transcode processing unit 20181. The transcode processing unit 20181 may be expressed as a coding method conversion unit, a multiplexing method conversion unit, a transport method conversion unit, a data string conversion unit, or a data configuration conversion unit.

The broadcast receiving apparatus 20100 of this embodiment is provided as an optical disc drive recorder such as DVD recorder, a magnetic disc drive recorder such as HDD recorder, an STB, or the like. Namely, when compared with the broadcast receiving apparatus 100 of the first embodiment, the monitor unit 162 and the speaker unit 165 may be omitted in the broadcast receiving apparatus 20100. In addition, the transcode processing unit 20181 is a signal processing unit that performs a transcode computation process of converting the coding method, bit rate, media transport method, and others of each of the components making up the contents. For example, the transcode processing unit 20181 can convert an MMT data string of broadcasting program contents including a video component in an MPEG-H HEVC format that are output from the separating unit 132, into an MPEG2-TS data string of program contents including a video component in an MPEFG-2 format or MPEG-4 AVC (Advanced Video Coding) format. Note that the program contents subjected to the transcode computation process can be stored as recorded contents in the storage (accumulation) unit 110, or can be output and supplied from the digital interface unit 20125 or the like to an external monitor device or the like.

[Software Configuration of Broadcast Receiving Apparatus]

Figure 29B:
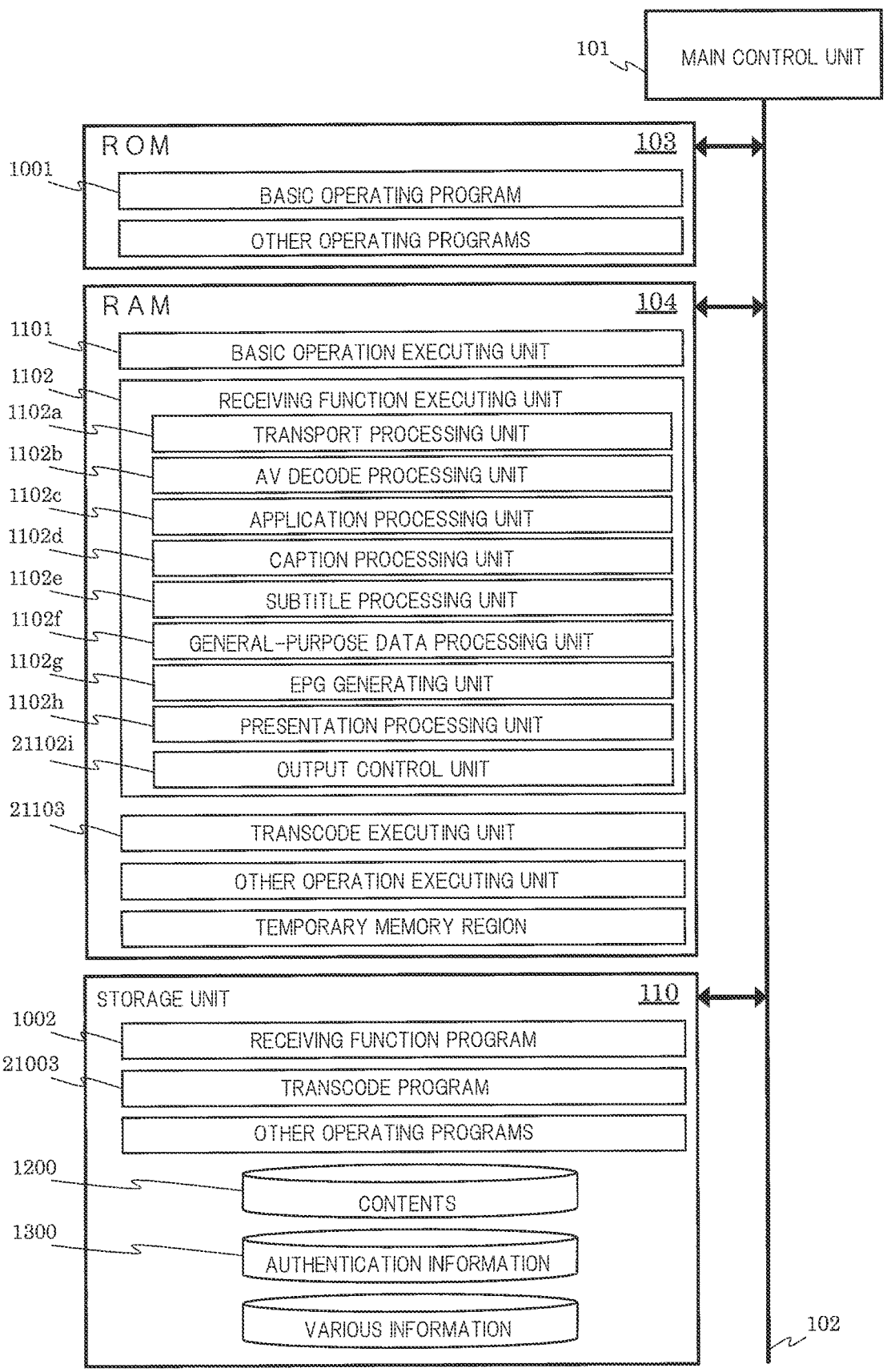
FIG. 29B is a software configuration diagram of the broadcast receiving apparatus according to the third embodiment.

FIG. 29B is a software configuration diagram of the broadcast receiving apparatus 20100 of this embodiment, and shows respective software configurations of the ROM 103, the RAM 104, and the storage (accumulation) unit 110. When compared with the software configuration diagram of the broadcast receiving apparatus 100 of the first embodiment, a transcode program 21003 is added to the storage (accumulation) unit 110 in the broadcast receiving apparatus 20100. The transcode program 21003 stored in the storage (accumulation) unit 110 is loaded onto the RAM 104, and the loaded transcode program is executed by the main control unit 101 to configure a transcode executing unit 21103. The transcode executing unit 21103 mainly controls the transcode computation process performed by the transcode processing unit 20181.

Also, the receiving function executing unit 1102 loaded onto the RAM 104 has an output control unit 21102i. The output control unit 21102i of the receiving function executing unit 1102 controls data output in the video output unit 163, the audio output unit 166, and the digital interface unit 20125.

[Hardware Configuration of Monitor Device]

Figure 30:
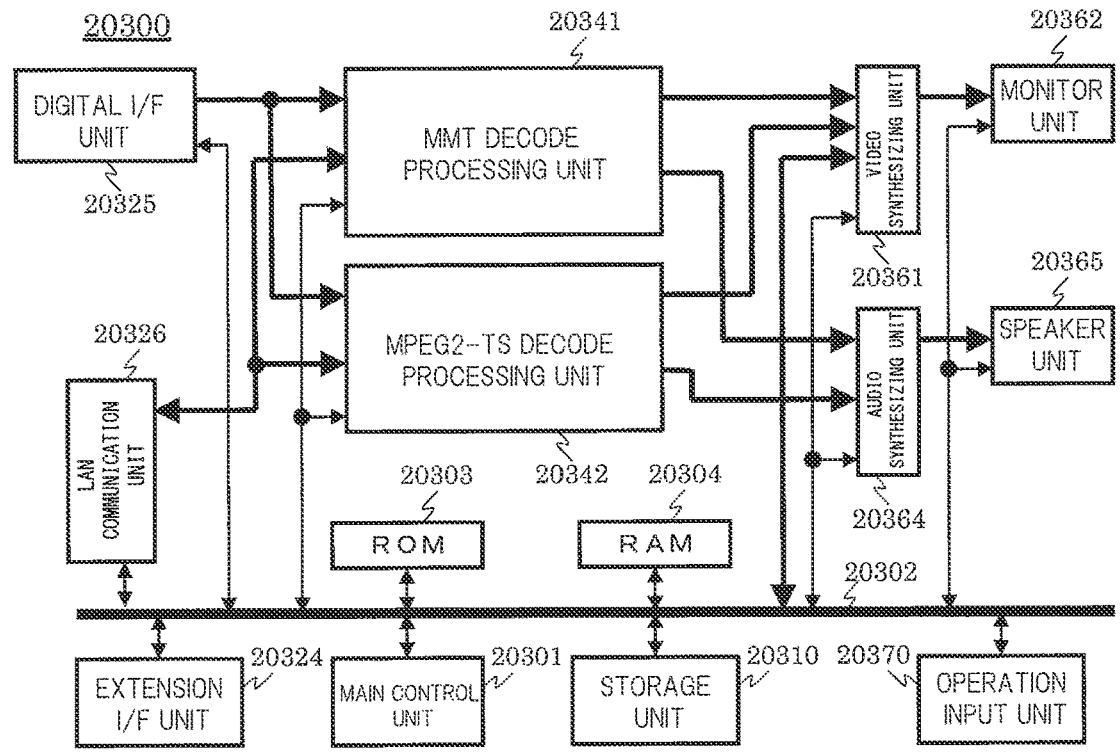
FIG. 30 is a block diagram of a monitor device according to the third embodiment.

FIG. 30 is a block diagram showing an example of an internal configuration of the monitor device 20300. The monitor device 20300 includes a main control unit 20301, a system bus 20302, a ROM 20303, a RAM 20304, a storage unit 20310, an extension interface unit 20324, a digital interface unit 20325, a LAN communication unit 20326, an MMT decode processing unit 20341, an MPEG2-TS decode processing unit 20342, a video synthesizing unit 20361, a monitor unit 20362, an audio synthesizing unit 20364, a speaker unit 20365, and an operation input unit 20370.

The main control unit 20301, the system bus 20302, the ROM 20303, the RAM 20304, the storage unit 20310, the extension interface unit 20324, the digital interface unit 20325, the LAN communication unit 20326, the MMT decode processing unit 20341, the MPEG2-TS decode processing unit 20342, the video synthesizing unit 20361, the monitor unit 20362, the audio synthesizing unit 20364, the speaker unit 20365, the operation input unit 20370, and others have functions equivalent to those of the main control unit 801, the system bus 802, the ROM 803, the RAM 804, the storage unit 810, the extension interface unit 824, the digital interface unit 825, the LAN communication unit 821, the MMT decode processing unit 841, the MPEG2-TS decode processing unit 842, the video synthesizing unit 861, the monitor unit 862, the audio synthesizing unit 864, the speaker unit 865, the operation input unit 870, and others in the broadcast receiving apparatus 800 of the second embodiment, respectively.

Namely, compared with the broadcast receiving apparatus 800 of the second embodiment, the first tuner/demodulating unit 831, the second tuner/demodulating unit 832, the video output unit 863, the audio output unit 866, and others may be omitted in the monitor device 20300 of this embodiment. Note that the monitor device 20300 may have the same configuration as that of the broadcast receiving apparatus 800 of the second embodiment, that is, the configuration in which the first tuner/demodulating unit 831, the second tuner/demodulating unit 832, the video output unit 863, the audio output unit 866, and others are not omitted. The monitor device 20300 may have the same configuration as that of the broadcast receiving apparatus 100 of the first embodiment, or may have the configuration in which the LAN communication unit 121 and the tuner/demodulating unit 131 are omitted from the configuration of the broadcast receiving apparatus 100 of the first embodiment, or may have a configuration different from the above configurations.

[Configuration of Interface between Broadcast Receiving Apparatus and Monitor Device]

Figure 31:
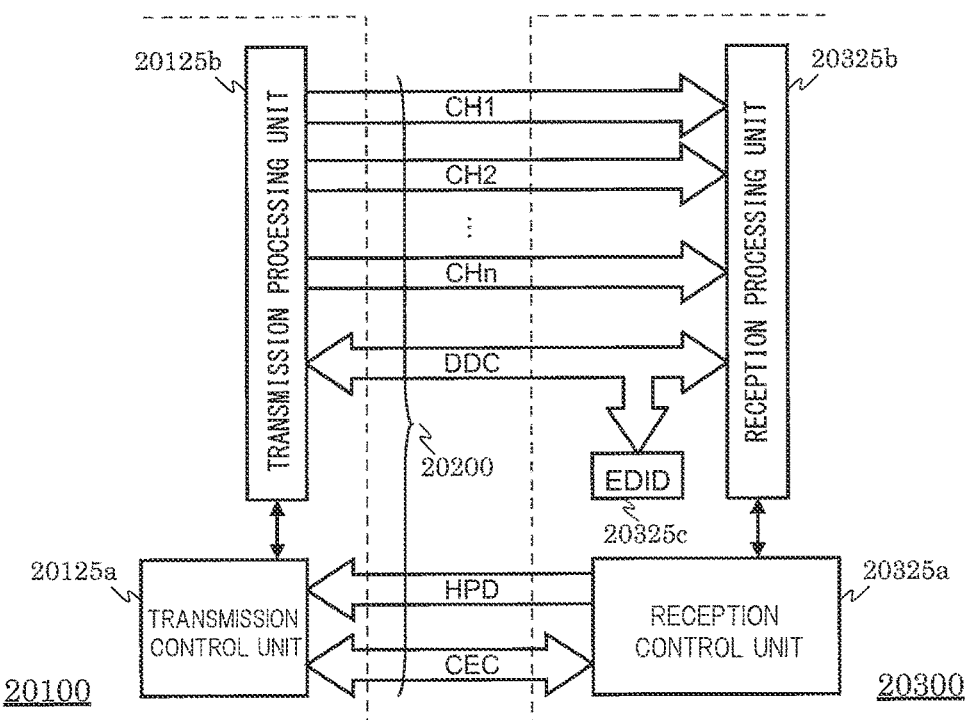
FIG. 31 is an interface configuration diagram between the broadcast receiving apparatus and the monitor device according to the third embodiment.

FIG. 31 is a system configuration diagram showing an example of a configuration of an interface between the broadcast receiving apparatus 20100 and the monitor device 20300. In this embodiment, the case in which a connection terminal (not shown) of the digital interface unit 20125 of the broadcast receiving apparatus 20100 is connected to a connection terminal (not shown) of the digital interface unit 20325 of the monitor device 20300 through the connection cable 20200 will be described.

As shown in FIG. 31, the connection cable 20200 is made up of n pairs of differential transmission lanes CH1 to CHn, a DDC (Display Data Channel) line standardized by the VESA (Video Electronics Standard Association), an HPD (Hot Plug Detect) line, a CEC (Consumer Electronics Control) line, and the like. The n pairs of differential transmission lanes may be composed of one pair of clock lanes and (n−1) pairs of data lanes or one pair of clock lanes and one pair of data lanes (i.e., n−2). In the case of n−2 as described above, the differential transmission lane unit may adopt the serial transmission. Though not shown, the connection cable 20200 may further include a power line, a GND line, and a spare line. The CEC line may be omitted from the connection cable 20200.

Digital video and audio (R/G/B/Vsync/Hsync) signals, control signals, and others may be output in the given parallel transmission format from the video synthesizing unit 161 and the audio synthesizing unit 164 to the data lane through a transmission processing unit 20125b of the digital interface unit 20125 of the broadcast receiving apparatus 20100. Alternatively, program data and others including coded video and audio data such as an MMT data string and MPEG2-TS data string and control signals may be output in the given serial transmission format from the separating unit 132 and the transcode processing unit 20181. The digital video and audio signals, control signals, and others or the program data and others including coded video and audio data and control signals are received by the reception processing unit 20325b of the digital interface unit 20325 of the monitor device 20300, are subjected to proper processes (including a decoding process in the case of the program data and others including coded video and audio data and control signals), and are then output from the monitor unit 20362 and the speaker unit 20365.

Note that the MMT data string may be a data flow of consecutive MMTP packets. Alternatively, the MMT data string may be a data flow of IP packets each containing an MMTP packet in a payload thereof and further including time information in the NTP packet format, or may be a data flow of IP packets not including time information in the NTP packet format.

Also, the transmission processing unit 20125*b* of the digital interface unit 20125 of the broadcast receiving apparatus 20100 can read EDID (Extended Display Identification Data) from an EDID memory unit 20325*c* through the communication with the reception processing unit 20325*b* of the digital interface unit 20325 of the monitor device 20300 via the DDC line. Namely, the broadcast receiving apparatus 20100 can confirm the capability and functions of the monitor device 20300 by acquiring the EDID.

Note that examples of the capability and functions of the monitor device 20300 of this embodiment that can be confirmed in the above-described manner include items of input resolution, refresh rate, video standard, and others that the monitor device 20300 supports and items as to whether the monitor device 20300 has a function capable of supporting the process of decoding the MMT data string, whether the monitor device 20300 has a function capable of supporting the process of decoding the MPEG2-TS data string, and whether the monitor device 20300 has a function capable of supporting the network communication.

Note that the above process of acquiring the EDID is described as an example of a process of acquiring information indicating the functions and capability of the monitor device 20300 and functions that the monitor device 20300 supports (hereinafter referred to as "function identifying information"). Namely, a method different from the method of reading the EDID may be employed to confirm the display capability of the monitor device 20300. For example, data indicating the display capability in a unique format different from the format of the EDID data may be adopted as the function identifying information, and the function identifying information may be transmitted from the digital interface unit 20325 of the monitor device 20300 to the digital interface unit 20125 of the broadcast receiving apparatus 20100.

Besides the "function identifying information" such as the EDID, "operation state information" indicating whether a given function of the monitor device 20300 is currently in an operable state may be transmitted from the digital interface unit 20325 of the monitor device 20300 to the digital interface unit 20125 of the broadcast receiving apparatus 20100. For example, even if the monitor device 20300 has the function capable of supporting the network communication, there may be a case in which the function of the monitor device 20300 cannot be exerted in a desirable manner because, for example, the communication network used by the network communication function is in an uncommunicable state for some reasons. In such a case, by transmitting the operation state information indicating whether the function of the monitor device 20300 is currently in a normally operable state, the state of the function of the monitor device 20300 can be notified to the broadcast receiving apparatus 20100. This notifying process may be performed by exchanging data between the main control unit 101 of the broadcast receiving apparatus 20100 and the main control unit 20301 of the monitor device 20300 through the transmission control unit 20125*a*, the CEC line of the connection cable 20200, and the reception control unit 20325*a*.

Also, the transmission control unit 20125*a* of the digital interface unit 20125 of the broadcast receiving apparatus 20100 controls the transmission processing unit 20125*b*, and further detects that connection to the monitor device 20300 is established and that the monitor device 20300 is powered on, through the communication with the reception control unit 20325*a* of the digital interface unit 20325 of the monitor device 20300 via the HDD line. Note that the reception control unit 20325*a* of the digital interface unit 20325 of the monitor device 20300 further controls the reception processing unit 20325*b*.

The configuration of the connection cable 20200, the internal configuration of the digital interface unit 20125 of the broadcast receiving apparatus 20100, and the internal configuration of the digital interface unit 20325 of the monitor device 20300 are shown in FIG. 31 by way of example. Hardware of the digital interface is provided as a DVI terminal, an HDMI (registered trademark) terminal, a Display Port (registered trademark) terminal, an MHL terminal, or the like, and data may be output or input in a format conforming to the DVI specifications, HDMI specifications, Display Port specifications, MHL specifications, and SuperMHL specifications or a format obtained by extending these specifications. Alternatively, data may be output or input in a serial data format conforming to IEEE 1394 specifications and others.

Further, the functions of the digital interface unit 20125 of the broadcast receiving apparatus 20100 and the functions of the digital interface unit 20325 of the monitor device 20300 described above may be achieved through communication via hardware such as an Ethernet and wireless LAN. In such a case, an IP interface is configured by using the LAN communication unit 121 in place of the digital interface unit 20125 of the broadcast receiving apparatus 20100 and using the LAN communication unit 20326 in place of the digital interface unit 20325 of the monitor device 20300. The "function identifying information" and the "operation state information" described above can be transmitted and received between the LAN communication unit 121 and the LAN communication unit 20326 by using an IP protocol to allow data communication between the communication unit 121 and the LAN communication unit 20326. With this configuration, it becomes unnecessary to connect the broadcast receiving apparatus 20100 and the monitor device 20300 with the digital interface if there is an LAN environment available for the broadcast receiving apparatus 20100 and the monitor device 20300.

The digital interface and the IP interface described above may be established using either a wired transmission or a wireless transmission.

[Data Output Control in Broadcast Receiving Apparatus]

Examples of data output control in the broadcast receiving apparatus 20100 will be described below.

(A) Output Control in Accordance with Decoding Capability of Output Destination Device FIGS. 32A and 32B show examples of data output control that is performed in accordance with the decoding capability for an MMT data string and an MPEG2-TS data string of an output destination device connected via a connection cable or an LAN cable, when the broadcast receiving apparatus 20100 of this embodiment receives the broadcasting service adopting the MMT method as the media transport method. In the description of this embodiment, the connection cable 20200 is taken as an example of the connection cable and the monitor device 20300 is taken as an example of the output destination device.

An output control unit 21102*i* of the broadcast receiving apparatus 20100 of this embodiment first acquires function identifying information such as EDID data stored in the EDID memory unit 20325*c* of the monitor device 20300 serving as an output destination device, through the DDC line of the connection cable 20200 and the transmission processing unit 20125*b* and transmission control unit 20125*a* of the digital interface unit 20125.

First, the results of identifying the functions of the output destination device using the acquired function identifying information will be described with reference to FIG. 32A.

For example, when the monitor device 20300 serving as an output destination device has the configuration shown in FIG. 30, the monitor device 20300 has both of the function of decoding the MMT data string and the function of decoding the MPEG2-TS data string. In this case, the device like this stores the function identifying information capable of identifying that the device supports both of the decoding process of the MMT data string and the decoding process of the MPEG2-TS data string in principle.

Next, when the monitor device 20300 serving as an output destination device having the configuration shown in FIG. 30 has only one of the function of decoding the MMT data string and the function of decoding the MPEG2-TS data string and does not have the other function, the device stores the function identifying information capable of identifying that the device has only the function of decoding the MMT data string and does not have the function of decoding the MPEG2-TS data string or the function identifying information capable of identifying that the device has only the function of decoding the MPEG2-TS data string and does not have the function of decoding the MMT data string in principle.

Also, when the output destination device can be connected to the broadcast receiving apparatus 20100 through the interface but has neither the function of decoding the MMT data string nor the function of decoding the MPEG2-TS data string, the device stores the function identifying information capable of identifying that the device does not have the function of decoding the MMT data string and the function of decoding the MPEG2-TS data string in principle.

In addition, as an exceptional case, even when the broadcast receiving apparatus 20100 has acquired the function identifying information stored in the output destination device, it is sometimes impossible to identify whether or not the output destination device supports the decoding process of the MMT data string and the decoding process of the MPEG2-TS data string. Note that this includes the case of failing to acquire the function identifying information stored in the output destination device.

In FIG. 32A, the results of the function identifying process for the decoding process of the MMT data string and the decoding process of the MPEG2-TS data string in the output destination device performed by the broadcast receiving apparatus 20100 based on the function identifying information acquired from the output destination device are indicated as "supported", "unsupported", and "unidentifiable". FIG. 32A further shows output control examples 1 to 3 indicating output control performed by the broadcast receiving apparatus 20100 in response to the result of the function identifying process.

First, "Output MMT data" shown in the output control examples 1 to 3 of FIG. 32A will be described. In the case of "Output MMT data", the output control unit 21102*i* of the broadcast receiving apparatus 20100 performs control so that an MMT data string which is output from the tuner/demodulating unit 131 to the separating unit 132 is output from the separating unit 132 as it is and the MMT data string is output through the digital interface unit 20125 to the monitor device 20300 serving as an output destination device. Alternatively, the output control unit 21102*i* performs control so that the MMT data string output from the separating unit 132 is subjected to a bit rate conversion process or the like in the transcode processing unit 20181 to reduce the data amount thereof, is put back into the original MMT data string, and then is output through the digital interface unit 20125 to the monitor device 20300. In this case, in the monitor device 20300, the MMT data string transmitted from the broadcast receiving apparatus 20100 is received by the digital interface unit 20325, a decoding process or the like is performed to the received MMT data string in the MMT decode processing unit 20341, and then video information and audio information are offered to the user through the monitor unit 20362 and the speaker unit 20365.

Next, "Output MPEG2-TS data" shown in the output control examples 1 to 3 of FIG. 32A will be described. In the case of "Output MPEG2-TS data" in FIG. 32A, the output control unit 21102*i* of the broadcast receiving apparatus 20100 performs control so that an MMT data string which is output from the tuner/demodulating unit 131 to the separating unit 132 is output from the separating unit 132 as it is and the MMT data string is converted into an MPEG2-TS data string by the conversion process of the media transport method in the transcode processing unit 20181, and the MPEG2-TS data string is output to the monitor device 20300 serving as an output destination device through the digital interface unit 20125. In the monitor device 20300, the MPEG2-TS data string transmitted from the broadcast receiving apparatus 20100 is received by the digital interface unit 20325 and a decoding process of the like is performed to the received MPEG2-TS data string in the MPEG2-TS decode processing unit 20342, and then video information and audio information are offered to the user through the monitor unit 20362 and the speaker unit 20365.

In the case of "Output MPEG2-TS data" described above, the following process is preferably performed in the process of converting the MMT data string into the MPEG2-TS data string in the transcode processing unit 20181. Namely, in the conversion process of the media transport method in the transcode processing unit 20181, time information such as a DTS (Decoding Time Stamp) serving as a reference for decoding coded video and audio data included in a PES (Packetized Elementary Stream) in an MPEG2-TS data string or an MPEG2-PS (Program Stream) data string and a PTS (Presentation Time Stamp) serving as a reference for reproducing such coded video and audio data is preferably created by referring to control information in the MMT data string.

Specifically, the DTS may be created by referring to an "MPU_presentation_time" parameter of the MPU timestamp descriptor shown in FIG. 13B, an "MPU_decoding_time_offset" parameter, a "timescale" parameter, and a "pts_offset" parameter of the MPU extension timestamp descriptor shown in FIG. 33, and others. Also, the PTS may be created by referring to the created DTS, a "dts_pts_offset" parameter and a "timescale" parameter of the MPU extension timestamp descriptor shown in FIG. 33, and others. Further, PCR (Program Clock Reference) and SCR (System Clock Reference), which are necessary for generating an STC (System Time Clock) serving as a reference clock for decoding and reproducing coded video and audio data included in the PES in the MPEG2-TS data string or the MPEG2-PS data string, are created based on time information output by the reception system clock of the receiver described in the first embodiment with reference to FIG. 7C.

By the processes described above, the decoding time and the presentation time can be controlled in units of presentation of video and audio signals, even in the MPEG2-TS data string converted from the MMT data string by the conversion process of media transport method.

When an MPT of a program to be output specifies a plurality of video assets and the video assets are correlated with layouts, devices, and/or regions transmitted by the LCT shown in FIGS. 19B, 19C, and 19D by the MPU presentation region specifying descriptor, which video asset data should be included in the MPEG2-TS data and output needs to be determined in the conversion process of the MMT data string into the MPEG2-TS data string in the transcode processing unit 20181. In this case, a video asset to be included in the MPEG2-TS data and output may be determined based on the corresponding relation between the layouts, devices, and regions specified by the LCT and the video assets. For example, the MPEG2-TS data string including data obtained by the conversion process performed to the video asset correlated with the device number 0 (device_id:0) and the region umber 0 (region_number:0) in the layouts transmitted by the LCT of FIGS. 19B and 19C is created in the transcode processing unit 20181. In this case, video data based on video assets correlated with other device numbers and region numbers may not be included in the MPEG2-TS data string to be output.

Also, when the order of priority is specified for the plurality of video assets in advance, the video asset with the highest order of priority may be selected and converted into the MPEG2-TS data string regardless of the device number and the region number mentioned above. It is also possible to select a video asset displayed in a region chosen by the user and convert it into the MPEG2-TS data string.

The description returns to FIG. 32A. In any of the output control examples 1 to 3 of FIG. 32A, when "supported" is specified for one decoding process while "unsupported" or "unidentifiable" is specified for the other decoding process, a data string is output in a format for the decoding process for which "supported" is specified. When "unsupported" or "unidentifiable" is specified for both decoding processes, "follow output control example 4" is specified for each of the output control examples 1 to 3 of FIG. 32A. The output control example 4 will be described later with reference to FIG. 32B. Thus, the output control examples 1 to 3 of FIG. 32A differ in output control only when "supported" is specified for both decoding processes.

In the output control example 1, when "supported" is specified for both decoding processes, a process of "output MMT data" is performed. In this case, a higher level process than the case of "output MPEG2-TS data" can be performed in the monitor device 20300 in the layout control or the like.

In the output control example 2, when "supported" is specified for both decoding processes, the process of "output MPEG2-TS data" is performed. In this case, data processed by the output destination device is conventional MPEG2-TS data, and therefore the amount of data processed by the output destination device is reduced.

In the output control example 3, when "supported" is specified for both decoding processes, it is determined that the process of "output MMT data" or the process of "output MPEG2-TS data" is performed in accordance with the order of priority set in the broadcast receiving apparatus 20100. "Follow set order of priority" means, for example, data output is performed by following the setting in which one output format is selected as a default at the time of product shipment or the setting in which the other output format is selected thereafter by the user on a menu or the like through the operation input unit. In this case, it is possible to output the data in the data format intended by the user.

Next, output control performed in the case where "unsupported" or "unidentifiable" is specified for both decoding processes (output control example 4) will be described with reference to FIG. 32B. FIG. 32B shows examples of output control (output control examples 4-A1 to 4-E) for combinations of function identifying results in the case where "unsupported" or "unidentifiable" is specified for the decoding process of the MMT data string and the decoding process of the MPEG2-TS data string in the output destination device as a result of the function identifying process performed in the broadcast receiving apparatus 20100.

The output control example 4-A1 is an example in which neither a data string in the MMT format nor a data string in the MPEG2-TS format is output ("output no data") when a function identifying result indicates "unsupported" or "unidentifiable". This case at least reduces a possibility that an unexpected failure occurs in the output destination device.

In each of the output control examples 4-A2 to 4-A4, no data is output ("output no data") when a function identifying result indicates "unsupported" for both decoding processes, but when "unidentifiable" is specified for at least one of the two decoding processes instead of "unsupported", data is output in the data format corresponding to the decoding process for which the function identifying result indicates "unidentifiable" instead of "unsupported" on the basis of the thought that the output destination device may possibly support the one decoding process for which "unidentifiable" is specified. The output control examples 4-A2 to 4-A4 differ in output control in the case where the function identifying results indicate "unidentifiable" for both decoding processes. However, since the output control for this case is the same as the case in which the function identifying results indicate "supported" for both decoding processes in the output control examples 1 to 3 of FIG. 32A, further descriptions thereof are omitted.

In the output control example 4-B1, when a function identifying result indicates "unsupported" or "unidentifiable" for the two decoding processes, the process of "output MPEG2-TS" is performed for the time being for both cases. For example, there may be a connection environment where the function identifying information of the output destination device indicates "unsupported" for the two decoding processes like the case where the output destination device is not the monitor device but is a relay device such as image distributor disposed between the monitor device 20300 and the broadcast receiving apparatus 20100.

The output control example 4-B1 assumes this case, and the process of "output MPEG2-TS" is performed for the time being even if the function identifying result indicates "unsupported" or "unidentifiable" for the two decoding processes.

The output control example 4-C1 assumes a similar case, and the process of "output MMT" is performed for the time being even if the function identifying result indicates "unsupported" or "unidentifiable" for the two decoding processes.

The output control example 4-B2 and the output control example 4-C2 are modification examples of the output control example 4-B1 and the output control example 4-C1, respectively. In each of these modification examples, when a function identifying result indicates "unidentifiable" for one of the two decoding processes and "unsupported" for the other decoding process, data in a data format corresponding to the decoding process for which "unidentifiable" is indicated is preferentially output. In these modification examples, possibility that the decoding process can be performed in the output destination device is improved to some extent in comparison with the output control example 4-B1 and the output control example 4-C1.

The output control example 4-D is an example in which data is output by following set order of priority for both cases ("output data by following set order of priority") when a function identifying result indicates "unsupported" or "unidentifiable" for the two decoding processes. Since the process of "output data by following set order of priority" has already been described in the output control example 3 of FIG. 32A, further descriptions thereof are omitted.

In the output control example 4-E, when a function identifying result indicates "unsupported" or "unidentifiable" for the two decoding processes, a process of presenting a message for asking the user to select a data output format is performed to make the user select the data output format by an operation through the operation input unit 170.

In this case, with respect to the way to present the message to the user, for example, an image having the message superposed thereon may be displayed on a display device which is connected via the audio output unit 163 and is different from the output destination device connected to the digital interface unit 20125 of FIG. 29A. A submonitor (not shown in FIG. 29A) for displaying various messages to the user may be provided on the broadcast receiving apparatus 20100 to display the above message thereon. Alternatively, the message may be transmitted to the portable information terminal 700 cooperated with the broadcast receiving apparatus 20100 to display the message thereon. In another case, only a voice message (audio data) having contents equivalent to the above message may be transmitted to the output destination device so as to ask the user to select the data output format through the speaker of the output destination device.

By adopting any one of the output control examples described above with reference to FIGS. 32A and 32B, the broadcast receiving apparatus 20100 of this embodiment can perform data output control in accordance with the capability for the decoding process of the MMT data string and the MPEG2-TS data string in the output destination device connected via the connection cable and LAN cable of the digital interface.

Note that it is preferable that even if any one of the output control examples is set at the time of product shipment, the broadcast receiving apparatus is configured so that setting of output control for an output data format under the respective conditions can be changed by the manual setting operation by the user on the menu or the like through the operation input unit 170. This is because even when an unexpected special device is provided as the output destination device or normal function identifying result cannot be acquired in the function identifying process for the output destination device due to the failure of the broadcast receiving apparatus 20100 itself or the software of the output destination device, it is possible to prevent the disadvantage for the user by configuring the broadcast receiving apparatus so that the user is able to obtain necessary data output by manual setting operation.

(B) Output Control in Accordance with Network Communication Capability and Network Communication State of Output Destination Device FIGS. 34A and 34B show examples of data output control in accordance with the network communication capability and network communication state of the output destination device connected via a connection cable or an LAN cable, when the broadcast receiving apparatus 20100 of this embodiment receives the broadcasting service adopting the MMT method as the media transport method. In the description of this embodiment, the connection cable 20200 is taken as an example of the connection cable and the monitor device 20300 is taken as an example of the output destination device.

The output control unit 21102i of the broadcast receiving apparatus 20100 of this embodiment first acquires function identifying information such as EDID data stored in the EDID memory unit 20325c of the monitor device 20300 serving as an output destination device, through the DDC line of the connection cable 20200 and the transmission processing unit 20125b and transmission control unit 20125a of the digital interface unit 20125.

For example, when the monitor device 20300 is configured to have the LAN communication unit 20326 as shown in FIG. 30 or includes a different network communication function (e.g., 3G communication function, LTE communication function, etc.), the device like this stores the function identifying information capable of identifying that the device supports the network communication function in principle. In particular, when the broadcast receiving apparatus 20100 and the output destination device are connected through the LAN cable, the output destination device has the network communication function.

In addition, as an exceptional case, even when the broadcast receiving apparatus 20100 has acquired the function identifying information stored in the output destination device, it is sometimes impossible to identify whether or not the output destination device supports the network communication function like in the case described with reference to FIGS. 32A and 32B.

In FIG. 34A, the results of the function identifying process for the network communication function in the output destination device performed by the broadcast receiving apparatus 20100 based on the function identifying information acquired from the output destination device are indicated as "supported", "unsupported", and "unidentifiable". FIG. 34A further shows output control examples indicating output control performed by the broadcast receiving apparatus 20100 in response to the result of the function identifying process.

When the result of the function identifying process indicates "supported", the output control unit 21102i of the broadcast receiving apparatus 20100 performs a process of "output without mixing data acquired by the network communication function". Specifically, the output control unit 21102i performs control so that an MMT data string which is output from the tuner/demodulating unit 131 to the separating unit 132 is output from the separating unit 132 as it is, and is output to the monitor device 20300 serving as an output destination device through the digital interface unit 20125. At this time, even if the location information included in an MPT of the MMT data string specifies data that is acquired from a network communication path different from broadcast waves received through the tuner/demodulating unit 131, the MMT data string acquired from the broadcast waves received through the tuner/demodulating unit 131 is output to the monitor device 20300 without mixing the data acquired from the network communication path.

In the monitor device 20300, the MMT data string transmitted from the broadcast receiving apparatus 20100 is received by the digital interface unit 20325. Further, in the monitor device 20300, when the location information included in the MPT of the MMT data string specifies data that is acquired from the network communication path, related data stored in a given server device on the network is acquired through the LAN communication unit 20326 when necessary, and the MMT data string received from the broadcast receiving apparatus 20100 and the acquired related data are subjected to a decoding process or the like in the MMT decode processing unit 20341, and then video information and audio information are offered to the user through the monitor unit 20362 and the speaker unit 20365.

Meanwhile, in the case where the result of the function identifying process indicates "unsupported", when an MMT data string in which location information included in an MPT specifies data acquired from a network communication path different from broadcast waves received through the tuner/demodulating unit 131 is output, the output control unit 21102*i* of the broadcast receiving apparatus 20100 performs a process of "output with mixing data acquired by the network communication function". Specifically, the output control unit 21102*i* performs control for creating an MMT data string obtained by mixing related data acquired from a given server device on the network indicated by the location information through the LAN communication unit 121 and the MMT data string output from the tuner/demodulating unit 131 to the separating unit 132.

This data string mixing process can be performed by rearranging the data string, while separating the related data acquired through the LAN communication unit 121 and each data of the MMT data string input from the tuner/demodulating unit 131 to the separating unit 132, in the separating unit 132. In another method, the data string mixing process may be achieved by performing a data string conversion process of rearranging the related data acquired through the LAN communication unit 121 and the MMT data string input from the tuner/demodulating unit 131 to the separating unit 132, in the transcode processing unit 20181.

Then, the output control unit 21102*i* performs control so that the MMT data string newly created in the above manner can be output to the monitor device 20300 serving as an output destination device through the digital interface unit 20125. In the monitor device 20300, the mixed data transmitted from the broadcast receiving apparatus 20100 is received by the digital interface unit 20325, and this received mixed data is subjected to a decoding process or the like in the MMT decode processing unit 20341, and then video information and audio information are offered to the user through the monitor unit 20362 and the speaker unit 20365.

According to the process of FIG. 34A, when the output destination device supports the network communication process, the mixing process of the MMT data string acquired via the broadcast waves and the data acquired from the network communication path is performed in the output destination device. Consequently, since the processing time in the broadcast receiving apparatus 20100 is reduced, a delay in reproduction in the output destination device can be reduced. Meanwhile, when the output destination device does not support the network communication process, the mixing process is performed in the broadcast receiving apparatus 20100 and then the mixed data is output to the output destination device. In this case, even if the output destination device is a monitor device having no network communication function, a service of presenting high-quality video, audio, data, and others created by using both of the MMT data string acquired via broadcast waves and the data acquired from the network communication path can be offered to the user.

In addition, when the result of the function identifying process indicates "unidentifiable", the output control unit 21102*i* may perform the same output control as the case of "unsupported". This is for the purpose of increasing a possibility that a service of presenting high-quality video, audio, data, and others created by using both of the MMT data string acquired via broadcast waves and the data acquired from the network communication path can be offered to the user even when the output destination device does not have the network communication function.

According to the output control of FIG. 34A described above, a preferable output process can be performed based on whether the output destination device supports the network communication process or not.

Next, the process of mixing the related data acquired through the LAN communication unit 121 and the MMT data string acquired through the tuner/demodulating unit 131 in the broadcast receiving apparatus 20100 will be described below in detail.

Figure 35:
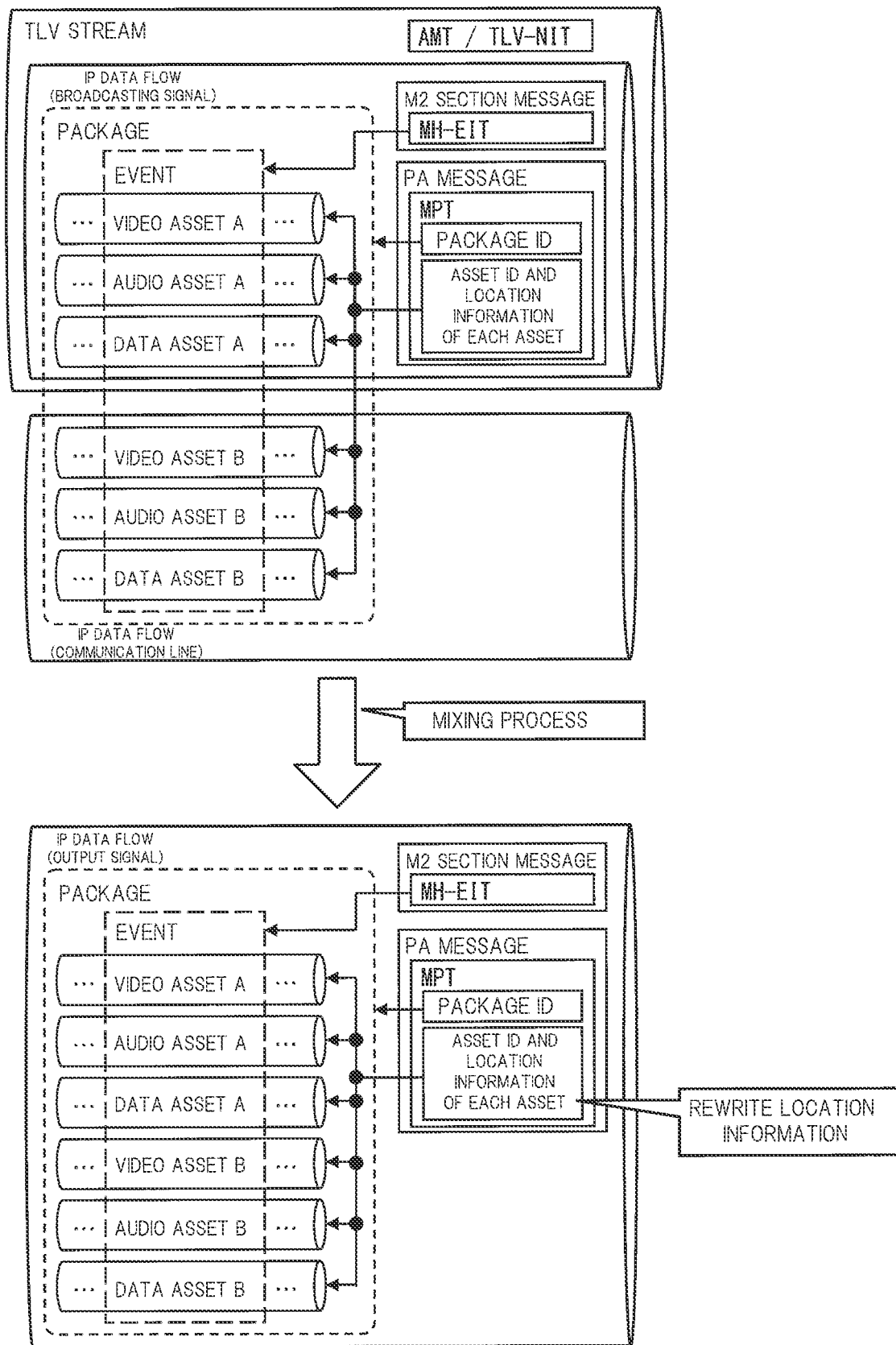
FIG. 35 is an explanatory diagram of an operation of a data mixing process of the broadcast receiving apparatus according to the third embodiment.

For example, it is assumed that a package making up a broadcasting service is composed of a video asset A, an audio asset A, a data asset A, a video asset B, an audio asset B, and a data asset B as shown in FIG. 35. It is also assumed that the video asset A, the audio asset A, and the data asset A are distributed in the IP data flow (broadcasting signal) included in a TLV stream transmitted by broadcast waves, while the video asset B, the audio asset B, and the data asset B are distributed in the IP data flow (communication line) from a given server device through a network communication path such as a communication line. The video asset B, the audio asset B, and the data asset B can be acquired by referring to an event package descriptor (disposed in "descriptor ( )" shown in FIG. 21) of an MH-EIT, a package ID (corresponding to an "MMT_package_id_byte" parameter shown in FIG. 17) and location information (corresponding to "MMT_general_location_info( )" shown in FIG. 17) of an MPT, included in a control signal (MMT-SI) in the IP data flow (broadcasting signal) transmitted by the TLV stream.

Thus, in the broadcast receiving apparatus 20100 of this embodiment, the IP data flow (communication line) correlated to the IP data flow (broadcasting signal) and distributed through the communication line can be acquired by referring to the control signal (MMT-SI) included in the IP data flow (broadcasting signal) transmitted by the TLV stream. Further, a data string of each asset of the IP data flow (broadcasting signal) and a data string of each asset of the IP data flow (communication line) can be output as one IP data flow (output signal) by the mixing process from the digital interface unit 20125.

At this time, the broadcast receiving apparatus 20100 of this embodiment rewrites the location information included in the MPT. Specifically, for example, the location information related to each asset of the IP data flow (communication line) is rewritten from "location_type-0x01" indicating the data multiplexed in an IPv4 data flow or "location_type=0x02" indicating the data multiplexed in an IPv6 data flow to "location_type=0x00" indicating the data multiplexed in the same IP data flow as the MPT. As a result of the process of rewriting the location information of the MPT, the monitor device 20300 can acquire the video asset B, the audio asset B, and the data asset B by referring to the IP data flow (output signal) acquired through the communication line 20200.

Next, as a modification example of the output control of FIG. 34A, output control examples using not only the function identifying information for the network communication function identifying process but also network communication state information indicating whether the output destination device is in a state of being capable of network communication or in a state of being incapable of network communication will be described with reference to FIG. 34B. In the output control example of FIG. 34B, the broadcast receiving apparatus 20100 acquires the network communication state information from the output destination device through the connection cable and LAN cable in addition to the function identifying information. At this time, like in the case of the output control example of FIG. 34A, the results of identifying process for the network communication process using the function identifying information are indicated as three results such as "supported", "unsupported", and "unidentifiable". Since these results are the same as those shown in FIG. 34A, further descriptions thereof are omitted. On the other hand, the network communication state information indicates "communicable state" and "incommunicable state", and may indicate "unidentifiable" as a result of the identifying process in the broadcast receiving apparatus 20100. Note that the control unit or the like of the output destination device creates the network communication state information by determining whether its network communication function is in a state of being capable of communication (not necessarily required to perform communication at this point) or in a state of being incapable of communication.

There are two output control patterns to be selectively performed in the output control example of FIG. 34B such as "output without mixing data acquired by the network communication function" and "output with mixing data acquired by the network communication function" like those in FIG. 34A. Since the details of both output control patterns have already been described above, further descriptions thereof are omitted.

In the output control of FIG. 34B, when the identifying result for the network communication function indicated by the function identifying information identifies the output destination device as "supported" and the network communication state information is identified as indicating "communicable state", the control of "output without mixing data acquired by the network communication function" is performed. This is because the mixing process can be performed in the output destination device in this case. Also, when the identifying result for the network communication function indicated by the function identifying information identifies the output destination device as "unidentifiable" and the network communication state information is identified as indicating "communicable state", the control of "output without mixing data acquired by the network communication function" may be performed. This is because this control can increase the possibility that proper process is performed in this case on the basis of the thought that the network communication function identified as "unidentifiable" can be estimated as "supported" from the result that the network communication state information indicates "communicable state".

Meanwhile, when the identifying result for the network communication function indicated by the function identifying information identifies the output destination device as "unsupported", the control of "output with mixing data acquired by the network communication function" is performed, regardless of the identifying result indicated by the network communication state information. This is because a possibility that the mixing process can be performed in the output destination device is extremely low in this case. Further, when the identifying result indicated by the network communication state information identifies the network communication state as "uncommunicable state", the control of "output with mixing data acquired by the network communication function" is performed, regardless of the identifying result indicated by the function identifying information. This is because a possibility that the mixing process can be performed in the output destination device is extremely low also in this case. Finally, when the identifying result indicated by the network communication state information indicates "unidentifiable", since a possibility that the mixing process can be performed in the output destination device is unclear, the control of "output with mixing data acquired by the network communication function" is performed.

According to the output control of FIG. 34B described above, a preferable output process can be performed based on whether the output destination device supports the network communication function or not and based on the operation state of the network communication process in the output destination device.

Note that it is preferable that even if the output control examples shown in FIGS. 34A and 34B are set at the time of product shipment, the broadcast receiving apparatus is configured so that setting of output control for an output data format under the respective conditions can be changed by the manual setting operation by the user on the menu or the like through the operation input unit 170. This is because even when normal identifying result cannot be acquired for the network communication state of the output destination device due to the failure of the broadcast receiving apparatus 20100 itself or the software of the output destination device, it is possible to prevent the disadvantage for the user by configuring the broadcast receiving apparatus so that the user is able to obtain necessary data output by manual setting operation.

Through the processes described above, the broadcast receiving apparatus 20100 of this embodiment can perform data output control in accordance with the network communication process capability and network communication state of the monitor device connected via the connection cable and LAN cable.

As described above, the broadcast receiving apparatus 20100 of this embodiment can perform data output control in accordance with the information related to the display capability of the monitor device acquired from the monitor device connected via the connection cable and LAN cable. Namely, it is possible to provide the broadcast receiving apparatus capable of exerting a function with a higher added value.

In the foregoing, the first to third embodiments of the present invention have been described above. However, the configurations for achieving the technique of the present invention are not limited to those embodiments, and may be modified in various ways. For example, some constituent elements of an embodiment may be replaced with those of another embodiment, and a constituent element of an embodiment may be added to a constituent element of another embodiment. These modifications are all within the scope of the present invention. In addition, numerical values, messages, and others in the specification and drawings are described by way of example, and the effects of the present invention are not impaired even when values, messages, and others different from those are used.

Some or the whole of the functions and others of the present invention described above may be achieved by means of hardware, for example, by designing such functions with integrated circuits, or may be achieved by means of software by making a microprocessor unit or the like interpret and execute operating programs for achieving respective functions. It is also possible to use hardware and software in combination.

Note that the software that controls the broadcast receiving apparatus 100 may be stored in advance in the ROM 103 and/or the storage (accumulation) unit 110 of the broadcast receiving apparatus 100 at the time of product shipment. The software may be acquired from the other application server 500 or the like on the Internet 200 through the LAN communication unit 121 after the product shipment. Alternatively, the software stored in a memory card, optical disc, or the like may be acquired through the extension interface unit 124.

Also, control lines and data lines considered to be necessary for the description are shown in the drawings, and all the control lines and data lines included in the product are not always shown in the drawings. Actually, it is presumable that almost all constituent elements are connected with each other.

REFERENCE SINGS LIST 100, 800, 20100 broadcast receiving apparatus
100a, 20100a antenna
101, 801 main control unit
102, 802 system bus
103, 803 ROM
104, 804 RAM
110, 810 storage unit
121, 821 LAN communication unit
124, 824 extension interface unit
125, 825, 20125 digital interface unit
131, 831, 832 tuner/demodulating unit
132 separating unit
141 video decoder
142 video color gamut conversion unit
143 audio decoder
144 caption decoder
145 subtitle decoder
146 subtitle synthesizing unit
147 subtitle color gamut conversion unit
151 data decoder
152 cache unit
153 application control unit
154 browser unit
155 application color gamut conversion unit
156 sound source unit
161, 861 video synthesizing unit
162, 862 monitor unit
163, 863 video output unit
164, 864 audio synthesizing unit
165, 865 speaker unit
166, 866 audio output unit
170, 870 operation input unit
20181 transcode processing unit
841 MMT decode processing unit
842 MPEG2-TS decode processing unit
200 Internet
200r router device
200a access point
300t radio tower
300s broadcast satellite (communication satellite)
300 broadcast station server
400 service provider server
500 other application server
600 mobile phone communication server
600b base station
700 portable information terminal
20200 connection cable
20300 monitor device

The invention claimed is:

1. A broadcast receiving apparatus comprising:
a receiver configured to receive digital broadcasting contents that are transmitted by a first media transport method;
a transport method converter configured to convert a transport method for the received contents;
a digital interface configured to communicate with external equipment; and
a controller,
wherein the broadcast receiving apparatus can acquire capability information of the external equipment through the digital interface, and
wherein in accordance with the capability information of the external equipment acquired through the digital interface, the digital interface performs three types of output operations including:
a first operation in which the capability information of the external equipment indicates that the external equipment supports a function of decoding data of the first media transport method and the capability information of the external equipment indicates that the external equipment does not support a function of decoding data of a second media transport method, and in which the contents by the first media transport method without conversion are output from the digital interface to the external equipment;
a second operation in which the capability information of the external equipment indicates that the external equipment does not support the function of decoding data of the first media transport method and the capability information of the external equipment indicates that the external equipment supports the function of decoding data of the second media transport method, and in which the contents by the second media transport method that is converted from the first media transport method by the transport method converter are output from the digital interface to the external equipment; and
a third operation in which the capability information of the external equipment indicates that the external equipment does not support the function of decoding data of the first media transport method and the capability information of the external equipment indicates that the external equipment does not support the function of decoding data of the second media transport method, and in which the contents by the first media transport method without conversion are output from the digital interface to the external equipment.

2. The broadcast receiving apparatus according to claim 1, wherein the first media transport method is an MMT method, and
wherein the second media transport method is an MPEG2-TS method.

3. A contents outputting method from a broadcast receiving apparatus to external equipment through a digital interface, the method comprising:
a receiving step of receiving digital broadcasting contents that are transmitted by a first media transport method; and
an input/output step of performing communication with the external equipment and output of the contents through the digital interface,
wherein, in the input/output step, in accordance with capability information of the external equipment acquired through the digital interface, the digital interface performs three types of output operations including:

a first operation in which the capability information of the external equipment indicates that the external equipment supports a function of decoding data of the first media transport method and the capability information of the external equipment indicates that the external equipment does not support a function of decoding data of a second media transport method, and in which the contents by the first media transport method without conversion are output from the digital interface to the external equipment;

a second operation in which the capability information of the external equipment indicates that the external equipment does not support the function of decoding data of the first media transport method and the capability information of the external equipment indicates that the external equipment supports the function of decoding data of the second media transport method, and in which the contents by the second media transport method that is converted from the first media transport method by a transport method conversion process are output from the digital interface to the external equipment; and a third operation in which the capability information of the external equipment indicates that the external equipment does not support the function of decoding data of the first media transport method and the capability information of the external equipment indicates that the external equipment does not support the function of decoding data of the second media transport method, and in which the contents by the first media transport method without conversion are output from the digital interface to the external equipment.

4. The contents outputting method according to claim 3, wherein the first media transport method is an MMT method, and wherein the second media transport method is an MPEG2-TS method.

\* \* \* \* \*